United States Patent
Pfeiffer et al.

[11] Patent Number: 5,960,097
[45] Date of Patent: Sep. 28, 1999

[54] BACKGROUND ADAPTIVE TARGET DETECTION AND TRACKING WITH MULTIPLE OBSERVATION AND PROCESSING STAGES

[75] Inventors: Carl G. Pfeiffer, Hermosa Beach; Cheng-Chih Tsai, Cerritos, both of Calif.; D. Spyro Gumas, Middletown, Md.; Christopher Calingaert, Culver City; Danny D. Nguyen, El Segundo, both of Calif.

[73] Assignee: Raytheon Company, Lexington, Mass.

[21] Appl. No.: 08/774,933

[22] Filed: Jan. 21, 1997

[51] Int. Cl.⁶ .................................................. G06K 9/00
[52] U.S. Cl. ..................... 382/103; 382/107; 382/260; 342/357
[58] Field of Search .................................. 382/103, 107, 382/260, 265; 342/357, 95, 62, 76; 364/516, 517, FOR 516, FOR 517; 600/484

[56] References Cited

U.S. PATENT DOCUMENTS

| | | | |
|---|---|---|---|
| 5,038,785 | 8/1991 | Blakeley et al. | 600/484 |
| 5,392,225 | 2/1995 | Ward | 364/516 |
| 5,504,492 | 4/1996 | Class et al. | 392/357 |

OTHER PUBLICATIONS

Itagaki, Hidenobu, "Improvements of Nuclear Magnetic Resonance Image Quality Using Iterations of Adaptive Nonlinear Filtering", 1993, IEEE, pp. 322–327.

L. G. Taff, The Astronomical Journal, On Initial Orbit Determination, Lincoln Laboratory, Massachusetts Institute of Technology, Lexington, Massachusetts, revised 11 Jun. 1984; vol. 89, No. 9 (Sep. 1984).

*Primary Examiner*—Jose L. Couso
*Assistant Examiner*—Matthew C. Bella
*Attorney, Agent, or Firm*—Colin M. Raufer; Leonard A. Alkov; Glenn H. Lenzen, Jr.

[57] ABSTRACT

A computationally efficient missile detection and tracking system, operating on data samples from a focal plane assembly (FPA) of an electro-optical sensor which is observing the earth and space, detects missiles, aircraft, resident space objects or other objects in the presence of background clutter, determines missile types and estimates missile position and velocity components in an inertial reference frame. Digitized samples from an array of electro-optical detectors which are viewing the earth and/or space are processed to detect and track missiles, aircraft and resident space objects. Streak detection is used for this purpose, where the target is separated from a background scene by exploiting target motion relative to the background scene. This processing system provides superior performance and simplified implementation as compared to conventional methods. The weight and power of a computer which can implement the processing system is much reduced as compared to conventional implementation.

44 Claims, 40 Drawing Sheets

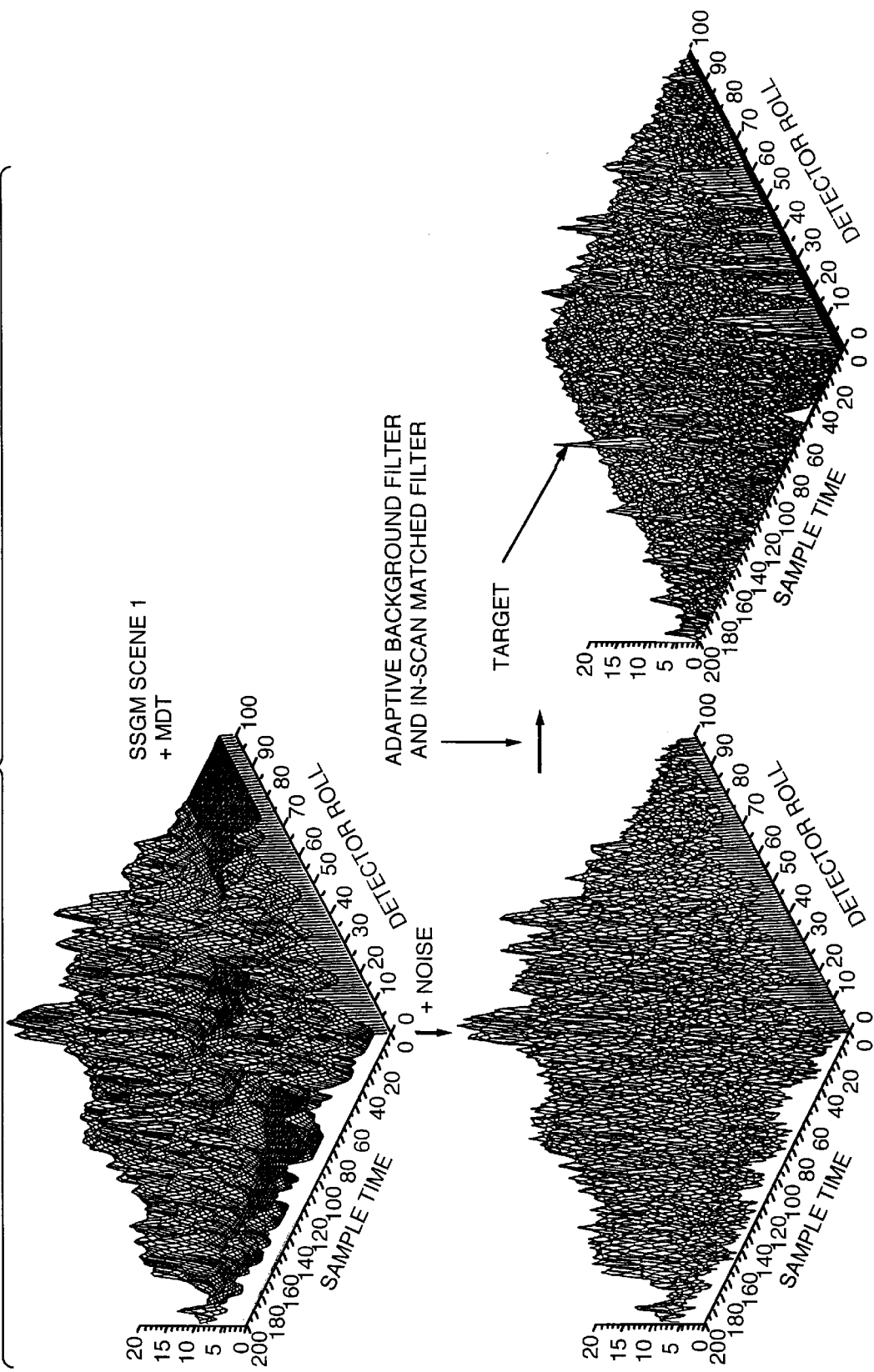

DATA WRITTEN TO PEAK FRAME   PEAK FRAME=682, FRAME TIME=4

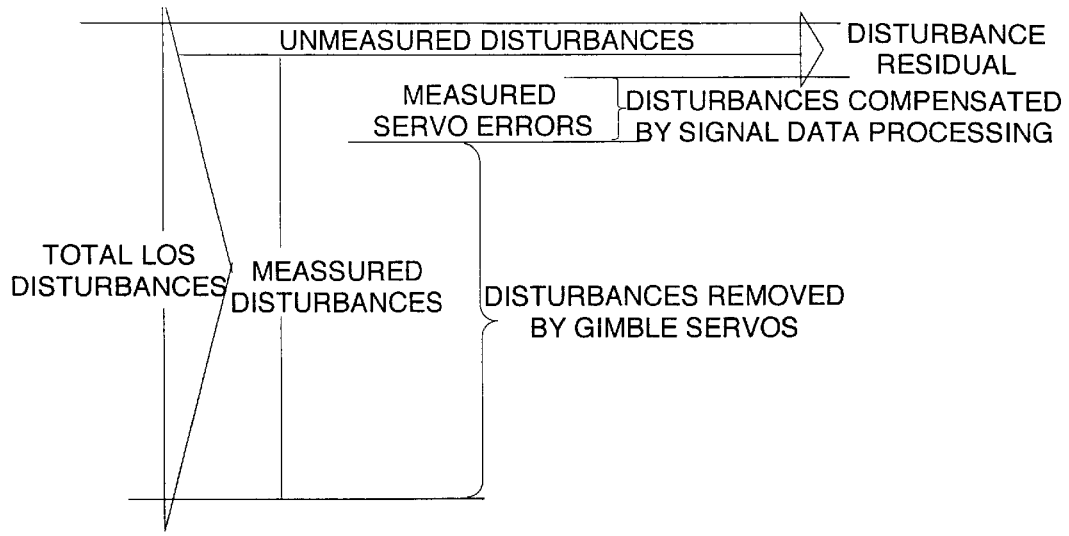
FIG. 4E.
FIG. 5A.
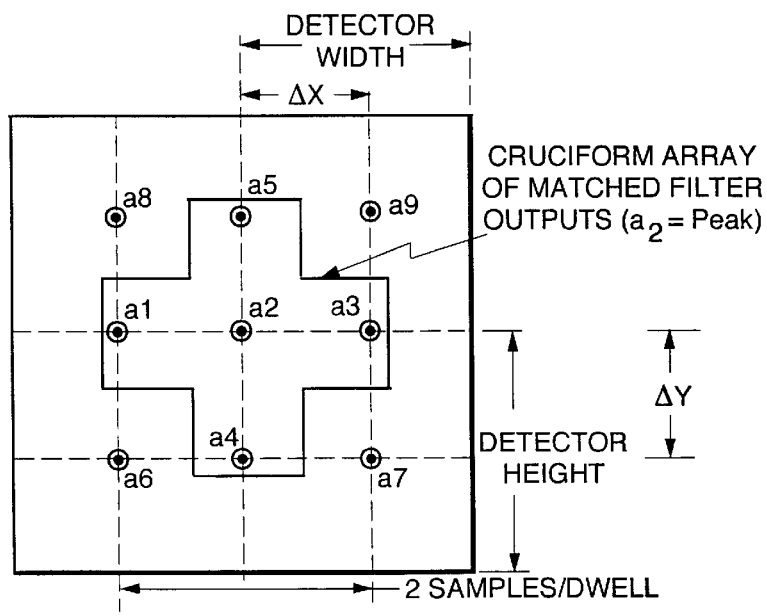

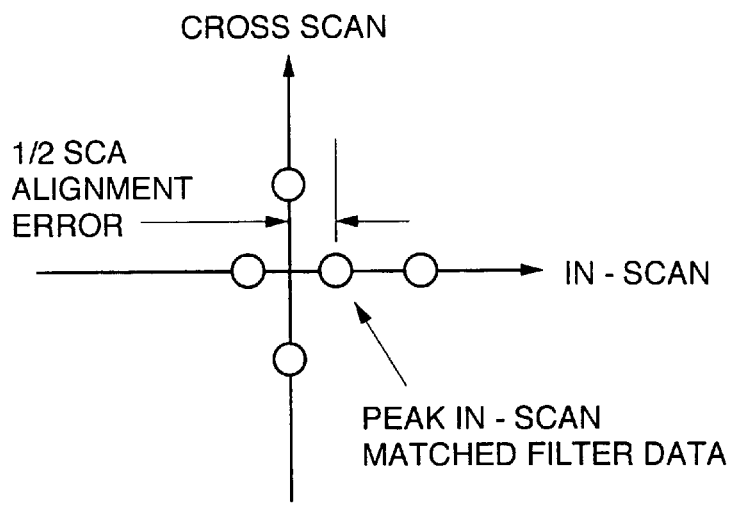
FIG. 5B.
FIG. 5C.
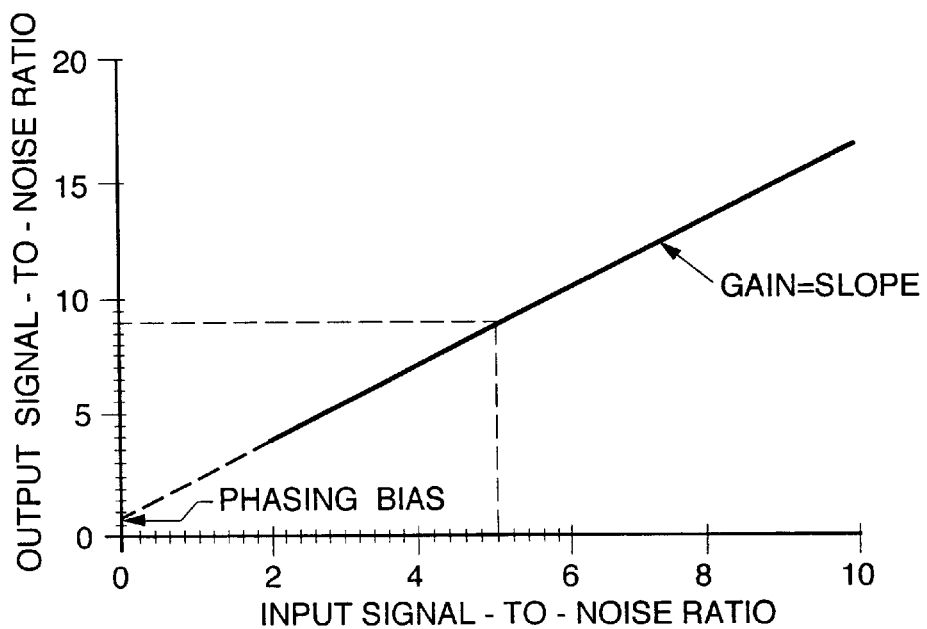

BACKGROUND ADAPTIVE TARGET DETECTION AND TRACKING WITH MULTIPLE OBSERVATION AND PROCESSING STAGES

This invention was made with Government support under Contract No. F04701-92-C-0062 awarded by the United States Air Force. The Government has certain rights in this invention.

TABLE OF CONTENTS
BACKGROUND OF THE INVENTION
  Field of the Invention
  Description of Related Art
SUMMARY OF THE INVENTION
BRIEF DESCRIPTION OF THE DRAWINGS
DESCRIPTION OF THE PREFERRED EMBODIMENT
  Missile Detection and Tracking System Hardware
  Missile Detection and Tracking System Data Processing
    acquisition sensor time dependent processor
    tracking sensor TDP
    object dependent processor (ODP)
  Operation of Acquisition Sensor TDP
    Spike Deletion algorithm
    Acquisition Rate Restore algorithm
    responsivity correction algorithm
    time delay integration (TDI) algorithm
    Half Sensor Chip Assembly Alignment (HSCA) algorithm
    Adaptive Background Filter (ABF) algorithm
    in-scan matched filter algorithm
    Cross-Scan Matched Filter algorithm
    Adaptive Threshold algorithm
    Peak Detection algorithm
    Window Request/Strip Generation algorithm
  Operation of Tracking Sensor TDP
    four primary modes of Track TDP operation
    MLSD
    MVPD
    Iterative MLSD
    Raw Data Gathering
    Saturation Test algorithm
    Correlated Double Sampling (CDS) algorithm
    Non-Uniformity Correction (NUC) algorithm
    Track TDP Spike Deletion algorithm
    four tracking spike deletion options
      Spike Deletion Option 1
      Spike Deletion Option 2
      Spike Deletion Option 3
      Spike Deletion Option 4
    Track Rate Restore algorithm
    Scene-Based Offset Calibration algorithm
    Jitter Correction algorithm
    1×1 Background Estimation algorithm
    128×128 Window Select algorithm
    Final Background Estimation algorithm
    Background Subtraction algorithm
    MLSD algorithm
    MVPD algorithm
  Object Dependent Processing
    clutter Tracker
    FPA Attitude Determination algorithm
    Parabolic Pulse Match Interpolation algorithm
    Pulse Shape Test algorithm
    Pechan Wobble Correction Bearing Runout algorithm
    Wobble Error Update algorithm
    Estimate Prediction Error algorithm
    Update Recursive Filter algorithm
    Correct Acquisition Sensor Angular Bias algorithm
    Wobble Differential Correction algorithm
    Position Dependent Correction algorithm
    Focal Length Correction algorithm
    TDP Algorithm Calibration algorithm
    Optical-Distortion-Like Calibration algorithm
    Systematic Detector Non-linear Responsivity Error algorithm
    Angle Bias Correction algorithm
    Local SCA to Global Coordinate Conversion algorithm
    Match Peaks and Windows algorithm
    N-Point Intensity Slope Test algorithm
      3 per 4 motion test
    Booster Typing and Parameter Estimation Test algorithm
    IOD algorithm
    Aircraft tracking
    Earth-Fixed Prediction algorithm determine the ECI position of the clutter point
    Maximum Velocity Window Prediction algorithm
    Acquisition Sensor False Alarm Control algorithm
      Update EFFA Amplitude Histograms algorithm
      Calculate EFFA-Dependent Threshold Multipliers algorithm
      Update Threshold Multipliers algorithm
    Target Track Update algorithm
      Process Handover Tracks from Clutter Tracker algorithm
      Process Windowed Peaks from Clutter Tracker algorithm
      LOS Batch State Vector Update algorithm
      Sequential Kalman-like State Vector Update algorithm
      Object Window Prediction algorithm
    Strip vs Peak Control algorithm
    Handover Target Designation algorithm
    Update Cataloged RSO State Vector algorithm
    Generate Second Platform Cue Message algorithm
      Thrusted Vehicle Cue algorithm
      RSO Cue algorithm
    Acquisition Sensor Strip Processing algorithm
    Strip Stitching algorithm
    Peak Designation algorithm
    Moment Calculation algorithm
    Tracking Object Classification algorithm
    Acquisition Object Amplitude and Position Estimation algorithm
    Peak Track Clustering algorithm
    Track Sensor Strip Processing algorithm
      Track TDP Algorithm Iteration algorithm
      Background Estimation Verification step
      False Alarm Control step
    False Alarm Table Update algorithm
    Strip Sewing algorithm
    Track MVPD Processing algorithm
    Track Sensor CSO Pair Resolution algorithm
    Tracking Object Classification & Moments algorithm
    Tracking Object Amplitude and Position Estimation algorithm
  Track Sensor Scheduling algorithm
    Define New Target algorithm
    Schedule Lost Target Search algorithm
    Update Object Priority algorithm
    Update Stare Time & Algorithm Parameters algorithm
    Track Sensor Revisit Update algorithm
CLAIMS
ABSTRACT OF THE DISCLOSURE

BACKGROUND OF THE INVENTION

1. Field of the Invention

The present invention relates to passive electro-optical sensor systems and more particularly to passive electro-optical sensor systems for acquiring and tracking the location of objects such as missiles and resident space objects (RSO's) such as satellites.

2. Description of Related Art

Missile, aircraft and RSO surveillance systems have been utilized on satellites and/or aircraft for some time now. Such systems are used to detect and track missiles, aircraft, satellites and other objects of interest by processing electromagnetic signals, such as those in the optical or infrared spectra, emitted or reflected by the objects of interest.

A use for such surveillance systems is for National Missile Defense, for example, for defending the United States against a missile attack from a rogue country. In order to perform such a function a surveillance system must be capable of monitoring a large portion of the earth. Accordingly, such systems need a number of sensors on multiple satellites that can perform the functions of detection, acquisition, tracking and booster typing and discrimination.

Another closely related use for surveillance systems is tactical missile defense. This is basically the same use as national missile defense but on a smaller scale. For example, instead of defending the United States from a long range missile from a remote country such as Russia, tactical missile defense is used in situation such as that encountered during the Gulf War, when dealing with missiles having a range of only several hundred miles. An example of tactical missile defense would be defending Israel from missiles launched from Iran or another country relatively close to Israel.

In addition, surveillance systems have many other uses, even in peacetime. For example, surveillance systems can observe satellites in space (space surveillance). The North American Air Defense command (NORAD) currently keeps track of approximately 7,500 satellites (natural and man-made) using ground-based radar tracking. There are probably at least about 20,000 additional satellites that are not tracked by NORAD. Observing military satellites is an important function as these satellites occasionally maneuver and therefore do not remain in a stable, predictable orbit. Another use for surveillance systems is intelligence gathering. For example, surveillance systems can be used to monitor troop movements. Surveillance systems can also be used for supporting tests of "friendly" missiles by gathering data on missile performance (range support).

Missile detection and tracking systems enable a user to identify missile types and launch points, estimate missile impact point, and track the position of the missile throughout its trajectory. Information gathered by these systems can be used for handoff to another sensor or to a weapon system to destroy the missile or divert the missile from its intended target.

Onboard signal and data processing is a key technology in missile detection and tracking systems. A first generation processor was developed for the Forward Acquisition System (FAS) in the 1980's. FAS never was completed, but much design work was done before the program was canceled. FAS was a scanning system that used, for the first time, a mosaic array of detectors instead of a single line array of detectors. FAS used 28,000 detectors, an enormous number of detectors in comparison with prior systems. A breakthrough of the FAS program was to develop simple techniques for data processing so that this enormous amount of data could be processed.

A second generation processor built for the Airborne Surveillance Testbed (AST) Program, formerly known as Airborne Optical Adjunct, was introduced in 1984 as a follow-on to FAS. AST was similar to FAS, but the AST system is carried on an airplane instead of on a satellite. A major innovation of AST is the use of some very sophisticated signal processing which makes corrections for focal plane jitter and uses adaptive filtering methods. The AST program was a success and it is still operating and gathering data.

In 1996, a third generation processor built for a satellite-based surveillance system, called the Midcourse Space Experiment (MSX), was launched into a 900 km orbit. The MSX program is a military program funded by the U.S. Ballistic Missile Defense Organization. MSX uses an onboard signal and data processor (OSDP) to acquire and track objects, as set forth in Pfeiffer and Masson, "Technology Demonstration by the Onboard Signal and Data Processor," *Johns Hopkins APL Technical Digest*, Volume 17, Number 2 (1996), the entirety of which is hereby incorporated by reference. A major innovation of MSX is the ability to package software and hardware capable of handling the huge processing load, similar to that of the AST program, into a small package, capable of operating onboard a satellite. In the AST program, the programmable processor demands were on the order of 50 million operations per second (MIPS). The OSDP in the MSX program performs essentially the same functions as the AST programmable processor, but requires only about 1 MIP and combines both signal processing and data processing into one unit so that the processing required for tracking is actually done onboard. MSX is now operating on orbit and has been a great success, producing results better than predicted.

Another sophisticated satellite-based missile surveillance system is disclosed in Denney et al., U.S. Pat. No. 5,300, 780. This system uses a first staring sensor for missile detection and a second staring sensor for missile tracking. A rotating color filter wheel is used to project multiple selected bands of radiation onto the first staring sensor. Missile detection is separated from missile counting and tracking in dual subsystems that are coordinated by a multispectral signal processor.

Fourth generation processors for missile and aircraft surveillance systems such as the Space and Missile Tracking System (SMTS, also known as Space-Based Infrared System—Low, or SBIRS-Low) will have to meet requirements exceeding the capabilities of any existing surveillance system. The SMTS will use both scanning and staring electro-optical sensors to detect and track missiles, aircraft and resident space objects (RSO's). The scanning sensor onboard the SMTS will be required to detect events of interest over a wide field of regard and then hand over the line-of-sight (LOS) positions and velocities of these events to an onboard staring sensor and to staring sensors on other platforms. Staring sensor performance over a large area is thereby achieved with small field of view staring sensors. Resulting single-platform (mono) LOS tracks are then combined with LOS tracks from other platforms to produce interceptor-quality stereo tracks.

To achieve such results, the scanning sensor must provide very effective below-the-horizon (BTH) clutter suppression to insure that the staring sensors are not spending most of their time servicing false alarms. The staring sensors must provide very effective suppression of BTH and above-the-horizon (ATH) clutter and focal plane pattern noise in order to detect dim targets.

Functional requirements which must be met by such a system are:

1. Operation of scanning and staring sensors in a radiation environment. Algorithms for detecting and circumventing radiation-induced spike events in the data must therefore be implemented.
2. Very low false alarm rate operation of a scanning sensor by clutter-adaptive detection, so that the staring sensors have time to handle the handover tasks. The targets of interest are boosting vehicles, RSO's and jet aircraft ("slow walkers").
3. Accurate, high speed calculation of scanning sensor LOS tracks. Toward this end, the accurate typing of boosting vehicles and aircraft is needed.
4. Attack-assessment-quality midcourse calculation of launch points, impact points and parameters from a single platform (mono, three-dimensional (3-D) tracking), where the initial position and velocity of the tracking filter is obtained with booster typing information and an initial orbit determination algorithm.
5. Accurate handover of mono 3-D tracks to a second platform to produce interceptor-quality state vectors by multi-platform (stereo) processing.
6. Staring sensor streak detection which adapts to background clutter characteristics in the presence of focal plane pattern noise and jitter. The targets of interest are boosting vehicles, RSO's and jet aircraft.

Unlike prior systems, a system in accordance with the present invention meets the above requirements and will preferably use radiation-hard, space-qualified computing hardware.

SUMMARY OF THE INVENTION

A missile detection and tracking process in accordance with the present invention includes multiple stages of signal and data processors operating on data from an acquisition sensor, having a relatively wide field of regard for covering essentially the entirety of the portion of the surface of the earth that is observable from the sensor, and a tracking sensor having a relatively narrow field of regard. The sensors can be a scanning staring or slowly scanning ("nodding") sensors. The output from the acquisition sensor is processed to hand over pointing instructions to the tracking sensor. The system can be carried on a satellite in low earth orbit (i.e., at an altitude from a few hundred kilometers to more than one thousand kilometers) or high earth orbit (apogee altitude on the order of 35,000 to 40,000 kilometers).

The preferred embodiment uses a scanning acquisition sensor comprising a two-spoke focal plane assembly. A Pechan prism is used to rotate the optical field-of-view with respect to the focal plane assembly. The tracking sensor comprises a medium/medium long and longwave infrared staring sensor and a Visible staring sensor, which can also be commanded to follow a target or slowly scan a target. The scanning acquisition sensor and the staring sensor are both capable of detecting targets above the horizon and below the horizon.

Output signals from the scanning acquisition sensor are processed by an Acquisition Sensor Time Dependent Processor (TDP) to filter clutter and detect data sets containing target objects. Its processing is called "time dependent" because it operates on all of the digitized detector data samples output from the scanning acquisition sensor in a sequential manner. Similarly, a tracking sensor Time Dependent Processor sequentially processes signals received from the tracking sensor to collect data sets containing target objects and includes detection capability for dim targets in clutter using a three-dimensional, matched filter.

An Object Dependent Processor (ODP) processes data in order to track targets and provides feedback to the acquisition sensor and to the tracking sensor. Its processing is called "object dependent" because it operates only on data sets surrounding target objects identified by the acquisition and tracking Time Dependent Processors. The Object Dependent Processor also provides data to a line-of-sight control unit that provides time-varying inertial orientations of the focal planes of the scanning acquisition sensor and the tracking sensor. The system can operate effectively in a wide range of background environments.

A process in accordance with the present invention includes a number of unique features not present in prior systems. For example, the sensors are able to look down on the earth and detect and track targets in a background environment that may include severe clutter (such as sunlight reflected from clouds). The rate of false target reports sent to the ground as the output of the present invention is reduced by more than an order of magnitude as compared to prior processes. The MSX OSDP system was only designed to observe objects in space (above the horizon of the earth), so it did not have clutter rejection capabilities sufficient to operate in a background environment having severe clutter.

Also, the system in accordance with the present invention uses a now type of scanning sensor in that it includes a rotating Pechan prism to scan the earth in a circular fashion. This is an innovation as opposed to the earlier rotating scanners which were used in earlier generations of surveillance systems, where the entire detector array was rotating. The clutter rejection capabilities of the system in accordance with the present invention required the development of a new technique for sensor motion compensation, wherein prism boresight wobble was estimated by scan-to-scan differencing the positions of earth-fixed sources.

Another advanced feature is a simplified onboard booster typing and tactical parameter estimation. This function has been done for many years but always on the ground, never onboard a satellite.

The process in accordance with the present invention uses logic for conducting staring operations in a wide range of conditions, using the most sophisticated staring sensor ever designed to be operated onboard a satellite. The process also includes a handover capability and a scheduling function which can manage the two sensors together to effectively make up a miniature tracking station on orbit. The kinds of operations that can be implemented on orbit in accordance with the present invention were previously done on the ground, for example, such as managing and scheduling multiple sensors. Such ground-based processing is expensive and slow in comparison to on-orbit processing. Indeed, some of the functions performed by a system in accordance with the present invention could not be performed using ground-based processing. For example, if the system detects an object with the acquisition sensor, it can then quickly point the track sensor toward that object. Such a real-time pointing command would be impossible to accomplish using ground-based processing because the time required to (1) send a message reporting the detection of the object to the ground and (2) send a pointing command back to the satellite, would be too long to effectively track the object using the staring sensor. Since the system has a capability to create more than one "look" per second at a target by the track sensor, such a volume of pointing commands could not be scheduled from the ground.

In accordance with one aspect of the present invention, a process for detecting electromagnetic radiation from an object is provided, comprising of a sequence of signal and data processing stages that operate on data generated by an acquisition sensor that scans a field-of-regard with an array of detectors to produce data samples from each detector, and a tracking sensor that stares at or slowly scans a commanded field-of-regard with an array of detectors to produce data samples from selected regions of the detector array during a given observation time interval.

In accordance with another aspect of the present invention, a first-stage signal processor is provided that separates likely target data samples obtained by the acquisition sensor from spurious data samples, such as background clutter and other noise sources, by utilizing clutter-adaptive detection algorithms. The first-stage processor contains a spike detection algorithm which rejects spurious data spikes from either internal or external sources by operating on a two-dimensional array of contiguous detector data samples to perform a combination of amplitude and pulse shape tests. The first-stage processor also contains a background subtraction algorithm that estimates the background that each detector is observing by recursively filtering the data output from each detector in order to subtract that estimate from each detector output.

The length of the time constant used in the recursive background estimation filter is adapted to the local background by means of a steepest descent method which minimizes the variance of the data residuals output by the background subtraction algorithm. A two-dimensional array of background subtracted residuals is used in the steepest descent algorithm.

An approximate realization of a two-dimensional matched filter (detection filter) operates on the background-subtracted data to produce a detectable signal in the presence of noise. The combination of background subtraction and detection filtering becomes a fixed-tap-weight transversal filter when the recursive background filter time constant converges to its minimum value.

The detection threshold at detection filter output is an estimate of the standard deviation of background—plus-noise multiplied by an externally-supplied multiplier (threshold multiplier). A two-dimensional array of background-subtracted data residuals is used to estimate the background standard deviation. The background-subtracted data residuals are averaged in time by means of a recursive filter. The standard deviation of the background data residual is calculated as the absolute value of the residual multiplied by constant.

Peak packets are formed from a two-dimensional array of matched filter threshold exceedances, where the center detector value for each peak packet is greater than or equal to its surrounding neighbors. Specified two-dimensional arrays of detector data (data windows) can be specified by external means for the purpose of commanding all matched filter threshold exceedances in the window be transmitted (instead of peak packets only). The data windows can be used to set commanded detection threshold values (threshold overrides) and/or to reset any programmable algorithm parameter in the first stage processor to a commanded value.

In accordance with another aspect of the present invention, a second-stage processor that reduces false detections from the first stage processor is provided. Multiple scans of the acquisition sensor field-of-regard are used to identify earth-fixed objects, and to reject those data sequences which are not consistent with known object motion and intensity characteristics. First-stage processor algorithm approximation errors are corrected as a function of detector array position by equations which have been curve-fit to calibration data. False object detections are rejected by a pulse shape test which uses the second difference of the data values in a peak packet.

An estimate of object position and amplitude is obtained by fitting a second-order surface to the peak packet data and then using two-dimensional, non-linear interpolation (parabolic pulse match). The positions of objects being tracked are predicted from the previous scan so that detections which are track continuations can be identified without further hypothesis testing. If they are not track continuations the inertial velocity of a hypothetical earth-fixed point is calculated as the velocity of an earth-fixed point which is at the intersection of a given sensor line-of-sight with a specified altitude surface, and this velocity is used to predict the next scan position for the purpose of testing the earth-fixed point hypothesis. The rate of change of object intensity is estimated over a span of several scans for objects newly identified as earth-fixed points in order to detect slowly-moving objects with thrust applied. Earth-fixed coordinates of objects identified as earth-fixed points are stored and updated each scan for as long as the object is in the acquisition sensor field-of-regard (clutter tracking). The apparent scan-to-scan variation of earth-fixed objects is used to estimate boresight wobble of the acquisition sensor.

The estimated positions of earth-fixed objects is compared to a catalog of positions of known earth-fixed points in order to estimate the boresight bias of the acquisition sensor. For objects not classified as earth-fixed, a multi-scan motion test is used to classify sequences of multi-scan detections as possible object tracks if their apparent motion is consistent with known object motion. Detections not identified as earth-fixed or moving objects are declared to be noise and a threshold multiplier is calculated and sent to the first-stage processor to cause the number of such noise points to be raised or lowered to a desired value.

The field-of-regard of the acquisition sensor is divided into sun-angle-dependent spatial bins and the amplitudes of the earth-fixed object within each spatial bin are tallied for the purpose of calculating threshold overrides, which are calculated for each bin and sent to the first-stage processor to cause the estimated number of earth-fixed objects to be a desired value.

In accordance with another aspect of the present invention, a third-stage processor is provided that continues the tracks initiated by the second-stage processor and further reduces false detections by testing the hypothesis that these tracks are consistent with a priori known characteristics of specified object types. An object track is defined by an inertially-described line-of-sight state vector, comprising a unit line-of-sight vector at a given epoch time and its corresponding rate and acceleration, as determined by curve-fitting a sequence of multi-scan observations. The line-of-sight state vector is used in conjunction with stored a priori data, which describes object altitude and acceleration characteristics in object plane-of-motion coordinates, in order to identify object types and their initial conditions. The line-of-sight state vector is identified as spurious if no reasonable match to any object type is found.

An object identification algorithm is a version of the Laplace method of initial orbit determination, augmented by the addition of a priori object altitude and/or acceleration characteristics. Commands can be sent to the first-stage processor to transmit all threshold exceedances from a given region in the field-of-regard of the acquisition sensor (instead of peak packets only). Threshold exceedances from the first-stage processor are used to determine local peaks and to identify unresolved clumps of objects. Identified peak packets which do not associate with existing line-of-sight state vectors are sent to the second-stage processor for multi-scan motion and intensity tests.

In accordance with another aspect of the present invention, a fourth-stage processor is provided which schedules the tracking sensor to observe specified objects being tracked by the third-stage processor and calculates a sequence of line-of-sight pointing commands to cause the tracking sensor to be slewed to sequence of positions where it can observe each scheduled object during the scheduled observation time intervals. Objects are scheduled with a priority scheme which is based upon the value of a given observation for a given object at a given time and other considerations. Objects of otherwise equal priority are assigned a priority in a given track sensor availability period which depends upon the object position uncertainty predicted during that period.

A catalog of Resident Space Objects is autonomously maintained by scheduling observations, as available and as required, to keep prediction uncertainties small enough to ensure that each object will be within a scheduled field-of-regard of the tracking sensor at a future viewing opportunity. The observation sequence for a given set of scheduled objects is determined by an algorithm which minimizes the sum of slew times and observation times for the object set. The time minimization is achieved by a step-optimal process which starts with two scheduled objects and then iteratively adds one more such that the total slew plus observation time is minimized at any stage of the iterative process.

In accordance with another aspect of the present invention, a fifth-stage processor is provided which uses a background-adaptive streak detection algorithm to detect the scheduled objects in the track sensor field-of-regard and/or other objects which may be in that field-of-regard. A streak detection algorithm uses known object velocity magnitude and direction relative to the tracking sensor detector array to form hypothetical streaks (object trajectories) for a discrete set of feasible object positions. The object velocity magnitude and direction is calculated from the line-of-sight state vector propagated from a track initiated by the acquisition sensor or from an inertial position and velocity vector provided from an external source, such as a ground station, another sensor, or other means.

The background that each detector is observing at each sample time interval is estimated by using data from the entire observation interval, and this estimate is subtracted from the measurement at each sample time from each detector. Another processor or another source can command that the background estimate be made by averaging the outputs of each detector or by-also including the outputs of surrounding nearest neighbors.

Tracking sensor jitter and drift, as measured by external means, is used to continuously correct the streak direction. The jitter and drift corrections are quantized to the nearest detector crossing time. Hypothetical object amplitudes along a hypothetical streak are combined to form an amplitude estimate for the purpose of testing the hypothesis that the streak is an object trajectory. The combining of object amplitudes along a streak approximates the maximum likelihood estimate of true object amplitude.

The streak detection can be done in a target following mode, or with the tracking sensor boresight continuously pointed to a fixed point on the rotating earth, or with the tracking sensor boresight fixed in inertial space, or with the tracking sensor being slewed at constant rate. The tracking sensor sampling rate and slew rate are adjusted so as to provide at least two detector samples per detector crossing.

An option is available for using a streak detection algorithm which does not depend upon an a priori estimate of object velocity. A priori knowledge or a trial and error procedure is used to adjust the track sensor sample rate to achieve one sample per detector crossing or another desired number of samples per detector crossing. Tracks in track sensor detector coordinates are found by a track assembly process which tests for straight line motion during the observation interval. Data is stored after each observation interval and made available for iteration of algorithm types, algorithm threshold setting or other algorithm parameters until the storage capability is needed for the next scheduled tracking sensor observation interval.

In accordance with another aspect of the present invention, a sixth-stage processor is provided which commands the algorithm parameters and iterations of the fifth-stage processor, combines the acquisition sensor data and tracking sensor data to form tracks, and performs other operations on the data output from the fifth stage processor. Object velocity can be estimated from the results of the velocity-independent algorithm and this velocity can be used to process the stored data with the velocity-dependent algorithm. This capability, along with algorithm iteration and/or algorithm parameter iteration, can be autonomously commanded by using rules embodied in lookup tables or formulas, as determined by data quality measures, or can be commanded by external means. A closely-spaced object resolution algorithm is used to decide if more than one object is contained a given data array. A hill climbing or hill descending method is used in performance measure space to find whether the observed data best fits a one-object model, a two-object model, or a multi-object model.

A sequence of object positions obtained from the fifth-stage processor is used to estimate object range and range rate by an initial orbit determination means. In particular, the line-of-sight state vector can be used with a modified form of the Laplace method of Initial Orbit Determination.

Thrusting object burnout altitude or other object parameters obtained from an earlier processing stage can be used to improve the estimate of range and range rate. An inertial position and velocity state vector is obtained from the range and range rate data and the associated line-of-sight state vector. A handover message to another sensor platform is constructed from the inertial position and velocity state vector.

The invention itself, together with further objects and attendant advantages, will best be understood by reference to the following detailed description, taken in conjunction with the accompanying drawings.

BRIEF DESCRIPTION OF THE DRAWINGS

FIG. 3L is a group of graphs showing sample results obtained from processing SSGM Scene #1 using an adaptive background filter and in-scan matched filter in accordance with the present invention;

FIG. 5A is a diagram illustrating a cruciform array of amplitude estimates;

FIG. 5B is a diagram illustrating cross-scan misalignment error;

FIGS. 5C, 5D and 5E show performance which is achievable in a benign clutter environment using an acquisition sensor time dependent processor in accordance with the present invention;

DESCRIPTION OF THE PREFERRED EMBODIMENT

Missile Detection and Tracking System Hardware

Figure 1:
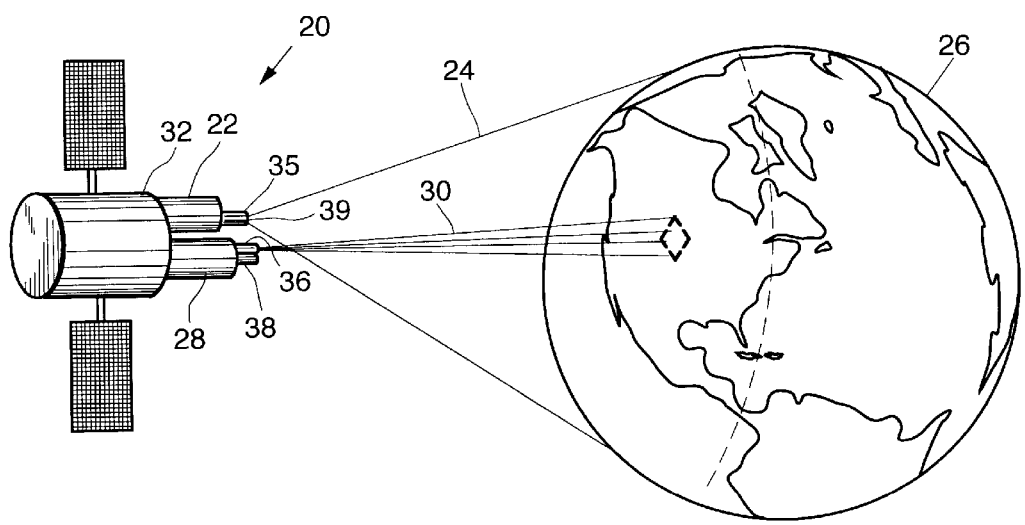
FIG. 1 is a schematic drawing of a missile detection and tracking system in accordance with the present invention.

Now referring to FIG. 1, a missile detection and tracking system 20 includes a scanning acquisition (ACQ) sensor 22 having a relatively wide field of regard 24 for covering essentially the entirety of the portion of the surface of the earth 26 that is observable from the system 20, and a tracking sensor 28 having a relatively narrow field of regard 30. The system 20 is carried on a satellite 32 in low earth orbit (i.e., at an altitude from a few hundred kilometers to about one thousand kilometers).

The scanning acquisition sensor 22 comprises a two-spoke FPA 35 for sensing shortwave infrared (SWIR) radiation. A rotating Pechan prism (not shown) is used to rotate the optical field of view with respect to the FPA 35. Such a prism is shown and described in Cook et al., U.S. Pat. No.

5,347,391, issued Sep. 13, 1994, the entirety of which is hereby incorporated by reference. The use of such a prism is one of the unique and advantageous features of the present invention, because the Pechan prism creates an image that rotates at a rate twice that of the prism itself, thereby reducing wear due to moving parts in the mechanism used to rotate the image and the use of a circular scanning pattern is also more efficient than a linear scanning pattern.

The tracking sensor 28 comprises a medium/medium long wave/long wave infrared (M/MLWIR/LWIR) staring sensor FPA 36 and a visible sensor FPA 38. The SWIR scanning acquisition sensor 22 and the M/MLWIR/LWIR staring sensor FPA 36 both operate above the horizon and below the horizon, and the visible sensor FPA 38 nominally operates above the horizon.

The two-spoke FPA 35 comprises a set of twelve sensor chip assemblies (SCAs) 39 arranged in a two-spoke configuration. Each SCA 39 includes 380 rows of scanning detectors, arranged in four columns, A, B, C and D. Columns A and B, are offset from columns C and D by a distance of one-half the width of each scanning detector. This makes it possible, from a signal processing standpoint, to treat each SCA 39 as having an effective column height of 760 "virtual detectors," each having a "virtual" detector width of one-half that of the physical width of each scanning detector.

Missile Detection and Tracking System Data Processing

Figure 2:
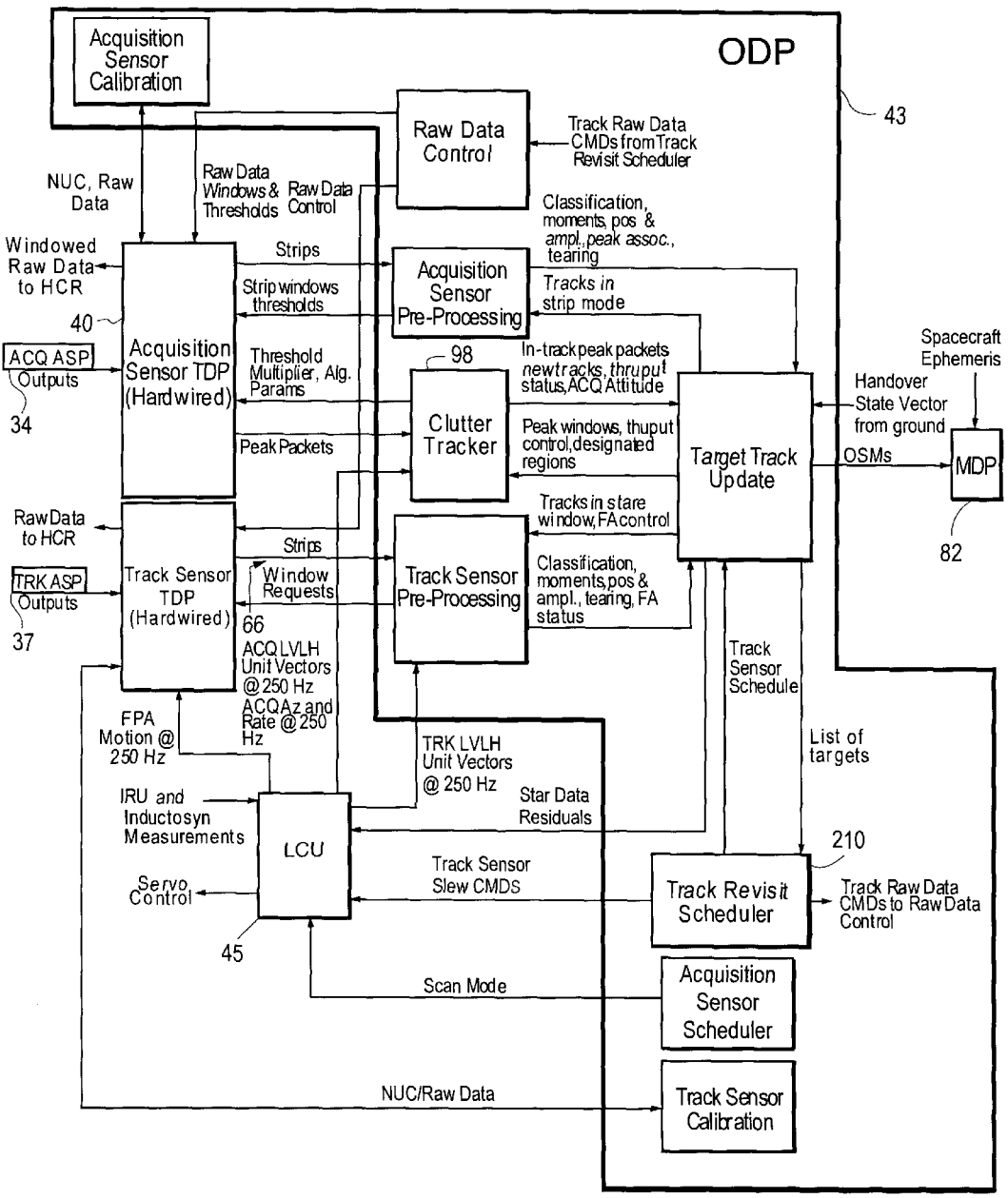
FIG. 2 is a block diagram depicting an overall data processing structure in accordance with the present invention.

Now referring to FIG. 2, the data processing structure for the system 20 will now be described. Output signals from the scanning acquisition sensor 22 are fed through an acquisition analog signal processor 34 (that includes an analog to digital convertor) to an acquisition sensor time dependent processor (TDP) 40 to filter clutter and detect data sets containing target objects. The Acquisition Sensor TDP 40 also relays raw data from selectable "tap" points in the processing to a spacecraft high capacity recorder (not shown) for subsequent downlink to the ground. A tracking sensor TDP 42 receives signals, fed through a tracking analog signal processor 37 (that includes an analog to digital convertor), from the tracking sensor 28 to collect data sets containing target objects and includes an advantageous detection capability for dim targets in clutter using a three-dimensional, matched filter (streak processing), described in detail below.

An object dependent processor (ODP) 43 processes data in order to track targets and provides feedback to the Acquisition Sensor TDP 40 and to the tracking sensor TDP 42. The ODP 43 also provides data to a line of sight control unit (LCU) 45, that provides time-varying inertial orientations of the FPAs of the scanning acquisition sensor 22 and the tracking sensor 28. In addition, the ODP 43 calibrates the acquisition sensor 22 and the tracking sensor 28. The tracking sensor TDP 42 can operate effectively in a wide range of background environments and can correct for FPA jitter not removed by the LCU 45. The tracking sensor TDP 42 also supplies raw data from selectable "tap" points in the processing to the spacecraft high capacity recorder (not shown) for subsequent downlink to the ground.

Operation of Acquisition Sensor TDP

Figure 3:
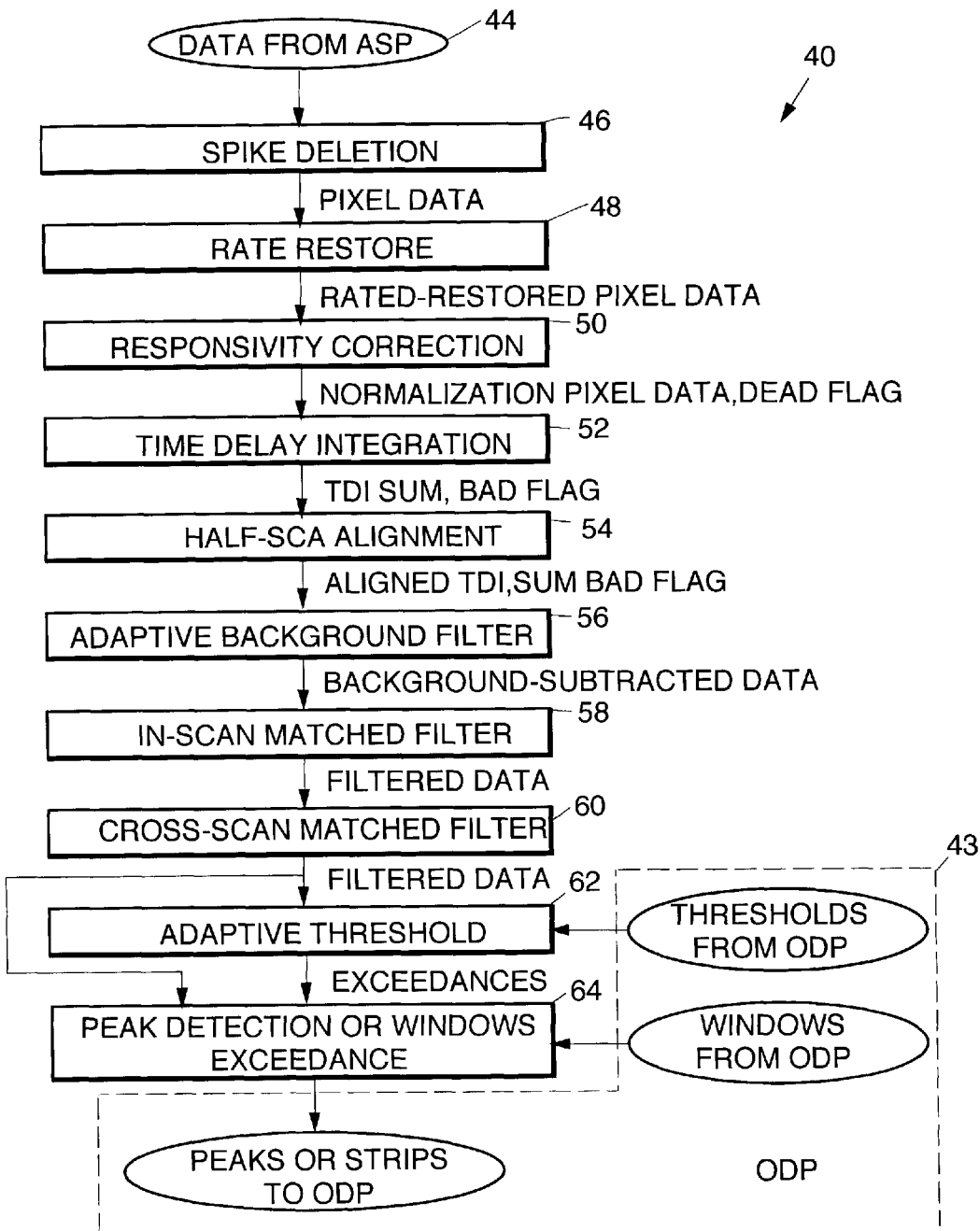
FIG. 3 is a flow diagram depicting the processing steps performed by an acquisition sensor time dependent processor in accordance with the present invention.

Now referring to FIG. 3, the Acquisition Sensor TDP 40 operates as follows. Raw data 44 from the acquisition analog signal processor 34 (shown in FIG. 2) associated with the FPA 35 of the scanning acquisition sensor 22 is first subjected to a Spike Deletion algorithm 46 to eliminate the effect of proton hits on the FPA 35 and other such phenomena. The Spike Deletion algorithm 46 uses a five-sample temporal test using adjacent data samples from a single detector (temporally ordered) and comparing them to one another to determine if a spike is present.

The Spike Deletion algorithm 46 must use four or more data samples to identify spikes, because a three-sample test cannot distinguish between spikes and target objects. This conclusion follows from the fact that the likelihood ratio for the hypothesis (noise vs. spike) is the same as the likelihood ratio for the hypothesis (noise vs. target). A five sample test was chosen because it produced adequate performance which was much better than the corresponding four-sample test. The additional storage required for the fifth sample does not significantly increase the weight or power of the Acquisition TDP 40.

Figure 3A:
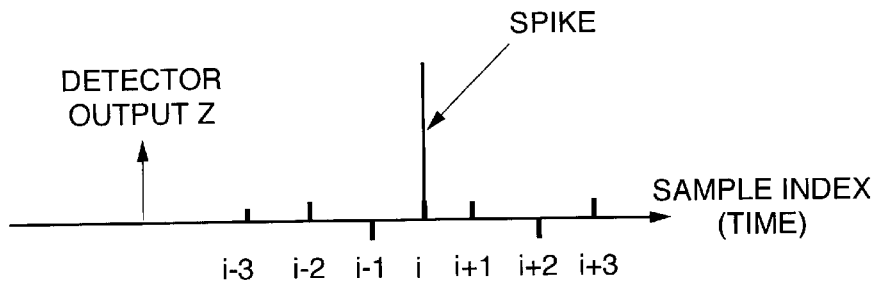
FIG. 3A is a graph showing a typical spike signal.
Figure 3B:
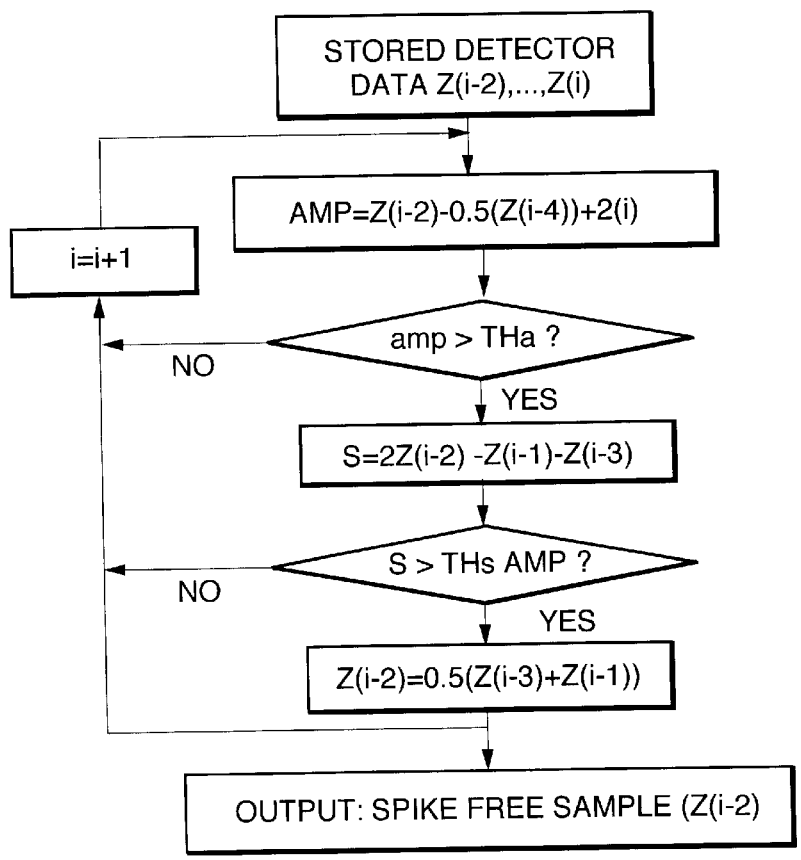
FIG. 3B is a flow diagram showing a spike deletion algorithm in accordance with the present invention.

Referring to FIGS. 3A and 3B, the Spike Deletion algorithm 46 has five parts:

(1) A background-subtracted estimate of sample Z(i−2) is calculated as $$AMP=Z(i-2)-(0.5)[Z(i)+Z(i-4)]$$

(2) Z(i−2) is declared to be spike-free if AMP≤THa, where THa is a programmable threshold. Otherwise, (3) The shape parameter is calculated as the second difference $$S=2Z(i-2)-[Z(i-1)+Z(i-3)]$$

(4) Z(i−2) is declared to be spike free if the normalized shape parameter is not "sharp", i.e., the sample is spike free if (S/AMP)<THs or, equivalently S<(THs)*(AMP)

where THs is a programmable threshold. Otherwise, (5) The apparently spike-contaminated sample Z(i−2) is set equal to the interpolated value $$Z(i-2)=0.5[Z(i-3)+Z(i-1)]$$

Simulation studies have shown that reasonable threshold values are:

THa=5*(noise sigma)

THs=1.6

Figure 3C:
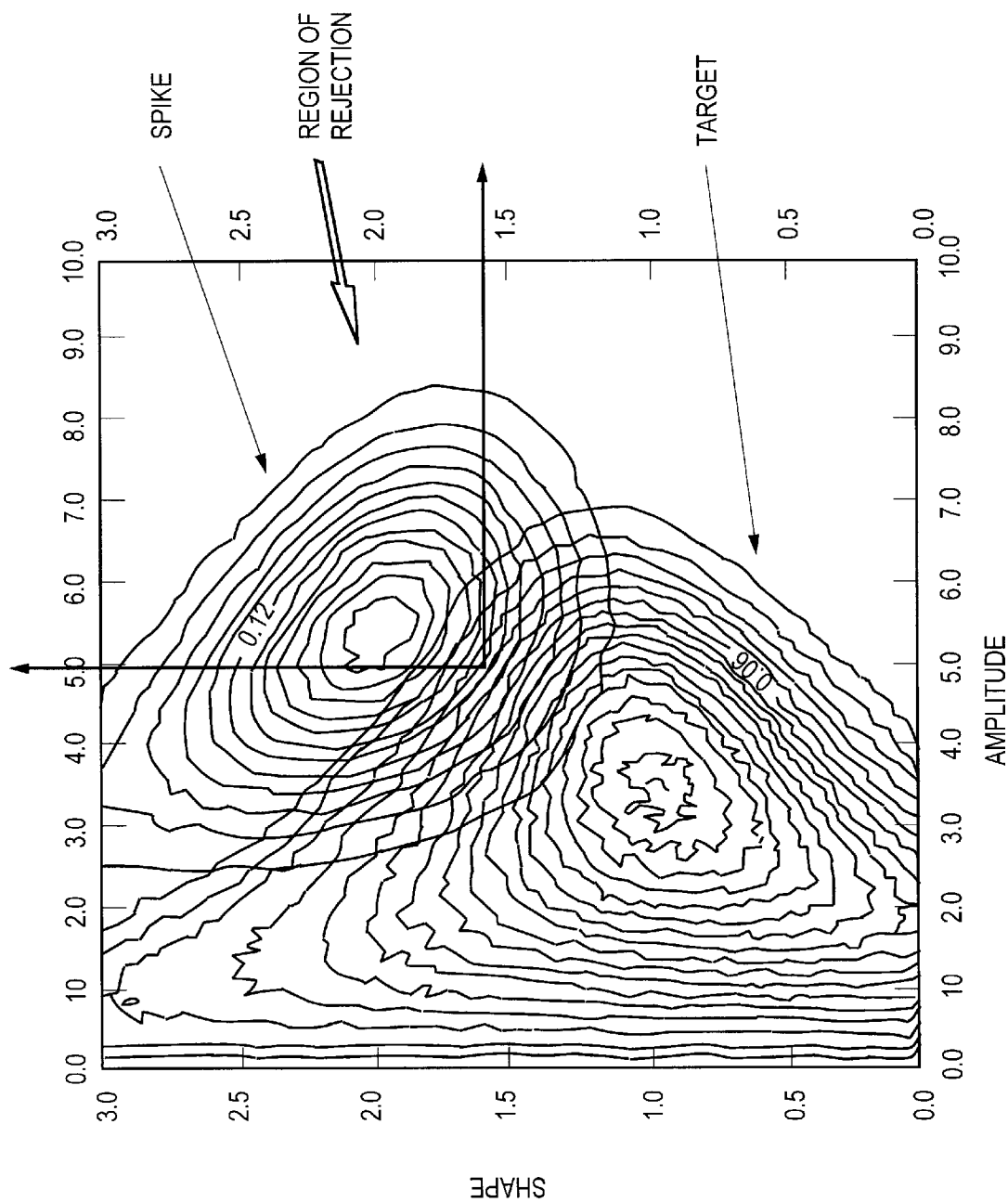
FIGS. 3C, 3D and 3E are graphs showing the simulated spike deletion performance of the spike deletion algorithm.
Figure 3D:
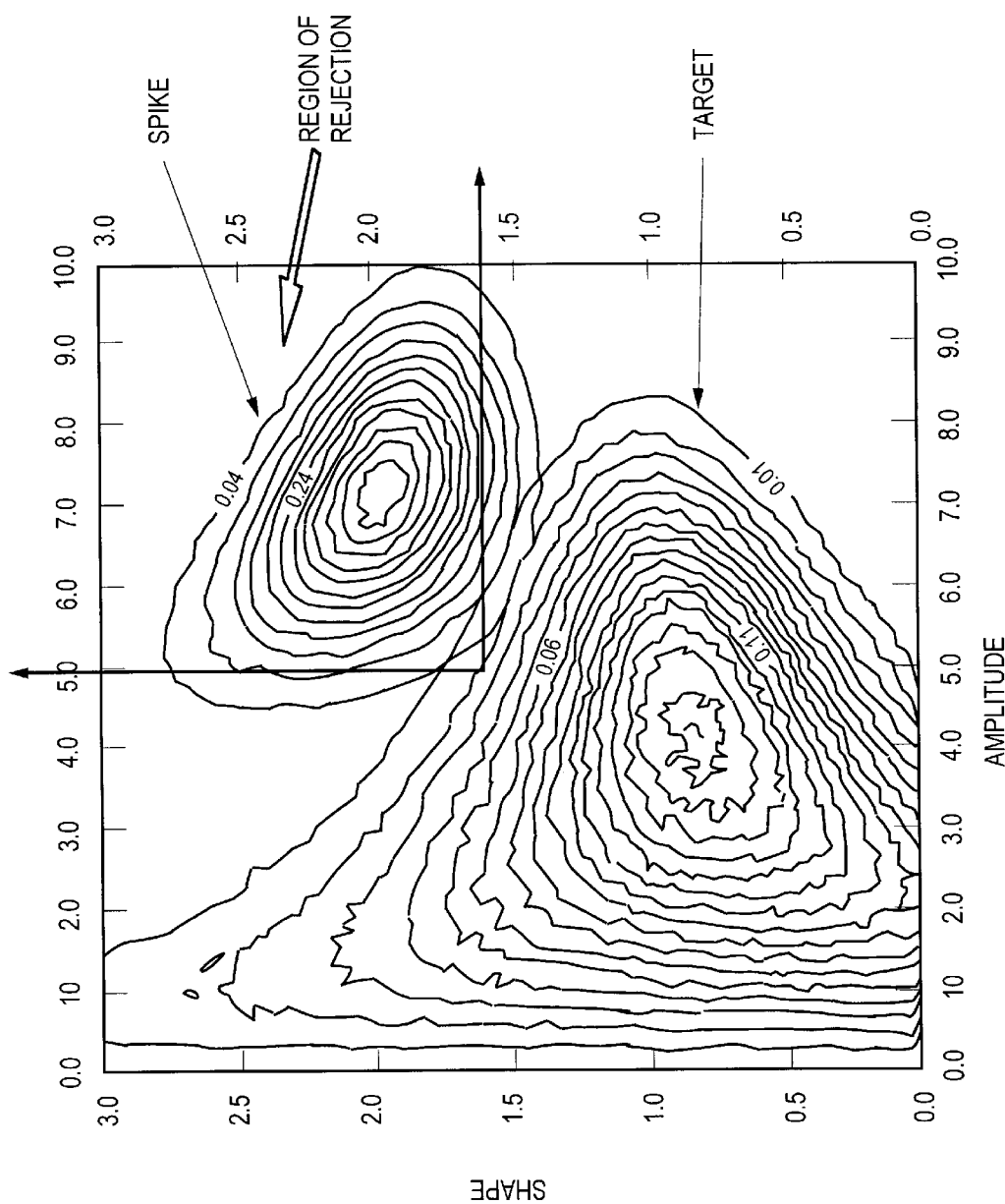
Figure 3E:
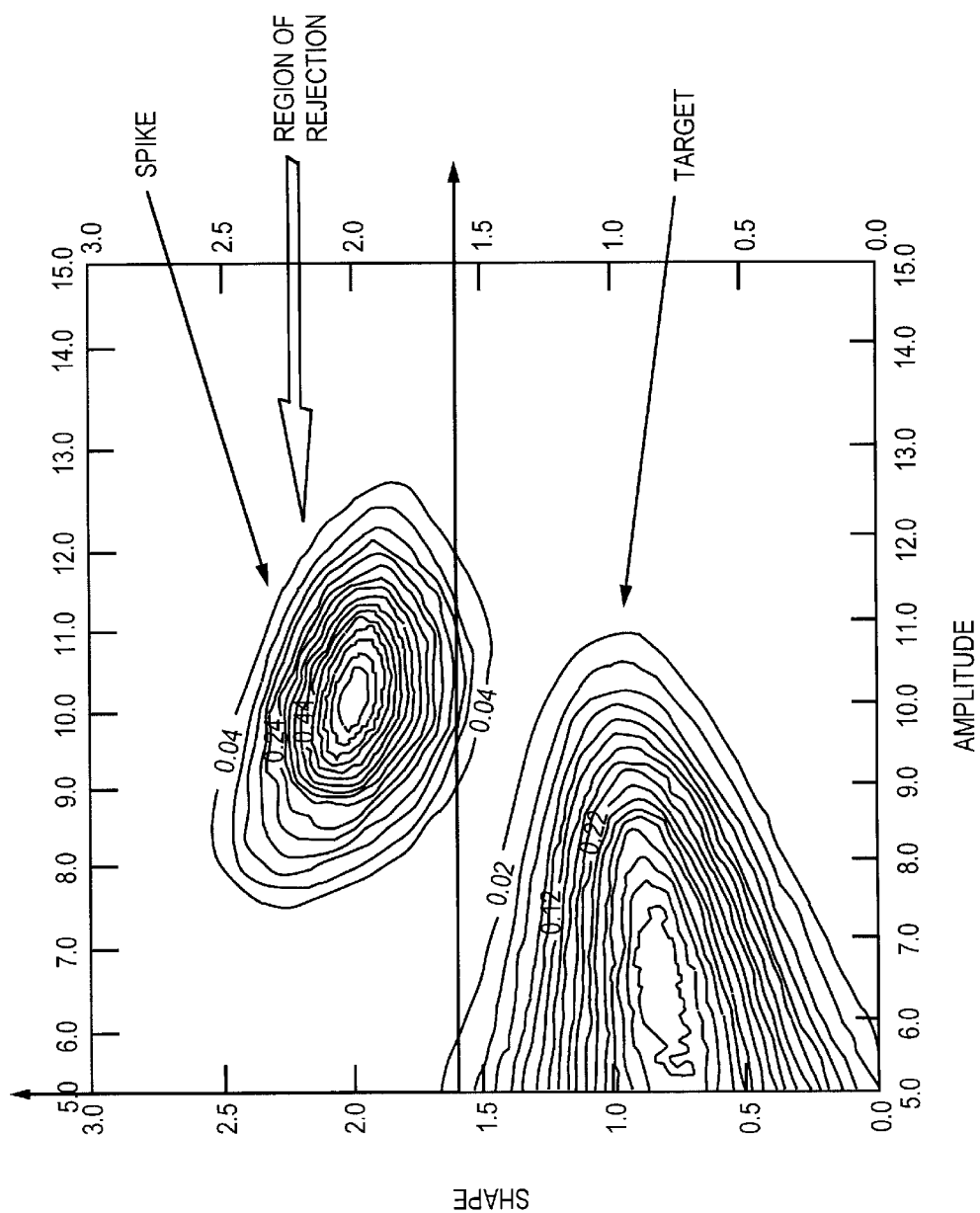

FIGS. 3C, 3D and 3E show the simulated spike deletion performance associated with these values. The spike rejection and leakage probabilities can be obtained by convolving these results with the spike amplitude probability density.

It can be seen that very few targets are lost to spike rejection, but low-amplitude spikes can be mistaken for targets. This phenomenon is typical of spike rejection algorithms: low amplitude spikes tend to leak through. Most of these will be eliminated either by (1) the spike rejection test done by the ODP 43 as part of object classification, or (2) failure of the object motion test or track update.

The Spike Deletion algorithm 46 in a given SCA receives the following inputs:

$Z_{i,k,n}$=pixel value from ACQ Analog Signal Processor 34—from sample time i for row k, column n K=programmable shape threshold from ODP Tha=programmable amplitude threshold from ODP The Spike Deletion algorithm 46 outputs the following values:

$Z_{i,k,n}$=Spike-tested pixel value at time i for row k, column n

The Spike Deletion algorithm 46 uses the following equations:

$$S_i=Z_{i,k,n}-(Z_{i-2,k,n}+Z_{i+2,k,n})/2$$

$Z_{i,k,n}$ is uncontaminated if $S_i \leq$Tha else $V_{i,k,n} = 2Z_{i,k,n} - (Z_{i-1,k,n} + Z_{i+1,k,n})$ IF $V_{i,k,n} > S_{i,k,n} \times K$ then $Z_{i,k,n}$=Spike, otherwise, $Z_{i,k,n}$ is uncontaminated
where K is a programmable constant.

If a sample is spike-contaminated, the sample is replaced by an average value of adjacent samples, $$Z_{i,k,n} = \frac{Z_{i-1,k,n} + Z_{i+1,k,n}}{2}.$$

The Spike Deletion algorithm 46 maintains at least 12 bits of precision for the raw detector data, Z. The spike threshold K is at least 8 bits wide with 3 bits to the left of the binary point and 5 bits of fraction (0<K<7.96875).

The spike deletion threshold is programmable by the ODP 43. The Acquisition Sensor TDP 40 provides the capability for the ODP 43 to disable the Spike Deletion algorithm 46 such that the raw data is "passed through" the Spike Deletion algorithm 46.

Pixel data output from the Spike Deletion algorithm 46 is next fed to an Acquisition Rate Restore algorithm 48. The Acquisition Rate Restore algorithm 48 normalizes the sample per dwell rate, which is inversely proportional to the FPA elevation angle of each sensor chip assembly 39. Due to the circular scanning motion of the FPA 35, detectors closer to the nadir see a slower scan velocity than those further from the nadir.

The Acquisition Rate Restore algorithm 48 receives the following inputs:

$Z_{i,k,n}$=Spike-tested pixel value at a time i for row k, column n i to j ratio=Programmable value from ODP The Acquisition Rate Restore algorithm 48 outputs the following values:

$Z_{J,k,n}$=Rate-restored pixel value at time j for row k, column n

The Acquisition Rate Restore algorithm 48 uses a variable rate co-adder function that takes the high rate Spike Corrected data (coming at fixed "i-time" rates) and converts it to a fixed number of samples per dwell on its output (existing at variable "j-time" rates). This is achieved by averaging a number of samples for a given detector and outputting the averaged sample value. The number of samples averaged is proportional to the velocity difference from the fastest moving detectors to the detector row in question.

The co-adder i time to j time reduction ratios are commanded by the ODP 43 as a function of SCA number (elevation) and nominal values are specified in Table I. The ratios shown in the table apply to the six SCAs in each spoke. SCA 1 represents the highest elevational position on the spoke.

TABLE I

Variable Rate Co-adder i Time to j Time Reduction Ratio

| SCA # | Row Range | Actual i:j Ratio | # of Time Delay Integration Elements |
|---|---|---|---|
| 1 | 0–759 | 1:1 | 2 |
| 2 | 0–759 | 1:1 | 2 |
| 3 | 0–759 | 1:1 | 2 |
| 4 | 0–759 | 1:1 | 2 |
| 5 | 0–759 | 2:1 | 1 |
| 6 | 0–759 | 3:1 | 1 |

The 12-bit input data to the Acquisition Rate Restore algorithm 48 is summed to obtain a 13-bit number, preserving the least significant bit.

The Acquisition TDP 40 provides the capability for the ODP 43 to program the i to j reduction ratio for each SCA. This yields two groups of i to j reduction ratios per SCA. A rate restore override may be achieved by programming all i to j reduction ratios to 1.

Rate restored pixel data is next processed using a responsivity correction algorithm 50 that corrects for non-uniformity of detector gain. One responsivity coefficient, $A_{k,n}$, is stored for each detector. The Responsivity Correction algorithm 50 is implemented using the following equation:

$$X_{J,k,n} = A_{k,n} * Z_{J,k,n}$$

where $Z_{J,k,n}$ is the Rate-restored pixel value at time J for row k, column n, $X_{J,k,n}$ is the calibrated detector data at time J for row k, column n and $A_{k,n}$ is the responsivity coefficient for detector k,n. $A_{k,n}$ is determined by flood testing, during which a calibrated source of radiation tuned to the frequency range of the detectors floods the entire focal plane. The responsivity correction algorithm 50 also allows mapping out of dead detectors. If a detector is dead, it is flagged by using a responsivity coefficient of zero and by setting a Dead Flag to a high setting.

Bit widths for use in the responsivity correction algorithm are as follows: Uncalibrated detector data, $Z_{k,n(j)}$, is a 13-bit unsigned integer. The detector responsivity coefficient $A_{k,n}$ is an 8-bit unsigned fraction that is always less than 1.0. Calibrated detector data, $X_{k,n(j)}$, is a 13-bit unsigned fixed point number with 12 bits to the left of the binary point and one fractional bit.

The Acquisition Sensor TDP 40 provides capability for the ODP 43 to program each responsivity coefficient $A_{k,n}$ stored in memory. Also, the responsivity correction algorithm 50 may be disabled by the ODP 43 such that data is "passed through" to a time delay integration (TDI) algorithm 52 without modification.

The TDI algorithm 52 is used to increase the signal to noise ratio (SNR) of the observed scene data. As commanded by the ODP 43, the Acquisition TDP 40 is capable of executing a first TDI mode, TDI×1, or a second TDI mode, TDI×2. The control over which TDI mode is executed is performed on an SCA by SCA basis. The circular scan across the 2-spoke FPA 35 causes the detectors at the outer edge of the scan to experience a faster scan velocity than those at the inner edge of the scan. Consequently, the ODP 43 commands an SCA-dependent sample spacing between detectors in a TDI set. Table II sets forth a list of TDI×2 sample spacings.

TABLE II

| SCA # | Delay |
|---|---|
| 1 | 4 |
| 2 | 5 |
| 3 | 6 |
| 4 | 7 |
| 5–6 | N/A-TDI × 1 |

The TDI algorithm 52 receives the following inputs:

$X_{J,k,n}$=Calibrated detector data at time J for row k, column n (13-bit number)

Dead Flag$_{J,k,n}$=flag indicating if $X_{J,k,n}$ is a dead detector TDI Sample Spacing Delay=Delay between elements in a TDI set—programmable by the ODP 43 (at least a 3-bit number corresponding to a maximum rate restore of eight rate restored frames)

The TDI algorithm 52 outputs a TDI sum, $X_{J,k}$ (a 14-bit number), for row k at time J.

TDI×2 is implemented by time-delaying the leading detector in a TDI set by the number of samples shown in Table II and adding it to the lagging detector in the TDI set. TDI×1 is implemented by multiplying the selected column detector by 2. If a detector sample's dead flag is set, its value is not used in determining the TDI result. TDI×2 results based on only one good sample are multiplied by two prior to output.

Because the sensor chip assemblies 39 on the scanning acquisition sensor 22 are constructed with a lateral offset between even and odd rows of detectors, TDI results from even rows of detectors occur at different times than TDI results from odd rows of detectors for the same object. Therefore, the Acquisition Sensor TDP 40 performs a Half Sensor Chip Assembly Alignment (HSCA) algorithm 54 to compensate for the row offset by taking the early TDI results and delaying them so that they are time aligned with the late results.

The HSCA algorithm 54 receives the following inputs:

$X_{J,k}$=TDI sum at time J for row k HSCA Sample

Spacing Delay=Delay between half-SCA columns—ODP programmable

The HSCA algorithm 54 outputs the following values:

$Z_{J,k}$=HSCA delayed output at time J for row k.

The HSCA algorithm 54 stores the leading half-SCA TDI results for a programmable number of sample delays. The HSCA algorithm 54 then outputs the stored data in time alignment with the lagging half-SCA TDI results. The HSCA delay, as commanded by the ODP, varies as a function of detector row to correct for the circular scan effect. Table III shows typical values. The HSCA algorithm 54 does not change the bit width of the data.

The Acquisition Sensor TDP 40 provides the capability for the ODP to program the HSCA sample spacing delay in twelve groups of 64 detectors for each SCA. This yields twelve HSCA delay values per SCA (the last group contains only 56 rows). The Acquisition Sensor TDP 40 provides the capability to disable the HSCA algorithm 54, i.e., the HSCA algorithm 54 acts as a "pass through" function when disabled.

TABLE III

HSCA Delays

| SCA # | Row Range | Delay |
|---|---|---|
| 1 | 0–319 | 12 |
| 1 | 320–759 | 13 |
| 2 | 0–63 | 13 |
| 2 | 64–447 | 14 |
| 2 | 448–759 | 15 |
| 3 | 0–319 | 16 |
| 3 | 320–575 | 17 |
| 3 | 576–759 | 18 |
| 4 | 0–255 | 19 |
| 4 | 256–383 | 20 |
| 4 | 384–575 | 21 |
| 4 | 576–703 | 22 |
| 4 | 704–759 | 23 |
| 5 | 0–383 | 8 |
| 5 | 384–703 | 9 |
| 5 | 704–759 | 10 |
| 6 | 0–383 | 7 |
| 6 | 384–639 | 8 |
| 6 | 640–759 | 9 |

Output data from the HSCA algorithm 54 is sent to an Adaptive Background Filter (ABF) algorithm 56.

Matched filtering in the presence of noise and an unknown background (clutter) can be treated as the problem of simultaneously estimating an object peak amplitude and the background upon which it is superimposed. The background can be treated as a constant if the filter length (averaging time) is always less than the clutter autocorrelation length. Alternatively, a clutter adaptive matched filter would adjust the filter length so as to correspond to the perceived clutter statistics: a short filter length would be used for high-frequency clutter and a long filter length would be used for low frequency clutter.

The one-dimensional (along scan), maximum likelihood estimate of the peak amplitude of a target, which is at the center of the averaging interval and superimposed upon a constant background, is $$\hat{a} = \left(\sum_{i=1}^{N} T_i Z_i\right) / \left(\sum_{i=1}^{N} T_i^2\right)$$

where
i=Sample index
$Z_i$=Detector output $$T_i = \text{Tap weight}$$
$$= \left(f_i - \sum_{i=1}^{N} f_i / N\right)$$

$f_i$=Pulse shape value
N=Filter length

This is an unbiased estimate. In particular, the unknown background does not affect â because the sum of the tap weights is zero. i.e., $$\sum_{i=1}^{N} T_i = 0$$

This filter would be successively centered at each sample time to test the hypothesis that a target is present at that sample. A target detection is registered when an â is found to be above a detection threshold. The target peak position which is near the position of the peak â is later found by interpolation in the Parabolic Pulse Match Interpolation algorithm 74. Assuming that a constant background is sampled at a two-sample-per-dwell rate, the signal-to-noise ratio (SNR) gain of the matched filter is (approximately)

$$SNR\ GAIN = \left(\sum_{i=1}^{N} T_i^2\right) = \left[1.5 - \frac{4}{N}\right]^{1/2}$$

where it has been assumed that the pulse shape samples are $$[0, \ldots 0, 1/2, 1, 1/2, 0, \ldots 0]$$

Figure 3F:
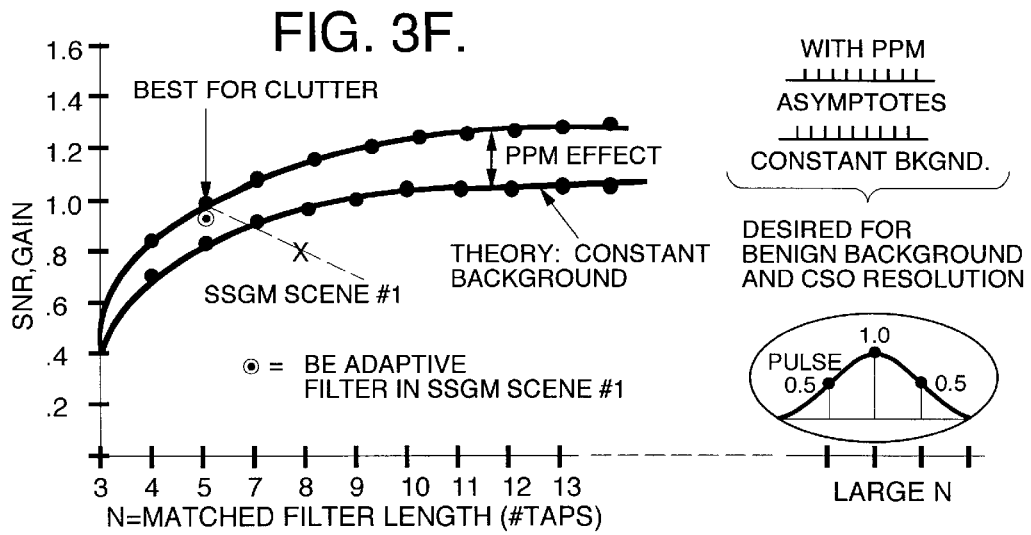
FIG. 3F is a graph depicting in-scan matched filter gain versus filter length.

FIG. 3F shows that a large loss of SNR gain occurs when N is made small in order to deal with high-frequency clutter. It is also true that small values of N will tend to ruin CSO resolution performance in the presence of a benign background, because clumps of CSO's look like clutter. Thus, a clutter adaptive matched filter is needed to deal with both severe clutter and a benign background.

A sub-optimal matched filter is obtained by estimating the background with only the (N−3) data samples outside the span of the pulse. The amplitude estimate for an object centered on sample time j then becomes $$\hat{a} = \left[\sum_{i=-1}^{+1} f_i(Z_i - \hat{b})\right] / (f_1^2 + f_2^2 + f_3^2)$$

where, assuming that N is odd.

$$\hat{b} = \left[\sum_{j=-(N-1)/2}^{(N-1)/2} Z_j - (Z_{-1} + Z_0 + Z_1)\right] / (N-3)$$

The sum of the tap weights is again zero, i.e., $$(f_1+f_2+f_3)[1-(N-3)/(N-3)]=0$$

and $$\text{SNR GAIN}=\{1.5/[1+4/(1.5) (n-3)]\} \cong \text{Optimal gain}$$

An advantage of this filter is that the matched filter scale factor does not depend upon N.

The most severe clutter background would call for the, minimum filter length, N=5. The background estimate at any sample time i then becomes the average of Z(i−2) and Z(i+2). In order to treat the N>5 case, it is reasonable to abandon the constant background assumption and instead assume that the clutter is a discrete, Markoff process of the form $$X(i)=C(i-1)X(i-1)+W(i)$$

where $$X(i)=0.5[\text{Background}(i+2)+\text{background}(i-2)]$$

$$C(i-1)=\text{spatially-varying correlation coefficient}$$

A recursive, one-sided, estimate of the background (i.e., past data only) then becomes $$B(i)=K(i-1)B(i-1)+0.5[1-K(i-1)][Z(i-2)+Z(i+2)]$$

where K(i−1) is the filter constant. It is shown as a function of (i−1) to indicate that, with a one-sample lag, the filter constant is to be updated to adapt to the effective clutter correlation length. K should go to zero in severe clutter and become large in benign clutter.

Figure 3G:
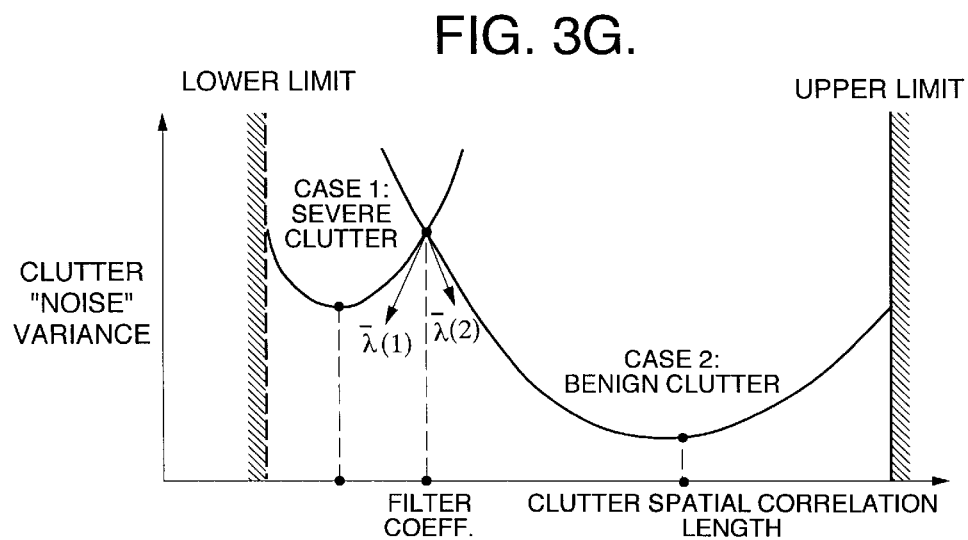
FIG. 3G is a graph illustrating adaptive filtering by the method of steepest descent.

Widrow's method of adaptive filtering (see B. Widrow, and S. D. Searns, *Adaptive Signal Processing*, Prentice-Hall (New Jersey, 1985)) will be used to cause the background filter constant to follow the spatial correction coefficient. The essential idea is that the average sum-of-squares (SOS) of background data residuals is treated as a performance index to be minimized by an iteratively-applied, steepest-descent optimization procedure (FIG. 3G). An alternative "optimal filtering" algorithm would use a priori knowledge of clutter statistics to go directly to the best filter coefficient by setting the derivative of the SOS equal to zero. An important advantage of Widrow's method is that a priori knowledge of clutter statistics is not required.

The present form of the background filtering algorithm is implemented by calculating a recursive-filter estimate of SOS, and the derivative of SOS, at every sample time. The background filter coefficient is then adjusted according to (See FIG. 3H)

$$K(\text{new})=K(\text{old})+(\text{small constant})*(\text{SOS derivative})$$

subject to the constraint $$(\text{Min value}) \leq K \leq (\text{Max value})$$

FIG. 3G is a cartoon view of the superposition of two cases, where a given filter coefficient can move toward a larger value (benign clutter) or a smaller value (severe clutter).

Figure 3H:
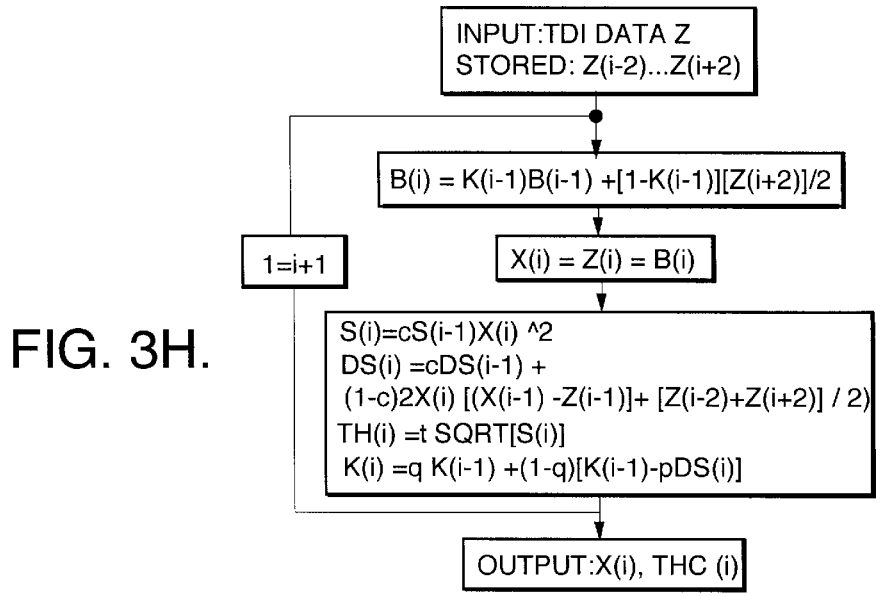
FIG. 3H is a flow diagram depicting an adaptive background subtraction and thresholding method in accordance with the present invention.
Figure 3I:
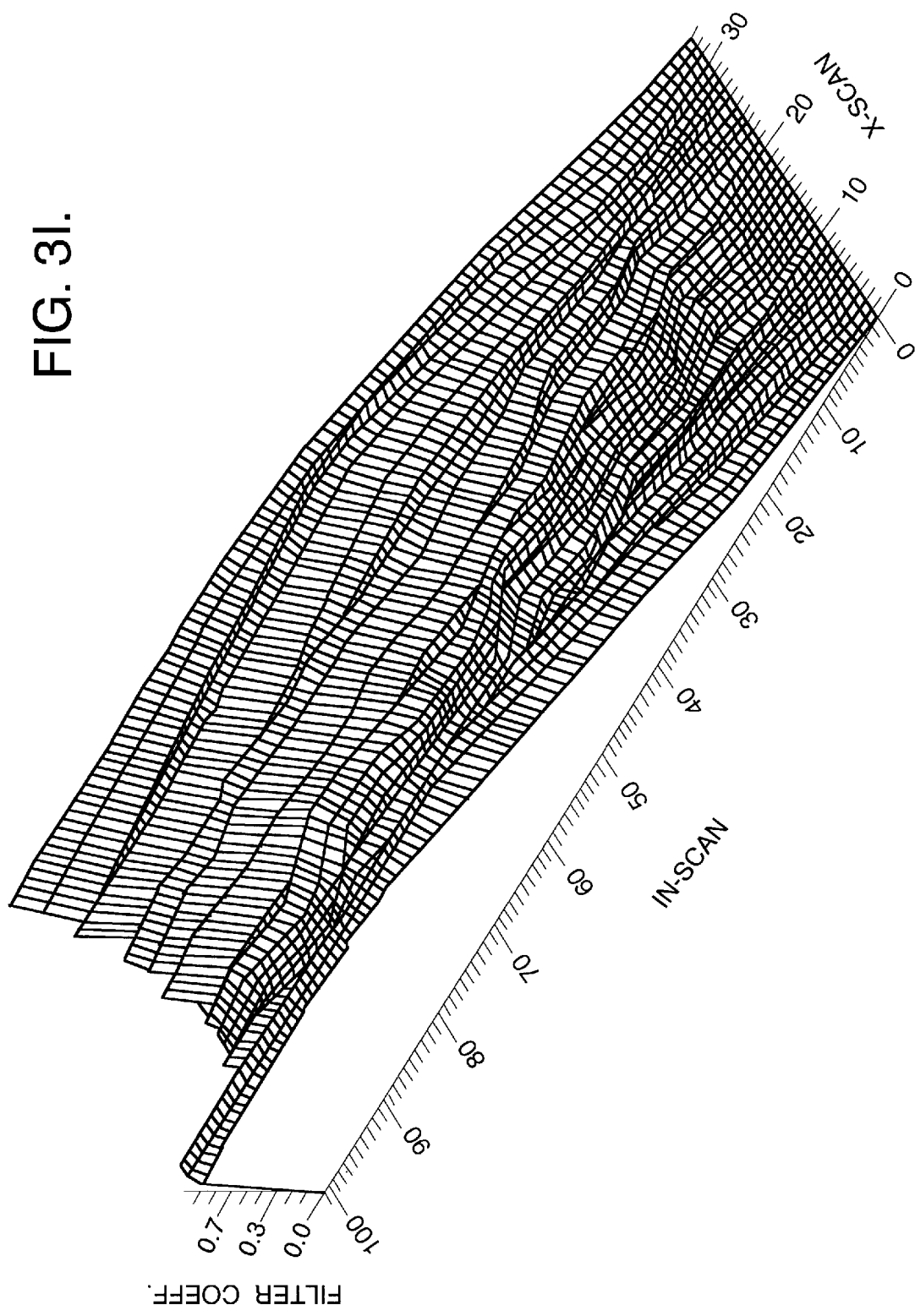
FIG. 3I is a graph showing a sample background filter coefficient function.
Figure 3J:
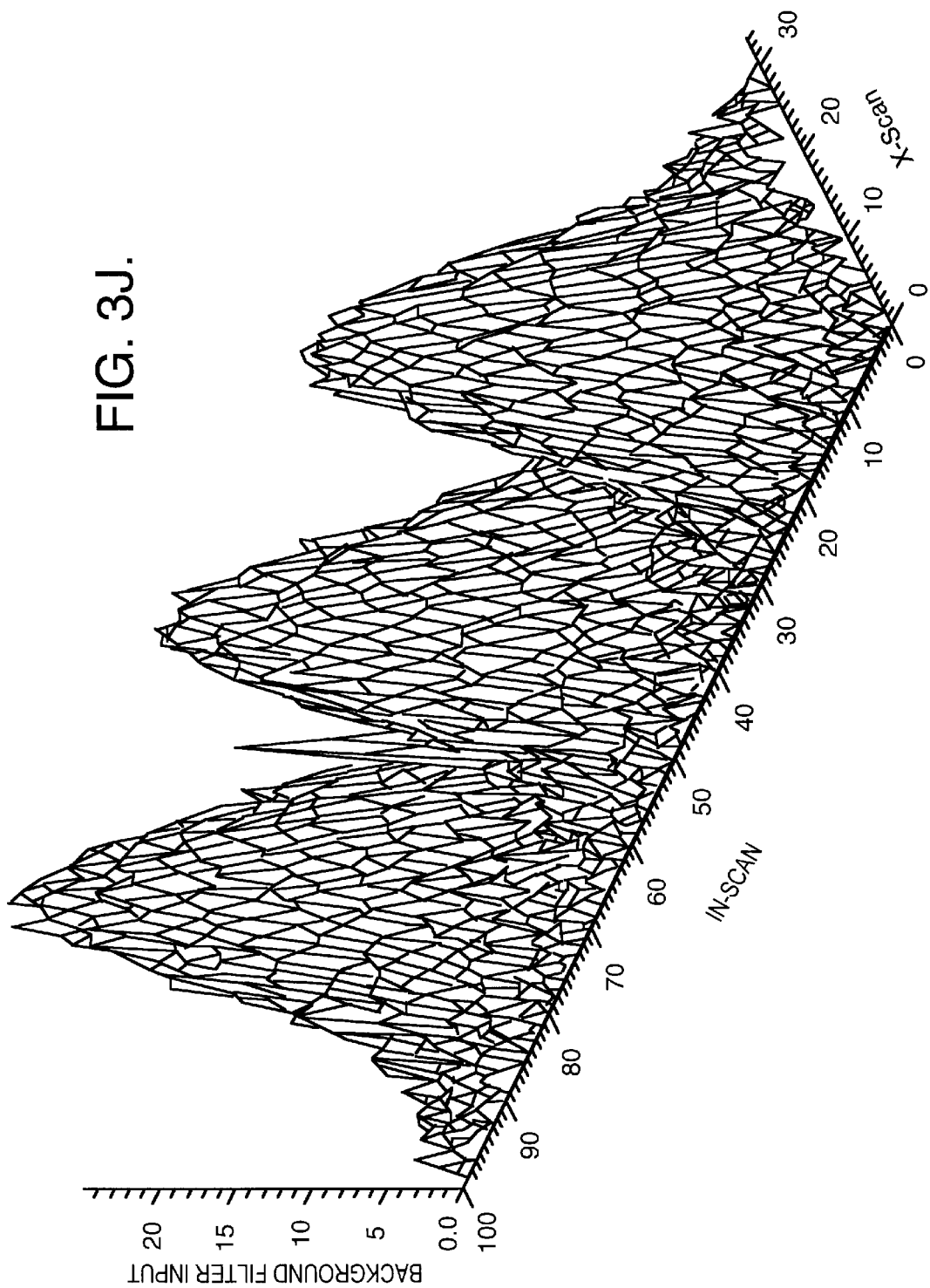
FIG. 3J is a graph showing a sample background filter input function.
Figure 3K:
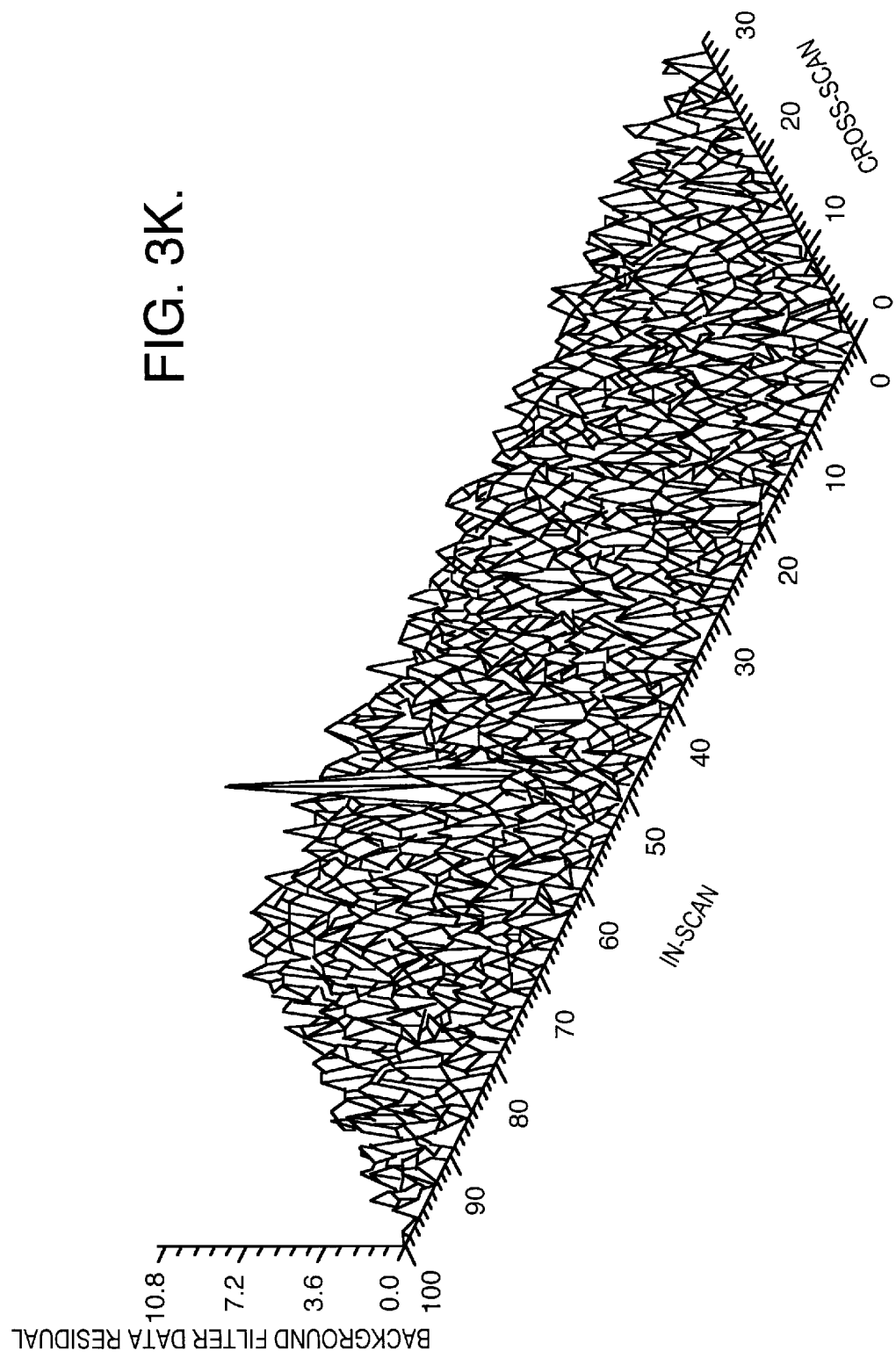
FIG. 3K is a graph showing a sample background filter output function.

FIG. 3I shows simulated behavior of the background coefficient as it responds to a two-dimensional, noisy, half-sine wave of amplitude variation containing a target object (FIG. 3J). This background can be interpreted as a piece of a lumpy ridge superimposed on an otherwise constant scene. The flat floor in the center of FIG. 3I is the region where the filter coefficient hits the lower bound, attempting to counter-the peak of the noisy ridge. The upper bound of the filter coefficient (63/64) is attained at the left corner of FIG. 3I, where the background is almost constant. The resulting background data residuals are shown in FIG. 3K. Sample results from processing SSGM Scene #1 are shown in FIG. 3L.

Adaptive Thresholding

Figure 3M:
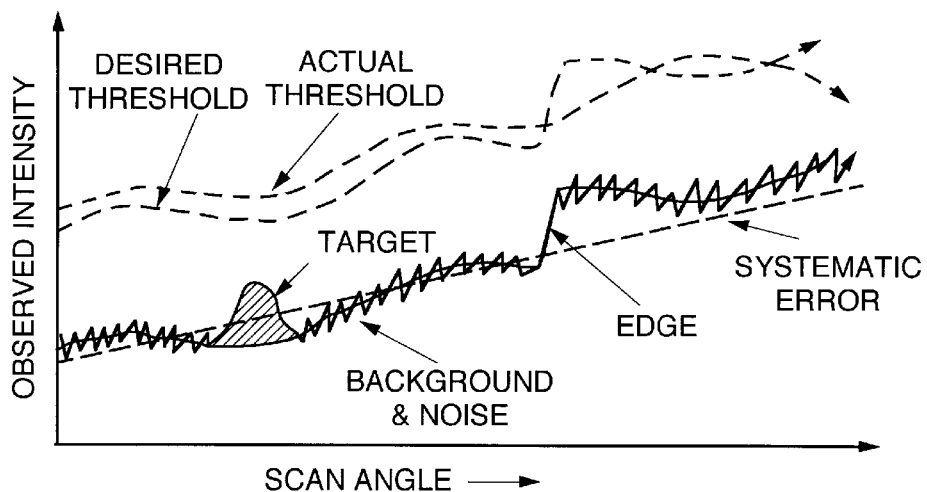
FIG. 3M is a graph illustrating the adaptive threshold problem.

BTH operation must deal with variations in clutter statistics as the sensor observes different regions of the earth. Features such as BTH clutter edges, and systematic background variations from off-axis earth limb radiation in ATH operation, can also cause significant background-following errors. A detection threshold set at some fixed number of amplitude units above the estimated background could allow excessive false alarms or cause missed target detections (FIG. 3M).

The Adaptive Background Filter algorithm 56, described above, has been augmented to provide an estimate of the effective background residual noise variance(s) for the purpose of adaptive thresholding (FIG. 3H). The ODP 43 will specify $$t = \text{Threshold setting in "sigma" units}$$

so that $$T = (\text{Adaptive detection threshold}) = (t) * \sqrt{S}$$

Calculating the square root of a number can be a computationally expensive task. Instead, the square root of S will be obtained by multiplying the absolute value of S by a constant. For example, this constant of proportionality is $\sqrt{2}$ divided by $\sqrt{\pi}$ for a Gaussian random variable. In general, the constant is determined by simulation.

The threshold will be applied to a two-dimensional matched filter output (in-scan and cross-scan) by combining data from each row of the FPA 35, which are spaced a half-pixel apart after half SCA alignment. Thus, a threshold exceedance is declared in detector row k at sample time j if $$\hat{a}(j,k)+0.5[\hat{a}(j+1,k)+\hat{a}(j-1,k)] \leq \text{threshold}(j,k)$$

where â denotes a matched filter output. The [0.5, 1, 0.5] pulse shape rule has been again used in the cross-scan direction. The three matched filter outputs corresponding to a threshold exceedance are sent individually to the ODP 43, rather than being combined into a single, two-dimensional matched filter output, so that half-SCA misalignment effects can be corrected by the ODP 43.

FIG. 3H shows that combined operations of adaptive background estimation, background subtraction, and adaptive threshold calculation. The variables are:

i: Rate-restored sample time index
Z: Rate-restored TDI data
B: Back-round estimate
K: Averaging coefficient of background estimate
X: Data residual
S: Sum-of-squares of data residuals
DS: Derivative of S with respect to K
TH: Threshold
c: Averaging coefficient of S and DS
t Threshold coefficient from ODP
p: Fraction of DS used for background coefficient update
q: Averaging coefficient of K The adaptive threshold is used to determine whether or not an object seen by-the sensor is bright enough to be passed on to the ODP 43. The $S_i$ value is used as an index into a look-up table to generate the desired threshold for the current sample.

The ODP 43 may want to override the adaptive threshold in certain circumstances. It does so by loading in an override threshold and activating the Enable Override input (through the TM bus). The look-up table is completely programmable from the TM bus.

The Acquisition Sensor TDP 40 outputs strips of threshold exceedances which are in "target windows" specified by the Target Tracker 108. These are sent directly to the Target Tracker 108, which has previously calculated these windows for Selected threat objects in the field-of-regard. Single-object velocity-matched filtering on CSO resolution is then performed.

The ABF algorithm 56 serves as a high pass filter to incoming data, removing low-frequency photon background noise and detector DC bias. The ABF algorithm 56 uses an adaptive background estimation algorithm using the method of steepest descent to minimize variance of the background substraction error. The ABF algorithm 56 monitors residual noise after subtracting the background estimate from the input signal. The rate of change of the residual noise is used to adjust the background estimate in such a fashion as to minimize residual noise.

The ABF algorithm 56 receives the following inputs:

$Z_{J,k}$=HSCA delayed output at time J for row k.

ABF Parameters=ODP programmable parameters

The ABF algorithm 56 outputs the following value:

$X_{J,k}$=Background-subtracted output at time J for row k.

The ABF algorithm 56 uses the following equations:

$$X_{J,k} = [(Z_{J,k} - Z_{J-1,k}) + (Q_{J-1,k} X_{J-1,k})] - \left[[1 - Q_{J-1,k}]\left[\left(\frac{Z_{J-2,k} + Z_{J+2,k}}{2}\right) - Z_{J-1,k}\right]\right]$$

$$DS_{J,k} = [(1-c)DS_{J-1,k}] + \left[(cX_{J,j})\left[X_{J-1,k} + \left[\left(\frac{(Z_{J-2,k} + Z_{J+2,k})}{2}\right) - Z_{J-1,k}\right]\right]\right]$$

$$DS_{J,k} = \text{MIN}\{U, \text{MAX}[-U, DS_{J,k}]\}$$

$$Q_{J,k} = Q_{J-1,k} - \frac{1}{8}\left(p\sum_{x=-4}^{x=3} DS_{J,k+x}\right)$$

where, $Z_{J,k}$=Background Filter input for frame time J (13 Bits, all integer, unsigned).

$X_{J,k}$=Background Filter output for frame time J (14 Bits, all integer, signed).

$Q_{J,k}$=Background Filter time constant computed for frame time J (8 Bits, all fraction, unsigned).

$DS_{J,k}$=Derivative of running sum square of data residuals (8 Bits, all fraction, signed).

p=Coefficient of Background Filter time constant update (8 Bits, all fraction, unsigned).

c=Derivative time constant (8 Bits, all fraction, unsigned).

k=row index x=row index increment

DS is clamped to ± U. where U comes from the ODP 43. Also, $Q_{J,k}$ is always clamped between 0 and 1.

The ABF algorithm 56 provides a clamping capability by disabling the updates of $Z_{J,k}$, $X_{J,k}$ and $DS_{J,k}$. This feature is necessary for Closely Spaced Object (CSO) resolution by not allowing target data to contaminate the background estimate when CSOs are present. It can also be used for special purposes such as flood testing. Clamping of the ABF algorithm 56 is performed when the input sample's Bad Flag is set, or if requested by the ODP 43. The quantities Q, X and DS are initialized by the ODP 43.

The ABF algorithm 56 provides a capability of the ODP 43 to configure its operation. For each SCA, the ABF algorithm 56 allows the ODP 43 to program unique constants c, p, and U. The ABF algorithm 56 provides the capability of the ODP 43 to override the operation of the ABF algorithm 56 in one of three different ways: 1) the ABF algorithm 56 may be disabled in which case it acts as a "pass through" function; 2) the ABF algorithm 56 may be clamped at the current background estimate and each row would clamp to its own unique value; or 3) the Acquisition Sensor TDP 40 may provide the capability for the adaptive feature of the ABF algorithm 56 to be disabled by the ODP 43 in which case the ODP 43 provides the time constants, Q. If the adaptive feature of the ABF algorithm 56 is disabled, the ABF algorithm 56 provides the capability for the ODP 43 to program twelve background filter time constants (Q) for each SCA.

Data output from the ABF algorithm 56 is next processed by an in-scan matched filter algorithm 58, that comprises a three-tap finite impulse response digital filter to increase the signal to noise ratio of the data. The in-scan matched filter algorithm 58 convolves data in the in-scan direction using a set of fixed tap weights. The tap weights are hard wired at 1-2-1, which are approximately proportional to the detector-convolved spread function values at two samples-per-dwell when an object is centered. Phasing effects are treated in the ODP 43 using a Parabolic Pulse Match algorithm 74, described in further detail below.

The In-Scan Matched Filter algorithm 58 receives the following inputs:

$X_{J,k}$=Background-subtracted output at time J for row k.

The In-Scan Matched Filter algorithm 58 outputs the following value:

$MF_{J,k}$=Filter output-at time J for row k.

The In-Scan Matched Filter algorithm 58 is implemented as follows:

$$MF_{J,k} = X_{J-1,k} + 2X_{J,k} + X_{J+1,k}$$

The input to the In-Scan Matched Filter algorithm 58 are 14-bit, signed integers. The output of the In-Scan Matched Filter algorithm 58 are rounded to 15-bit, signed integers.

There are no programmable parameters required for the In-Scan Matched Filter algorithm 58. The Acquisition Sensor TDP 40 provides the capability to disable the In-Scan Matched Filter algorithm 58, i.e, the In-Scan Matched Filter algorithm 58 acts as a "pass through" function when disabled.

Data output from the in-scan matched filter algorithm 58 is next fed to a Cross-Scan Matched Filter algorithm 60, also having tap weights hard-wired at 1-2-1, as follows:

The Cross-Scan Matched Filter algorithm 60 receives the following inputs:

$MF_{J,k}$=In-Scan Filter output at time J for row k.

The Cross-Scan Matched Filter algorithm 60 outputs the following value:

$XMF_{J,k}$=Cross-Scan Filter output at time J for row k.

The Cross-Scan Matched Filter Algorithm 60 is implemented as follows:

$$XMF_{J,k} = MF_{J,k-1} + 2MF_{J,k} + MF_{J,k+1}$$

The inputs to the Cross-Scan Matched Filter algorithm 60 are 15-bit, signed integers. The output of the Cross-Scan Matched Filter algorithm 60 are rounded to 16-bit, signed integers.

There are no programmable parameters required for the Cross-Scan Matched Filter algorithm 60. The Acquisition Sensor TDP 40 provides the capability to disable the Cross-Scan Matched Filter algorithm 60, i.e., the Cross-Scan Matched Filter algorithm 60 acts as a "pass through" function when disabled.

Data is next fed to an Adaptive Threshold algorithm 62 that is used during generation of peak packets to determine whether or not an object seen by the scanning acquisition sensor 22 is bright enough to be passed on to the ODP 43.

The threshold value is set by the ODP 43 as a number of sigmas (residual noise standard deviation). The Adaptive Threshold algorithm 62 calculates the instantaneous sigma noise level that is then multiplied by a constant threshold multiplier to generate a final threshold value. After the final threshold value is generated, the cross-scan matched filtered samples are compared to the final threshold value. For samples that exceed the final threshold value, a hit flag is set.

The Adaptive Threshold algorithm 62 receives the following inputs:

$XMF_{J,k}$=Cross-Scan Filter output at time J for row k.

$Y_{max}$=ODP Programmable Upper Clamping limit for $XMF_{J,k}$ q=ODP Programmable Adaptive Threshold proportionality constant α=ODP Programmable threshold multiplier in sigma units The Adaptive Threshold algorithm 62 outputs the following data:

$S_{J,k}$=Sigma noise for time J for row k.

$Hit_{J,k}$=Exceedance flag for time J for row k

The Adaptive Threshold algorithm 62 is implemented using the following equations:

$$S_{i,j} = (1-q)A_{j-1,k} + q\min(|XMF_{j,k}|, Y_{max})$$

$$Thresh_{j,k} = \frac{1}{8}\left(\alpha \sum_{x=-4}^{x=3} S_{j,k+x}\right)$$

If $XMF_{j,k} \geq$ Thresh then set $Hit_{j,k}$
Where, $Thresh_{j,k}$=Threshold value to compare to $XMF_{j,k}$ for Hit Flag generation.

k=Row index x=row increment

During the output of strips, the Adaptive Threshold algorithm 62 is not used. Instead, a fixed threshold is provided by the ODP 43 for each Window Request.

The following bit widths apply to the Adaptive Threshold algorithm 62:

$S_{j,k}$=8 bits: 5 bits integer, 3 bits fractional, unsigned $Y_{j,k}$=16-bit, signed integer $Y_{max}$=15-bit, unsigned integer q=8-bit, unsigned, all fractional α=8 bits: 4 bits integer, 4 bits fractional, unsigned Thresh=16-bit, unsigned 4-bit The Acquisition Sensor TDP 40 provides the capability for the ODP 43 to program one Adaptive Threshold proportionality constant, q, and multiple threshold multipliers. The threshold multiplier, α, is programmable in groups of sixty-four detectors for each SCA. This yields twelve α values per SCA (the last group contains only fifty-six rows). The Acquisition Sensor TDP 40 provides the capability to override the threshold, $Thresh_{J,k}$, in groups of sixty-four detectors for each SCA. This yields twelve $Thresh_{J,k}$ values per SCA (the last group contains only fifty-six rows). The Acquisition Sensor TDP 40 provides the capability for the ODP 43 to program an individual upper clamping limit, $Y_{max}$, for each SCA. The Acquisition Sensor TDP 40 provides the capability for the ODP 43 to override the Adaptive Threshold algorithm 62. Under these circumstances, the setting of Thresh is controllable from the ODP 43 and determines the amount of data that is passed to a Peak Detection algorithm 64.

The sigma noise and exceedance flag output from the Adaptive Threshold algorithm 62 are used by the Peak Detection algorithm 64. All of the detected peaks that have a corresponding cross-scan matched filtered sample threshold exceedance are reported to the ODP Clutter Tracker 98 in the form of peak packets.

Prior to peak detection, negative cross-scan matched filter data is clamped at zero. The Peak Detection algorithm 64 for a given pixel determines if the pixel is greater than its top three and immediate left neighbors and greater than or equal to its bottom three and immediate right neighbor. The pixel is labeled a peak if it passes this test. A three-by-three pixel peak packet is output to the ODP Clutter Tracker 98. Each three-by-three pixel packet comprises the positions and amplitudes of the peak pixel and its eight neighbors. The peak pixel has the six-bit sigma value, $S_{J,k}$, associated with it.

Based on the results of tracking peak detections, the ODP 43 sends a Window Request to the Aquisition Sensor TDP 40. This Window Request defines a fixed threshold and a rectangular region of interest within which any threshold exceedances are to be imported back to the ODP 43. At any given time, the ODP 43 maintains no more than one active window per SCA.

The signal processing for the data within a Window Request differs from that which is performed for peak detection. The differences are that the ODP 43 may optionally request that the InScan Matched Filter 58 be disabled and that the Adaptive Background Filter algorithm 56 be clamped for the entire extent of the window. It is important to note that no peak detections are performed and no Peak Packets are generated for data that resides within the Window Request region of the Field of view.

The strip packets reported to the ODP 43 comprise of target threshold exceedances and surrounding data. The Acquisition Sensor TDP 40 identifies vertical strips of a clump. Each strip is assigned a unique strip ID, and then the strip data and strip ID are reported to the ODP 43. The strip data are i, kmin, kmax, strip intensity mass, strip intensity first moment, strip ID, window ID, and break flag.

These are described as follows:

i=Column address of strip, 16 bits.

kmin=Start row address of strip, 10 bits.

kmax=End row address of strip, 10 bits.

Ai=Sum of pixel intensities within strip, 22 bits.

Yi=Sum of products of pixel intensities and k value, 22 bits.

strip ID=A unique ID for the strip, 16 bits.

window ID=A window ID, 16 bits.

break Flag=1 if hits in strip are broken by one or more spaces, 1 bit.

Note that the strip packets reported to the ODP 43 include data below threshold. The algorithm used to determine clump data operates on the principle of a 2 dimensional convolution of a 3×3 kernel with the threshold exceedances. As a result, for each threshold exceedance, a 30 Hit Packet is formed about the exceedance. The union of all the Hit Packets forms the set of data reported to the ODP 43.

The ODP 43 sends the Acquisition Sensor TDP 40 a window request which consists of a unique Window ID, Start and End Time, Start and End Row, and constant Threshold Value.

The ODP 43 may disable strip packets simply by not requesting any.

Peak detection is not performed for pixels within windows specified by a window request (see below). If, however, a peak is detected just outside of a requested window, then the pixels within the window which are part of the three-by-three peak packet are reported to the ODP 43 twice—once for the peak packet, and again as part of a strip packet for the window request. Each peak packet is expressed as ten 20-bit words.

For the purpose of getting threshold exceedance data for extended objects rather than only local peaks as determined by peak packets, a Window Request/Strip Generation algorithm 66 operates as follows:

Based on the results of tracking peak detections, the ODP 43 sends a window request to the Acquisition Sensor TDP 40. The Acquisition Sensor TDP 40 uses the window request to define a fixed threshold and a rectangular region of interest within which any threshold exceedances are reported back to the ODP 43. Peaks exceeding threshold within a window are identified. At any given time, the Acquisition Sensor TDP 40 is able to maintain at least two active window requests per SCA. The ODP 43 ensures that the window requests do not overlap. The Acquisition Sensor TDP 40 can maintain a queue of at least ten window requests per SCA from which the active windows are extracted. The Acquisition Sensor TDP 40 periodically passes queue status to the ODP 43 in order that the ODP 43 may continue to load the queue with new window requests during a scan. The ODP 43 also ensures that window requests are chronologically ordered.

The Window Request/Strip Generation algorithm 66 receives the following input:

$XMF_{J,k}$=Cross-Scan Filter output at time J for row k.

Window Request from the ODP

Peak Detection is not performed and peak packets are not generated for data that resides within the window request region of the field of view, except for peaks detected just outside of a window. Instead, Strip Packets are reported to the ODP 43 as a result of a Window Request. The Window Request/Strip Generation algorithm 66 outputs strips to the ODP 43. Strips are vertical (cross-scan) slices of a clump (unresolved object). Strip Packets are comprised of positive Cross-scan Matched-Filtered data for threshold exceedances and their surrounding data. This data set is defined as a 2-dimensional 3×3 array, centered on the threshold exceedance. Thus, a 3×3 hit data packet is formed for each exceedance. The union of all the hit packets forms the set of strip data to be reported to the ODP 43. The strip data includes J-time, starting row address of the strip, pixel intensities, window ID, hit flag and break flag. The hit flag is set if there are one or more threshold exceedances in a strip. The break flag indicates if hits in a strip are broken by one or more spaces. Each strip packet is expressed as up to 768 20-bit words.

The Acquisition Sensor TDP 40 stores window requests sent from the ODP 43. Each window request consists of a unique window ID, start and end frame time, start and end row, and a constant threshold value.

Independent of a window request, the ODP 43 also sends a row zero offset for each of the six SCAs in each spoke for the Acquisition TDP 40. The kmin value in each strip packet has a minimum value equal to the row zero offset for the SCA in which the strip is found.

Operation of Tracking Sensor TDP

The Track sensor 28 is tasked to track targets that the Acquisition sensor 22 has acquired. The ODP 43 computes an error ellipse in order to define a window in which the target(s) of interest are expected to be. The window parameters, target velocity, and threshold values are sent to the Track Sensor TDP 42 from the ODP 43.

The TRACK sensor 28 observes the designated area for a fixed amount of time (the observation interval). Motion of the target and/or scene is allowed as long as the target stays in the FPA field of view during the observation interval. The Track Sensor TDP 42 performs a streak detection algorithm after the observation interval is over. The amplitude and position of any streak which exceeds an amplitude threshold is reported to the ODP 43.

Two motion compensation functions are performed, which give this sensor the unique ability to process scenes and targets which are moving at different rates, across the FPA. Apparent scene motion is registered to the background in the Scene Registration function of the Jitter Correction algorithm 72 discussed further below. Target motion relative to the focal plane is compensated in the Maximum Likelihood Streak Detection (MLSD) algorithm 68, where knowledge of object velocity across the FPA is used to coherently add background-subtracted detector samples along all possible object trajectories. Residual Scene Registration error is treated here. The background estimate used for background subtraction can be a temporal average or a spatial-plus-temporal average.

A special case of MLSD occurs when the object rate across the background is so low that motion relative to the background is negligible during an observation interval. For example, this, might occur during a quick look at an object in a high orbit. Background subtraction must then include spatial averaging of neighboring pixels in order to avoid canceling the target. The product of such an observation interval would be the equivalent of thresholded outputs of a fixed-tap-weight, matched filter, where the sum of the tap weights is equal to zero. Several observation intervals would be scheduled in this case, each separated by several seconds, and the MLSD task would be completed in the ODP 43.

Streak detection can also be done when the target velocity is unknown. The Track Sensor TDP 42 operates in a peak detection mode in this case, with track assembly and the consequent velocity estimation being done in the ODP 43. The velocity estimates derived by the ODP 43 can then be used to command the Track Sensor TDP 42 to perform MLSD with the stored background subtracted data. Sufficient memory capability is available in the Track Sensor TDP 42 to allow this type of iteration.

Figure 3N:
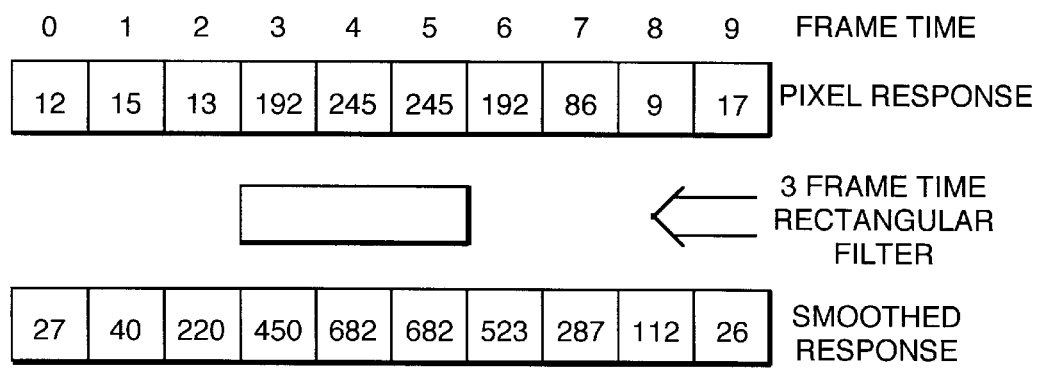
FIG. 3N is a diagram isllustrating peak processing for one pixel during a ten frame staring interval in accordance with the present invention.

The response for a given pixel in the requested window is smoothed in time by a rectangular filter with a programmable width between 1 and 5 frame times. The rectangular filter performs a convolution across the pixel's data for all of the frames in the staring interval. The peak, smoothed response is detected, and its value and corresponding frame time are written into the Peak Frame. For a contiguous set of smoothed responses which are equal in value, the frame for the first in the set is reported as the peak. FIG. 3N shows an example of how one pixel is processed over a 10 frame staring interval.

The Track Sensor TDP 42 thresholds the data in the Peak Frame, and reports threshold exceedances. The threshold test is only performed within the window requested by the ODP 43. Threshold exceedances and adjacent data are sent to the ODP 43 in the form of strip packets which contain peak smoothed pixel responses and corresponding frame times.

The Tracking Sensor 28 tracks targets that the Scanning Acquisition Sensor 22 has acquired, or which have been designated by a ground station, by another spacecraft, or by other means. The ODP 43 computes an error ellipse in order to define a window in which the target(s) of interest are expected to be. The ODP 43 sends window parameters, target velocity, filter coefficients, processing modes and a threshold value to the Tracking Sensor TDP 42. The Tracking Sensor 28 observes the designated area for a fixed amount of time (the observation interval, or stare period), preferably between about $\frac{1}{10}$th of a second and 16 seconds.

Figure 4:
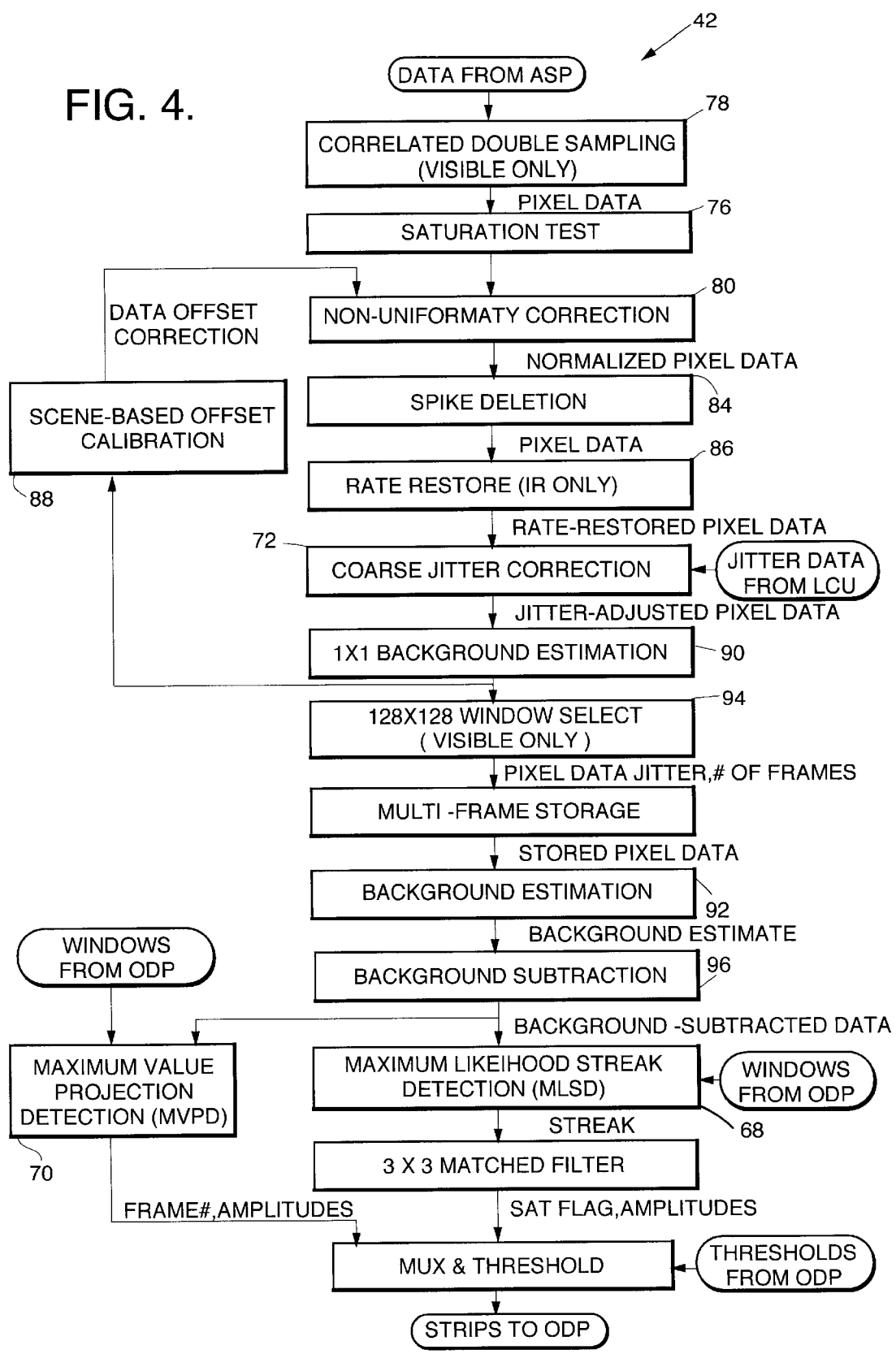
FIG. 4 is a flow diagram depicting the processing steps performed by a track sensor time dependent processor in accordance with the present invention.

Now referring to FIG. 4, Track Sensor FPA (IR and visible) data is collected by the Track TDP during the stare period and at the conclusion of the stare period, a Maximum Likelihood Streak Detection (MLSD) algorithm 68 (three-dimensional matched filter), described in detail below, is used to pick out what may be a dim target in severe clutter, that would be difficult or impossible to detect using prior systems. The amplitude and position of any streak which exceeds an amplitude threshold is reported to the ODP 43.

On rare occasions the target velocity is not well known. For example, a target divert maneuver could be applied between Acquisition Sensor 22 observations, or a ground station may command the Track Sensor 28 to execute an area search for an object of unknown velocity. In such cases, an alternative Maximum Value Projection Detection (MVPD) algorithm 70 is then used instead of the MLSD algorithm 68, with track assembly and consequent velocity estimation being done in the ODP 43. The velocity estimate derived by the ODP 43 is then used to command the Track TDP 42 to perform MLSD with the stored, background subtracted data. The Track TDP 42 has sufficient memory capability to allow this type of iteration.

The Track TDP 42 performs two motion compensation functions which gives the Track Sensor 28 the ability to process scenes and targets which are moving at different rates across the FPA. First, apparent scene motion can be registered to the background in a Jitter Correction algorithm 72, described in detail below. This capability is not used if the background is benign. Second, target motion relative to the focal plane is compensated in the MLSD algorithm 68, where knowledge of object velocity across the FPA is used to coherently add background-subtracted detector samples starting with all possible sub-pixel locations within a specified window. Residual Scene Registration error is treated as part of the MLSD algorithm. The background estimate used for background subtraction is either a temporal average or a spatial-plus-temporal average.

There are four primary modes of Track TDP operation:

(1) MLSD, Measured jitter and commanded LOS motion are used to electronically stabilize the background when operating BTH. Any residual motion is compensated in the MLSD algorithm 68. Both single-pixel temporal averaging and multiple-pixel spatial averaging can be used to estimate and subtract the background.

(2) MVPD, where target velocity is unknown. The Track Sensor TDP 42 constructs a peak frame consisting of the largest amplitude for each pixel and the time it occurred. Threshold exceedances are sent to the ODP 43 where a track assembly and streak hypothesis testing process (3-dimensional matched filtering) is performed.

(3) Iterative MLSD, where the Track TDP 42 operates in the MVPD mode and the ODP 43 estimates object velocity by performing track assembly on strips, and the estimated velocity is used to perform mode (1) above with the data stored in the Track TDP 42.

(4) Raw Data Gathering, where all Track Sensor 28 detector outputs at each sample time during a stare period are output to the High Capacity Recorder (HCR) (not shown) on the spacecraft.

Figure 4A:
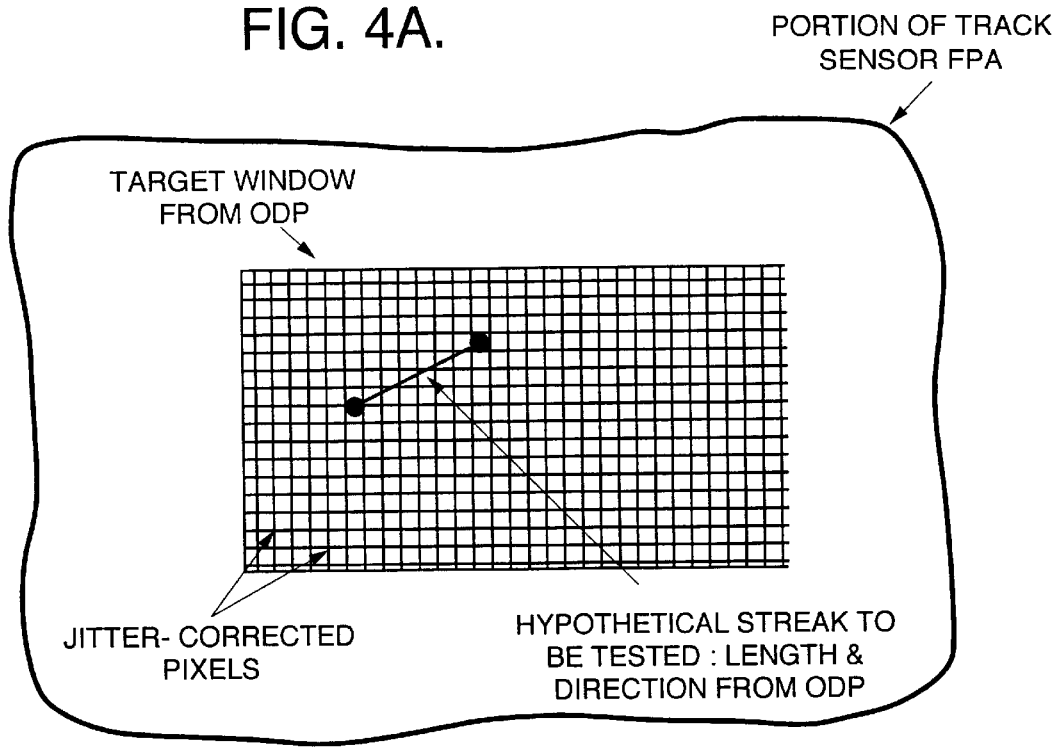
FIG. 4A is a diagram illustrating a maximum likelihood streak detection algorithm in accordance with the present invention.

Missed SWIR detections of targets in track, or the need for accurate state vector update for a given target, will cause the Track Sensor 28 to be tasked to observe the object. The Maximum Likelihood Streak Detection (MLSD) Algorithm 68 (three-dimensional matched filter) will then be used to pick out what may be a dim target in severe clutter. Handover from the SWIR sensor 22 will normally provide a restricted region of the Track FPA 36 where the target will be found, along with a good estimate of object velocity. The Maximum Likelihood Streak Detection (MLSD) algorithm 68 will then be used (FIG. 4A). On rare occasions the target velocity will not be well known. For example, a target divert maneuver could be applied between SWIR observations, or a ground station may command the Track Sensor to execute an area search for an object of unknown velocity. The alternative Maximum Value Projection Detection (MVPD) algorithm 70 will then be used.

The MLSD algorithm 68 has been derived from a likelihood function which includes the two-dimensional pulse shape vector. This template acts as an interpolator of neighboring pixel outputs as the object moves along its trajectory across the focal plane array (FPA) at approximately half-pixel steps. The half-pixel step interval along the object trajectory across the FPA makes the processing similar to that of a scanning sensor with two samples per dwell. The step interval is controlled by selection of the sampling time, given the known object velocity.

The spatial correlation length of the clutter can be very short compared to the detector footprint. The background estimate for each pixel must then be obtained as the average of its own outputs, rather than by a spatial average over neighbors. This scheme, which uses all data from a pixel during the observation interval (e.g., 10 looks at 0.1 sec intervals), provides better estimation accuracy than "frame-to-frame differencing," which uses only two looks. Jitter must be corrected by the signal processor in order to realize this performance gain. A 3×3 or 5×5 an array of pixels can also be used in the MLSD algorithm 68 when the background clutter is benign.

The MLSD algorithm 68 is an improved version of the algorithm described in Chu, P., *Efficient Detection of Small Moving Objects*, Lincoln Laboratory Technical Report TR-846, DTIC AD-A213314, Lexington, Mass. (Jul. 21, 1989), the entirety of which is hereby incorporated by reference, which ignores pulse shape information The pulse shape information must be included when the object moves only a fraction of a pixel per data sample, however, because simulation results have shown that detection performance decreases significantly in this case.

Object amplitudes are calculated by the MLSD algorithm 68 on hypothetical tracks (streaks) initiated at half-pixel spacings. Streaks producing amplitude estimates above a threshold are identified as possible detections. This process is analogous to Time Delay Integration (TDI) and matched filtering for a scanning sensor, where the object motion across a TDI set is calculated from the scan rate.

Derivation of the MLSD Algorithm

Each pixel which receives object photons provides an independent estimate of object amplitude, because the background estimates do not include data from neighboring pixels. The output from a given pixel at sample time i is $$Z_i = a f_i + b + n_i \quad i=1,2 \ldots N \qquad (1)$$

where a=Pulse peak amplitude
$f_i$=Pulse shape "tap weight"
b=Background (constant)
$n_i$=Data noise, with variance $\sigma^2$ In vector/matrix notation, $$\vec{Z} = \begin{bmatrix} z_1 \\ \vdots \\ z_2 \end{bmatrix} = [\vec{f} \vdots \vec{e}] \begin{bmatrix} a \\ b \end{bmatrix} + \vec{n} \Delta A \vec{x} + \vec{n} \qquad (2)$$

where $\vec{f}$ is a vector composed of tap weights, with elements equal to zero for those times when no signal photons fall on the detector, and $$\vec{x}^T = [a, b]$$

$$\vec{e}^T = [1, 1, \ldots, 1]$$

$$A = [\vec{f} \vdots \vec{e}]$$

Assuming that the data noise is Gaussian white noise, the logarithm of the likelihood function is proportional to $$(SOS) = -2\log\{\exp - 1/2(\vec{z} - A\vec{x}) \cdot (\vec{z} - A\vec{x})/\sigma^2\} \qquad (3)$$

$$= (\vec{z} - A\vec{x}) \cdot (\vec{z} - A\vec{x})/\sigma^2$$

$$= \text{Sum-of-squares of data residuals}$$

The maximum likelihood estimate of x is obtained from $$\partial/\partial x\{SOS(\vec{x})\} = 0 = 2(\vec{z} - A\vec{x})^T A/\sigma^2 \qquad (4)$$

i.e., $$\hat{x} = \begin{bmatrix} \hat{a} \\ \hat{b} \end{bmatrix} = (A^T A)^{-1} A^T \vec{z} \qquad (5)$$

$$\begin{bmatrix} \sum_{i=1}^{N} f_i^2 & \sum_{i=1}^{N} f_i \\ \sum_{i=1}^{N} f_i & N \end{bmatrix}^{-1} \begin{bmatrix} \sum_{i=1}^{N} f_i z_i \\ \sum_{i=1}^{N} z_i \end{bmatrix}$$

Note that the noise variance cancels out of the estimation equation, because it has been assumed that $\sigma^2$ is not time-varying.

Equation (5) is an unbiased estimator because, when the data noise is zero, $$\vec{z} \to A \vec{x}$$

$$\vec{x} \to (A^T A)^{-1} A^T (A \vec{x}) = \vec{x}$$

The estimation error covariance matrix is $$\Sigma_x = \langle |\vec{x} - \vec{x}|^2 \rangle = \langle |(A^T A)^{-1} A^T (A\vec{x} + n) - \vec{x}|^2 \rangle \qquad (6)$$

$$= [(A^T A - 1)(A^T)(nn^T) A (A^T A)^{-1}]$$

$$= \sigma^2 (A^T A)^{-1}$$

since $$\langle \vec{n} \vec{n}^T \rangle = \sigma^2 *(\text{Identity matrix}) \qquad (7)$$

Carrying out the algebra in Equation 5, results in $$[A^T A]^{-1} = \begin{bmatrix} 1 & -\hat{f} \\ -\hat{f} & \sum_{i=1}^{N} f_i^2/N \end{bmatrix} (DET)^{-1} \qquad (8)$$

where $$\hat{f} = \sum_{i=1}^{N} f^i / N \qquad (9)$$

$$DET = \text{Determinant} / N \qquad (10)$$

$$= \sum_{i=1}^{N} (f_i - \hat{f})^2$$

The amplitude estimate therefore is $$\hat{a} = \sum_{i=1}^{N} (z_i - b^*)/(DET) \quad (11)$$

where, the "pseudo-background estimate" is $$b^* = \sum_{i=1}^{N} z_i/N) \quad (12)$$

The amplitude estimation error variance is $$\sigma_a^2 = \sigma^2/DET \quad (13)$$

Note that b* contains portions of the signal, but this effect is accounted for in the $\hat{a}$ and $\hat{b}$ estimators, e.g., the complete background estimate is $\hat{b} = b^* - ^{\wedge\wedge}\hat{a}$.

The object amplitude obtained by combining the estimates from all detectors (K) which receive signal photons is the weighted average of the individual estimates, where the weights are the inverse estimation error variances. With k denoting one of the K detectors, the combined amplitude estimate becomes $$\hat{a} = \left\{ \sum_{k=1}^{K} [\sigma_a^2(k)]^{-1} \right\}^{-1} \left\{ \sum_{k=1}^{K} [\hat{a}(k)/\sigma_a^2(k)] \right\} \quad (14)$$

$$= S \left\{ \sum_{i=1}^{N} \sum_{k=1}^{K} [f_{ik}(z_{ik} - b_k^*)] \right\}$$

where the amplitude error variance, or "scale factor", is $$S = \left\{ \sum_{i}^{N} \sum_{k}^{K} (f_{ik} - \hat{f}_k)^2 \right\}^{-1} \quad (15)$$

This is the three-dimensional matched filter (streak detector) which is called the MLSD. It will be used to calculate object amplitude estimates associated with hypothetical object tracks across the FPA. Track-producing estimates which are greater than some threshold will be identified as candidate object detections.

The single-detector background estimator (equation 12) can be extended to include averaging over a (2M+1) by (2M+1) array of detectors centered on the (kj)$^{th}$ detector along the streak. Then $$b^*(j,k) = \sum_{m=-M,M} \sum_{n=-M,M} z_1(k+m, j+n)/(2M+1)^3 N \quad (16)$$

where $z_i$ (.,.) = $i^{th}$ sample from detector (.,.). The options M=0, 1 and 2 have been provided in the Track Sensor TDP design, corresponding to one-by-one, three-by-three, and five-by-five detector averaging. Use of these options can significantly improve MLSD performance if the detector-to-detector local responsivity error is small.

Improved Performance from Parabolic Pulse Match Interpolation

Figure 4B:
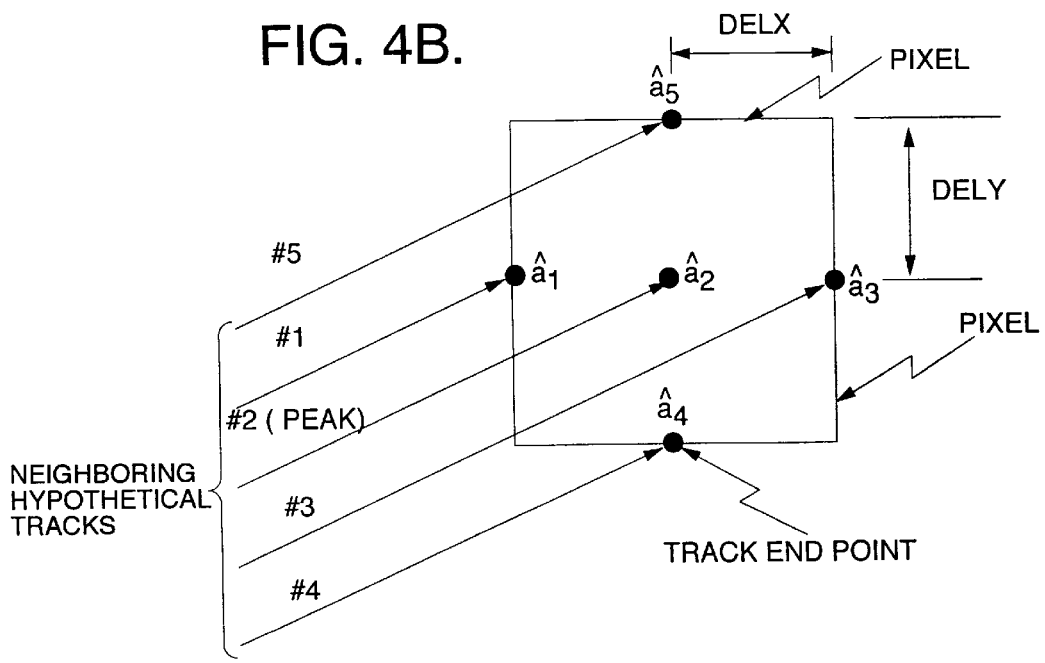
FIG. 4B is a diagram illustrating a cruciform array used by the maximum likelihood streak detection algorithm in accordance with the present invention.

Let $\hat{a}_2$ be the peak amplitude estimate obtained from a MLSD object detection, and let $\hat{a}_1$, $\hat{a}_3$, $\hat{a}_4$, $\hat{a}_5$ be the smaller values obtained from neighboring tracks separated by half-pixel increments (DELX, DELY: see FIG. 4B). As in Acquisition sensor processing, a sub-pixel estimate of object position, and an improved amplitude estimate, will be obtained by using the Parabolic Pulse Match (PPM) Interpolation algorithm 74 to interpolate the cruciform array of amplitude estimates. The pulse shape curvature parameters will also be obtained, which can be used for rejecting false alarms. The PPM Interpolation algorithm 74 is described in detail further below.

Figure 4C:
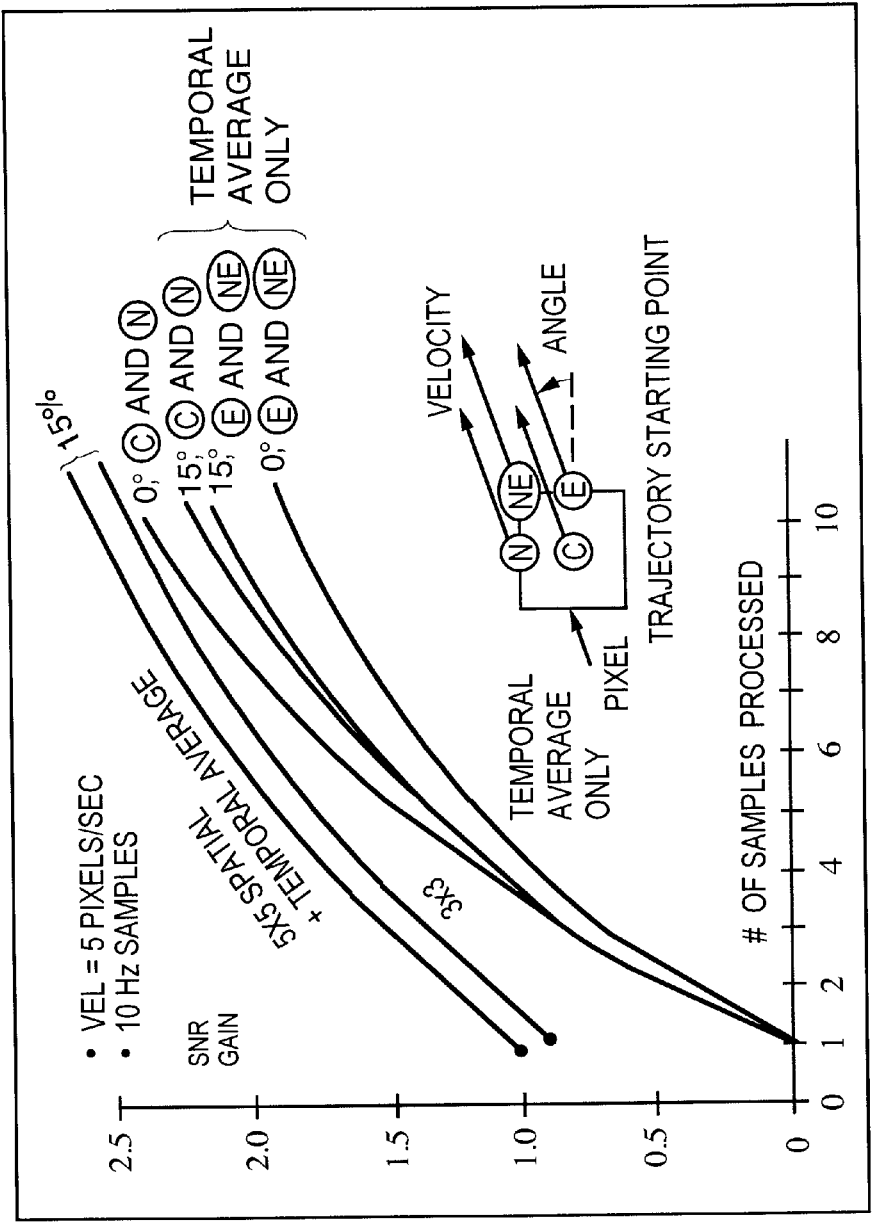
FIGS. 4C and D are graphs illustrating the signal-to-noise ratio (SNR) gain obtained from the maximum likelihood streak detection algorithm in accordance with the present invention.
Figure 4D:
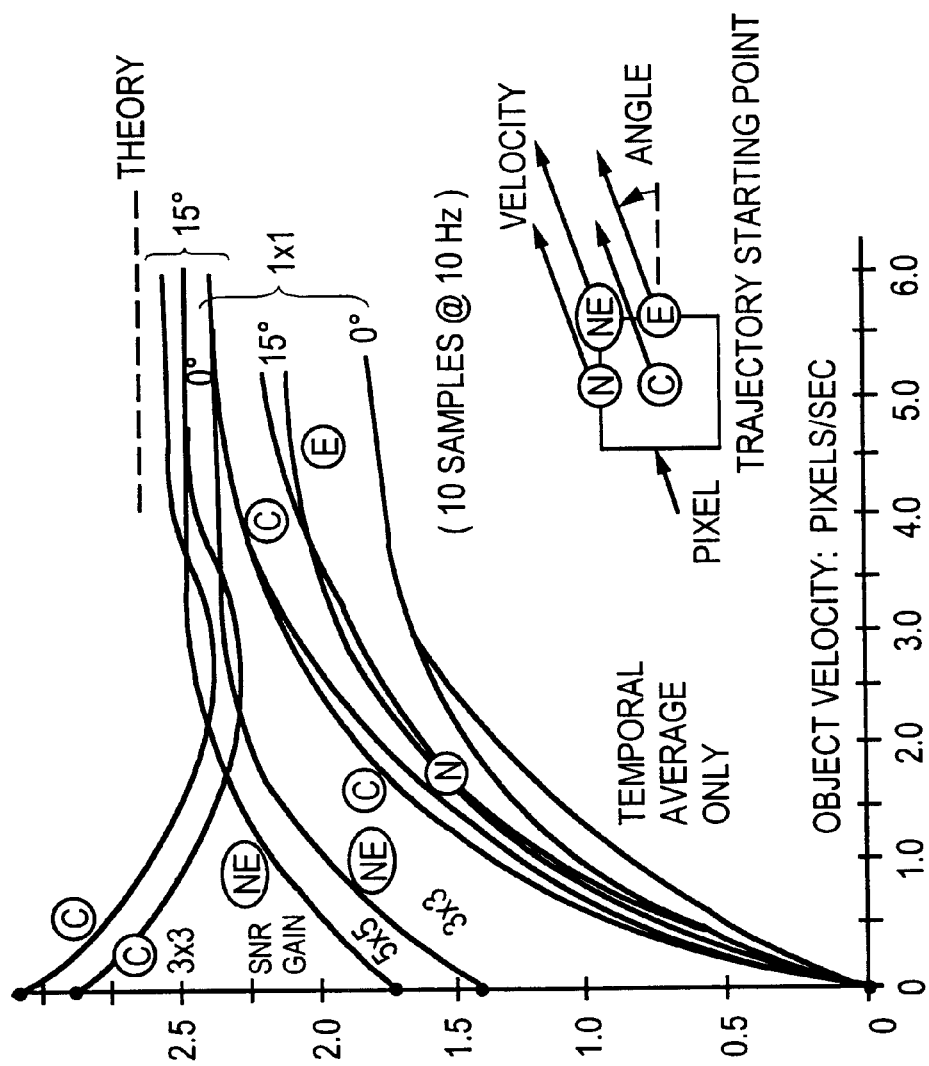
FIG. 4E is a diagram illustrating jitter effects on target detection.

As shown in FIGS. 4C and 4D, the signal-to-noise ratio (SNR) gain from MLSD depends upon (1) object velocity magnitude and direction, (2) starting point of the object trajectory, and (3) total observation time (number of samples at a fixed sample rate). The SNR gain goes to zero at one observation with a zero object velocity, because the target cannot then be distinguished from the background clutter. In this case, it must be assumed that the clutter is sufficiently benign to allow the background to be estimated by averaging over neighboring pixels.

Maximum Value Projection Detection (MVPD)

The MLSD algorithm 68 cannot be used when the velocity is unknown. The computationally-expensive task of testing velocity hypotheses, as well as position, must then be addressed. Target detection in this case will therefore be based upon Maximum Value Projection method implemented on the MSX Space-Based Visible sensor Chu, P., *Efficient Detection of Small Moving Objects*, Lincoln Laboratory Technical Report TR-846, DTIC AD-A213314, Lexington, Mass. (Jul. 21, 1989).

Figure 14:
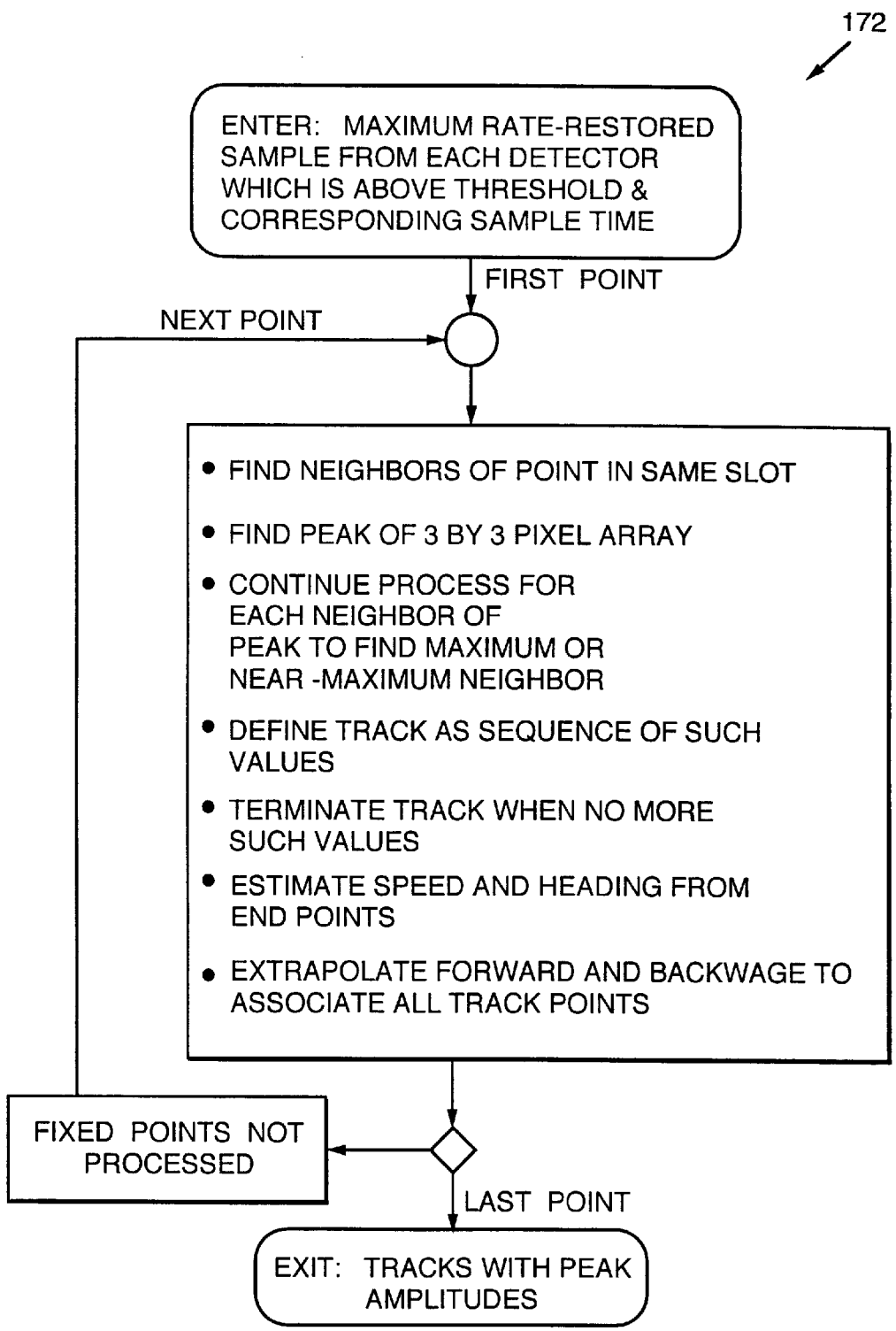
FIG. 14 is a flow diagram depicting the processing steps performed by a track maximum value projection detection processing algorithm in accordance with the present invention.

A threshold test is applied to the brightest sample from each pixel, assuming that (1) the target is moving faster than one detector per sample, so that (2) the bright point time is the time at which the target was present. A two-dimensional matched filter is then applied to each bright point to estimate amplitude and position. These data are sent to the ODP 43, where the track assembly algorithm described in FIG. 14 is used. A Chi-squared test of data residuals is used to identify acceptable tracks. The amplitude estimate for each such track would be the variance-weighted average of each bright-point observation.

The Track Sensor M/MLWIR/LWIR FPA 36 is preferably a 128×128 array. The Track Sensor Visible FPA 38 is preferably a 256×256 array. Each detector value is represented by 12 bits of unsigned data. The functions that are performed by the Track TDP 42 are shown in the flow chart of FIG. 4.

The outputs of the Track TDP 42 are strip packets. Each strip packet contains amplitudes which exceed threshold. The ODP 43 uses adjoining values in the Parabolic Pulse Match Interpolation algorithm 74, described in detail further below, in order to find a more accurate streak position and amplitude.

A Saturation Test algorithm 76 monitors the data for both the M/MLWIR/LWIR and visible FPA's 36 and 38 determines if the data is saturated. If so, a saturation flag is set and associated with the data for the remainder of the tracking TDP data processing.

The Saturation Test algorithm 76 receives the following inputs:

$r_{x,y,i}$ = Pixel value from row x, column y for time i $r_{sat}$ = Saturation level The Saturation Test algorithm 76 outputs the following:

$SF_{x,y,i}$ = Saturation flag for pixel from row x, column y for time i

The following equation is used to set or reset the saturation flag.

If $r_{x,j,i} \geq r_{sat}$ then $SF_{x,y,i}$ = true else $SF_{x,y,i}$ = false

The pixel values, $r_{x,y,i}$ and $r_{sat}$ are 12-bit, unsigned integers. The value of $r_{sat}$ is programmable.

The Track TDP 42 performs a Correlated Double Sampling (CDS) algorithm 78 for the Visible Sensor data only. CDS is the process of sampling a detector twice during one integration period. The first sample is taken immediately after detector reset, and the second sample is taken at the end of the integration period. The first sample is then subtracted from the second sample, resulting in a detector sample that is independent of reset noise and detector bias.

The CDS algorithm 78 receives the following inputs:

$Zi_{xyt}$=First sample from a visible pixel at row x, column y for time t $Zf_{xyt}$=Second sample from a visible pixel at row x, column y for time t The CDS algorithm 78 outputs the following:

$Z_{xyt}$=Correlated sample from a visible pixel at row x, column y for time t

The CDS algorithm 78 uses the following logic:

if $Zf_{xyt}$ greater that $Zi_{xyt}$ then $Zf_{xyt} = Zf_{xyt} - Zi_{xyt}$ else $Z_{xyt} = 0$ $Z_{xyt}$, $Zf_{xyt}$ and $Zi_{xyt}$ are all 12-bit integer values.

The Track TDP 42 performs a Non-Uniformity Correction (NUC) algorithm 80 for each pixel in order to correct for non-uniform offset and gain characteristics across the M/MLWIR/LWIR and visible FPA's 36 and 38. The Track TDP 42 maintains sufficient storage to simultaneously store four IR gain and offset values/pixel and 1 visible gain and offset values/pixel. Both the offset and gain coefficients are a function of integration time and waveband.

The NUC algorithm 80 receives the following inputs:

$X_{x,y,i}$=Data from row x, column y at time i $A_{x,y}$=Gain coefficient for pixel at row x, column y $B_{x,y}$=Offset coefficient for pixel at row x, column y $\Delta B_{x,y}$=Delta Offset coefficient for pixel at row x, column y from Scene-Based Offset G=Global multipliers The NUC algorithm 80 outputs the following:

$R_{x,y,i}$=non-uniformity corrected data from pixel at row x, column y at time i The NUC algorithm 80 implements the following equation:

$$R_{x,y,i} = A_{x,y}(X_{x,y,i} - B_{x,y} + \Delta B_{x,y})G$$

Dead detectors are identified by a zero gain coefficient. Dead detector samples are replaced with the last good sample from spatially adjacent pixels.

The offset and gain parameters which are stored in the Track TDP 42 are acquired during flood testing.

The following bit widths apply to the NUC algorithm 80:

$X_{x,y,i}$=12-bit, unsigned integer $A_{x,y}$=12-bit, unsigned integer

G=12-bit, unsigned integer $B_{x,y}$=12-bit, unsigned integer $R_{x,y,i}$=12-bit, unsigned integer $\Delta B_{x,y}$=12-bit, signed integer The Track TDP 42 provides the capability for the ODP 43 to program each offset and gain coefficient. Additionally, the Track TDP 42 provides the capability to program the global multiplier.

A Track TDP Spike Deletion algorithm 84 serves the same function as the Spike Deletion algorithm 46 in the Acquisition TDP 40 by detecting anomalous data samples and discarding them. The Track TDP Spike Deletion algorithm 84 is a temporal test for which a given detector's current frame sample is compared to the same detector's last good value or a reference value. If the current frame sample is greater than the last good value (or a reference value, depending on the spike deletion option) and if this exceedance is greater than a programmable spike threshold, then the current frame detector sample is replaced with the last good sample. The Track TDP Spike Deletion algorithm 84 stores the last good value of all of the detectors in the Track FPA's 36 and 38 (IR and Visible).

The Track TDP Spike Deletion algorithm 84 receives the following inputs:

$Z_{x,y,i}$=Track TDP input data from pixel at row x, column y at time i

Threshold=ODP programmable spike threshold $Ref_{x,y}$=ODP programmable reference value for pixel at row x, column y Ref=ODP programmable common reference value The Track TDP Spike Deletion algorithm 84 outputs the following data:

$X_{x,y,i}$=Spike-corrected data from pixel at row x, column y at time i

Each sample from each detector is tested for the presence of an amplitude spike by comparing the difference between the sample and a reference value to a threshold provided by the ODP 43 (test for positive spikes only). One of four tracking spike deletion options is implemented:

Spike Deletion Option 1

The Track TDP 42 compares a given detector's current frame sample to the same detector's last good value. If the current frame sample is greater than the last good (not spike-contaminated) value, and if this positive exceedance is greater than a programmable spike threshold, then the current frame detector sample is replaced with the last good sample saved for this detector. The last good sample memory can be loaded with a reference value for each individual detector. This would be used when changing IR bands or when switching between ATH and BTH. The processing is summarized below.

TEST = $Z_{x,y,i} - Z_{x,y,last good i}$ if TEST < Threshold, then $X_{x,y,i} = Z_{x,y,i}$ else $X_{x,y,i} = Z_{x,y,last good i}$ Spike Deletion Option 2

The Track TDP 42 compares a given detector's current frame sample to a reference value for that detector. If the current frame sample is greater than the reference value, and if this positive exceedance is greater than a programmable spike threshold, then the current frame detector sample is replaced with the reference value for the detector. The processing is summarized below.

$$TEST = Z_{x,y,i} - Ref_{x,y}$$

$$\text{if TEST} < \text{Threshold, then } X_{x,y,i} = Z_{x,y,i}$$

$$\text{else} \quad X_{x,y,i} = Ref_{x,y}$$

Spike Deletion Option 3

This option is identical to option 1 except that for the first frame of data processed, this function compares the detector sample under test against a programmable, common reference value for all detectors.

Spike Deletion Option 4

The Track TDP 42 compares a given detector's current frame sample to a common reference value used for all detectors. If the current frame sample is greater than the reference value, and if this positive exceedance is greater than a programmable spike threshold, then the current frame detector sample is replaced with the last good value. The processing is summarized below.

$$TEST = Z_{x,y,i} - Ref$$

$$\text{if TEST} < \text{Threshold, then } X_{x,y,i} = Z_{x,y,i}$$

$$\text{else} \quad X_{x,y,i} = Z_{x,y,\text{last good } i}$$

All quantities used for the Spike Deletion algorithm 84 are 12-bit, unsigned integers.

All spike deletion threshold options and reference values are programmable by the ODP 43. The Spike Deletion algorithm 84 may be overridden by the ODP 43.

The IR Track Sensor 28 detectors are prone to oversampled because their dynamic range capability does not meet the desired dynamic range for the system, and the environmental radiation on the detectors can be so severe that short integration intervals are needed in order to have an acceptable number of good samples output from the Spike Deletion algorithm 84. As a result, the Track TDP 42 provides a Track Rate Restore algorithm 86 for which all data in an MN-sample interval are summed to restore the sample rate to 1/MN of the over-sampled rate. The value of M is 13. The value N is programmable to one of five values from the ODP 43 in order to achieve a restored frame rate between 30 Hz and 1 Hz. The Track Rate Restore Algorithm 86 is performed for the M/MLWIR/LWIR Staring Sensor FPA 36 only.

The Track Rate Restore algorithm 86 receives the following inputs:

$R_{x,y,i}$=non-uniformity corrected data from pixel at row x, column y at time i N=Rate Restore input/output frame ratio The Track Rate Restore algorithm 86 outputs the following data:

$RR_{x,y}$=Rate-restored data from pixel at row x, column y

For each detector, the Track Rate Restore algorithm 86 adds up N groups of M frames of data to generate one, rate-restored sample. The Track Rate Restore algorithm 86 output frame rate is 1/MN times the input frame rate. N can assume five, discrete programmable (by the ODP 43) values: 1, 2, 4, 8 or 16.

The Track Rate Restore algorithm 86 is implemented per the following equation:

$$RR_{x,y} = \left( \sum_{i=0}^{13N-1} RR_{x,y,i} \right) / (2N)$$

All subsequent references herein to frames implies rate restored frames and all subsequent references herein to pixels or pixel data refers to rate restored pixels or pixel data.

The following bit widths apply to the Track Rate Restore algorithm 86:

$R_{x,y,i}$=12-bit, unsigned integer $RR_{x,y}$=15-bit, unsigned integer

The Track TDP 42 employs a Scene-Based Offset Calibration algorithm 88 which computes a correction factor for use by the NUC algorithm 80, to remove low frequency drift in the detector bias. The 1×1 background estimate computed in the 1×1 background estimate function is a normalized sum for each pixel that is available at the end of a staring interval. The normalized sum is the input to the Scene-Based Offset Calibration algorithm 88.

The Scene-Based Offset Calibration algorithm 88 receives the following inputs:

$\hat{u}_{x,y}$=Single pixel background estimate for pixel from row x, column y

Global Offset=ODP programmable parameter

Correction Enables=ODP programmable bits that enables/disables correction and determines whether 12-bit correction is used or increment/decrement correction is used The Scene-Based Offset Calibration algorithm 88 outputs the following:

$\Delta B_{x,y}$=Delta Offset coefficient for pixel at row x, column y to NUC

The Scene Based Offset Calibration algorithm 88 implements the following algorithm:

if Correction Enable is set $\quad \Delta B_{x,y} = \hat{u}_{x,y} - $ Global Offset if Increment/Decrement Correction is set then $\quad$ if $\quad \Delta B_{x,y} > 0$ then $\Delta B_{x,y} = 1$ $\quad$ else if $\Delta B_{x,y} < 0$ then $\Delta B_{x,y} = -1$ $\quad$ else $\quad\quad \Delta B_{x,y} = 0$ The following bit widths apply to the Scene-Based Offset Calibration algorithm 88:

$R_{x,y,i}$=12-bit, unsigned integer

Global Offset=12-bit, unsigned integer $\Delta B_{x,y}$=12-bit, signed integer

The Scene-Based Offset Calibration algorithm 88 provides the capability for the ODP 43 to program N and the Global Offset. The capability for the ODP 43 to program the correction enable and whether increment/decrement or 12-bit correction is used is also provided.

The Jitter Correction algorithm 72 may be employed to correct for the measurable jitter that is present in the staring scene. The LCU 45 provides the Track TDP 42 with the measured composite motion once per frame. The motion is provided in terms of horizontal and vertical detector displacements of the LOS per frame time. Given this data, the Jitter Correction algorithm 72 electronically stabilizes the scene data to the nearest detector (with ±0.5 detector registration error) to produce "fixed scene" background data.

The MLSD algorithm is designed to provide jitter compensation, using FPA motion sent by the LCU 45 at a High rate. This is a two-step process: (1) the known, time-varying position of each pixel relative to some inertially-fixed or scene-fixed coordinate grid will be used to identify each pixel with the nearest reference-bin position; (2) the resulting half-pixel quantization error will be corrected in the MLSD algorithm 68 when the pulse tap weights are calculated as a function of object position along a path. Unlike the jitter free case, however, detector responsivity error and individual-pixel background variation can no longer be treated as equivalent effects when jitter causes different pixels to measure the signal and background in a given reference bin.

The TDP jitter compensation scheme evolved from trading off the capability of the LCU to control and measure jitter, with the capability of signal processor to compensate for measured but uncontrolled jitter (FIG. 4E). This tradeoff led to the jitter correction algorithm described above, and the following derived LCU requirements;

Control

Both horizontal and vertical FPA axes:

The jitter contribution from frequencies above 15 Hz shall be less than (small value)

Measurable FPA jitter shall be reported to the Track Sensor TDP at a 30 Hz rate

The Track Sensor TDP shall correct measured jitter. The compensated SNR loss shall not exceed 10%.

Measurement

Both horizontal and vertical FPA axes:

The standard deviation of unmeasured jitter shall be less than (small value).

The rationale for these requirements is

The BE pointing system will produce small jitter variance above 15 Hz

Up to 15 Hz of jitter can be corrected in TDP With a 30 Hz measurement

A small amount of uncompensated jitter causes a small loss SNR.

The Jitter Correction algorithm 72 receives the following inputs:

$RR_{x,y,i}$=Rate-restored data from pixel at row x, column y at time i $\Delta x_i, \Delta y_i$=x,y detector displacements at time i from the LCU The Jitter Correction algorithm 72 outputs the following data:

$r_{x,y,i}$=Jitter-corrected data from pixel at row x, column y at time i $J_{col}(i), J_{row}(i)$=Residual jitter in x,y at time i to MLSD The jitter correction algorithm 72 realigns the sample positions for each frame of data by subtracting the jitter error, $\Delta x_i$ and $\Delta y_i$, from each sample's x,y position. Given the measured jitter during the sampling time, this correction scheme offsets all pixel x,y position measurements by the nearest integer values of $\Delta x$ and $\Delta y$ for the given scene sample. After jitter correction is performed to the nearest half pixel, the residual jitter is stored for subsequent use in the Maximum Likelihood Streak Detection algorithm 68.

The $\Delta x_i$ and $\Delta y_i$ values are each 14-bit numbers: a sign bit, 8 bits to the left of a binary point and 5-bits to the right of the binary point. The pixel data are 15-bit, unsigned integers.

$J_{col}(i)$ and $J_{row}(i)$ has a sign bit, 8-bits to the left of a binary point and 5-bits to the right of the binary point.

The Track TDP 42 provide the capability for the ODP 43 to enable and disable the Jitter Correction algorithm 72.

A 1×1 Background Estimation algorithm 90 computes a normalized sum for each Track Sensor detector on the focal plane through the duration of the observation interval. The computed averaged values is an estimate of the background level at each detector. This value is used in a Final Background Estimation algorithm 92, described below, and in the Scene Based Offset Calibration algorithm 88, described above.

A single pixel location is used to compute each estimate. During the staring interval, for each pixel in the scene, the 1×1 Background Estimation algorithm 90 sums the pixel values for all the frames. At the end of the staring interval, the 1×1 Background Estimation algorithm 90 divides this sum by the total number of frames captured during the interval. These average pixel values are then used as the background estimate.

The 1×1 Background Estimation algorithm 90 receives the following inputs:

N=Total number of frames in the staring interval $r_{x,y,i}$=Pixel value from row x, column y for time i The 1×1 Background Estimation algorithm 90 outputs the following data:

$\hat{u}_{x,y}$=Single pixel background estimate for pixel from row x, column y

The following equation is used to compute the background estimate for each pixel:

$$\hat{u}_{x,y} = \frac{1}{M}\left[\sum_{i=0}^{N-1} r_{x,y,i}\right] r_{x,y,i} = \frac{N}{M} r_{x,y,i}$$

where M is the smallest power of 2 that is greater than or equal to N.

The following bit widths apply to the 1×1 Background Estimation algorithm 90:

N=5 bits $r_{x,y,i}$=15-bit, unsigned integer $\hat{u}_{x,y}$=15-bit, unsigned integer The Track TDP 42 provides the capability for the ODP 43 to program N.

For the visible data only, the Track TDP 42 provides a 128×128 Window Select algorithm 94 that selects a 128×128 window out of the 256×256 array of visible data. This data selection approach allows the Multi-Frame Storage to store 2.6 times as much data per pixel. This feature is programmable from the ODP 43.

The 128×128 Window Select algorithm 94 receives the following inputs:

$r_{x,y,i}$=Jitter-corrected data from pixel at row x, column y at time i $X_{start}, Y_{start}$=Upper-left row, column coordinates of window—ODP programmable The 128×128 Window Select algorithm 94 outputs the following data:

$r_{x,y,i}$=Windowed data from pixel at row x, column y at time i

The 128×128 Window Select algorithm 94 implements the following logic:

If ($X_{start} \le x < X_{start} + 128$) and ($Y_{start} \le y < Y_{start} + 128$) then store data in the multi-frame storage.

$X_{start}$ and $Y_{start}$ are at least 8-bit, unsigned integers. The pixel data are 15-bit, unsigned integers.

The 128×128 Window Select algorithm 94 provides the capability for the ODP 43 to program $X_{start}$ and $Y_{start}$. The 128×128 Window Select algorithm 94 also provides the capability for the ODP 43 to disable the windowing so that all the data is retained. The default mode for the 128×128 Window Select algorithm 94 is disabled.

The Track TDP 42 provides two banks of memory for storage of rate-restored pixel data. Each individual bank is capable of storing 26 frames of 128×128 IR or visible data. The banks are capable of operating independently. For example, the Track TDP 42 can store data in one bank while performing MLSD or MVPD processing using data from the other bank. Both banks can be used together to store ten frames of 256×256 pixels of visible data.

The Final Background Estimation algorithm 92 uses each 1×1 background estimate and either uses the estimate without further alteration or computes a normalized sum of the estimates in a 3×3 or 5×5 pixel region about the estimate in order to provide a background estimate that is then subtracted from each sample from that pixel using a Background subtraction algorithm 96, described further below.

Nominally, the 1×1 background estimates are used. In some environments where a slow moving, bright object is present, the background estimate may be based on the average value over a 3×3 or 5×5 pixel block surrounding the pixel for which the estimate is being formed. The ODP 43 controls the filter size of the Final Background Estimation algorithm 92.

The Final Background Estimation algorithm 92 receives the following inputs:

D=Filter size ranging from 0 to 2. ODP programmable.
$\hat{u}_{x,y}$=Single pixel background estimate for pixel from row x, column y The Final Background Estimation algorithm 92 outputs the following data:

$\hat{u}_{x,y}$=Background estimate for pixel from row x, column y

The following equation is used to compute the background estimate for each pixel:

$$\hat{u}_{x,y} = \frac{1}{(2D+1)^2} \left[ \sum_{a=-D}^{D} \left[ \sum_{b=-D}^{D} \hat{u}_{x+a,y+b} \right] \right]$$

The following bit Widths apply:
$\hat{u}_{x,y}$=15-bit, unsigned integer

The Track TDP 42 provides the capability for the ODP 43 to program the filter size D.

Using the background estimate computed by the Final Background Estimation algorithm 92 for each pixel in the scene at the end of the observation interval, the Background Subtraction algorithm 96 is performed by subtracting the background estimate from each pixel in the scene for each frame time in the observation interval. Pixel values are obtained from the memory banks provided by the Track TDP 42.

The Background Subtraction algorithm 96 receives the following inputs:

$\hat{u}_{x,y}$=Background estimate for pixel from row x, column y
$r_{x,y,i}$=Pixel value from row x, column y for time i
Subtraction Mode=Determines how background subtraction is performed—ODP programmable
Fixed value=Fixed value that can be subtracted from pixel—ODP programmable The Background Subtraction algorithm 96 outputs the following data:

$d_{x,y,i}$=Background-subtracted pixel data from row x, column y at time i

The following logic is used to subtract the background for each pixel:

if BackgroundSubtractionmode is set to fixed then $d_{x,y,i} = r_{x,y,i} - $ fixed value else $d_{x,y,i} = r_{x,y,i} - \hat{u}_{x,y}$ The following bit widths apply to the Background Subtraction algorithm 96.

$r_{x,y,i}$=15-bit, unsigned integer
$\hat{u}_{x,y}$=15-bit, unsigned integer
$d_{x,y,i}$=16-bit, signed integer The Track TDP 42 provides the capability for the ODP 43 to program the Background Subtraction mode and the fixed value that will be subtracted if the mode is set to "fixed".

When the target velocity relative to the focal plane is known a priori, the MLSD algorithm 68 is used to increase the signal to noise ratio of the scene data (if target velocity is unknown, see the discussion of the Maximum Value Projection Detect, algorithm 70, below). MLSD begins with a postulation that a target appears on four different positions on pixel x at frame 0. Then, for each subsequent frame, the postulated target that started on pixel x is tracked to new pixel locations as the target moves with known velocity. All of the pixels "visited" by the postulated target during the staring interval are coherently summed and then a matched filter algorithm is applied. This pixel sum then is a SNR enhanced sample of a target which started on pixel x. If the postulation is in fact true and there actually is a target at pixel x during frame 0, and the pixel sum exceeds a threshold test, then the Track TDP 42 reports this as a target hit. Otherwise, the threshold test fails and the pixel sum is discarded. This target postulation, pixel summation, and sum thresholding process is then repeated for all of the pixels in the FPA which lie within an error window (a target window) of the known nominal target position.

The ODP 43 sends the Track TDP 42 a "target window". A target window is composed of
1) FPA relative target velocity
2) Window position
3) Window size
4) Threshold value The FPA relative target velocity is reported in terms of "detectors moved" per frame and is given in $\frac{1}{128}$ths pixel units.

To achieve sub-pixel target position accuracy, the Track TDP 42 postulates the target starting positions at each quarter of a pixel, i.e. if the target window is a 5×10 pixel rectangle (50 pixels), the Track TDP 42 postulates 10×20 starting positions for the target (200 starting positions).

The MLSD algorithm 68 receives the following inputs.

$V_{col}, V_{row}$=Target motion in x,y in one frame time from target window $J_{col}(k), J_{row}(k)$=Residual jitter in x,y for frame k from Jitter Correction col_min,col_max=x coordinates of the beginning and end of the specified window from target window row_min,row_max=y coordinates of the beginning and end of the specified window from target window d(x,y,k)=Background subtracted pixel at pixel column x, row y for frame k Sat flag (x,y,k)=Flag indicating if any pixel used in computing Z(m,n) is saturated MVPD_flag=Indication from the ODP that the velocity is not known and the MVPD algorithm will be used.

The MLSD algorithm 68 outputs the following data:

X(m,n)=MLSD TDI sum for postulated target at sub-pixel column m, row n

Z(m,n)=3×3 matched filter output at sub-pixel column m, row n

Sat flag(m,n)=Flag indicating if any d(x,y,k) is saturated

The MLSD algorithm 68 implements the following equations:

$$X(m,n) = \sum_{k=0}^{n-1} d(Int((m+kV_{col}+J_{col})k)), Int(m+kV_{row}+J_{row}(k)))$$

$$Z(m,n) = \sum_{j=-1}^{1} \sum_{i=-1}^{1} T(i,j) \times (m+i, n+j)$$

∀m,n([col_min,col_max], [row_min,row_max]) Sat flag(m,n)=1 if any d(x,y,k) is saturated
where N=Total number of frames in staring interval m=Sub-pixel column index n=Sub-pixel row index k=frame time Int(x)=The value to the left of the decimal point of the number x (truncation)

T(i,j)=3×3 matched filter template coefficients at column index i, row index j

The equation shown above is executed once for each sub-pixel within a target window. If there are multiple groups of targets, each with a unique velocity, then multiple target windows can be processed, one at a time, by the Track TDP 42 for a single staring interval. This is done at the discretion of the ODP 43.

In the process of postulating targets on each sub-pixel location within the requested window, a new frame of amplitude data is generated with sub-pixel resolution. This data is thresholded, and threshold exceedances and adjacent data are sent to the ODP 43 in the form of strip reports. Any threshold exceedance that is a local maximum has the peak flag set in the strip.

The following bit widths apply to the MLSD algorithm 68.

$V_{col}, V_{row}$=Sign bit, 5 bits to left of binary point, 7 bits to right of binary point $J_{col}(k), J_{row}(k)$=Sign bit, 8 bits to left of binary point, 5 bits to right of binary point col_min,col_max=8-bit, unsigned integer row_min,row_max=8-bit, unsigned integer d(x,y,k)=16-bit, signed integer X(m,n)=21-bit, signed integer Z(m,n)=22-bit, signed integer N=5-bit, unsigned integer m=9-bit, 8 bits to left of binary point, 1 bit to right of binary point n=9-bit, 8 bits to left of binary point, 1 bit to right of binary point k=5-bit, unsigned integer T(i,j)=16-bit fraction between 0 and 1

The Track TDP 42 provides the capability for the ODP 43 to program target windows, MVPD_flag, and T(i,j).

In certain circumstances, the target a priori velocity estimate is unknown. When this happens, the Track TDP 42 bypasses the MLSD algorithm 68 and uses the MVPD algorithm 70. When using the MVPD algorithm 70, after the staring interval, the Track TDP 42 builds a new frame of data called the Peak Frame. For each pixel in the requested window, the Peak Frame contains a running sum of a programmable number of contiguous rate-restored samples from that pixel. The number of samples over which the running sum applies is programmable between 1 and 5 frame times.

After creating the Peak Frame, the Track TDP 42 thresholds the data in the Peak Frame and generates strips about the threshold exceedances.

The MVPD algorithm 70 receives the following inputs:

N=Number of samples for which the running sum will apply—ODP programmable

MVPD_flag=Indication from the ODP that the velocity is not known and that the MVPD algorithm 70 will be used T=ODP programmable threshold $d_{x,y,i}$=Background subtracted pixel at pixel column x, row y for frame i The MVPD algorithm 70 outputs strips about the threshold exceedances generated by thresholding the Peak Frame. The strips contain the summed data and the associated frame times of the data.

The MVPD algorithm 70 implements the following processing:

$$S_{x,y,i} = \sum_{i=1}^{N} d_{x,y,i}$$

if $S_{x,y,i}$>T, then generate strip
where $S_{x,y,i}$=Running sum for pixel at column x, row y from frame i (17-bit, signed integer)

The Track TDP 42 provides the capability for the ODP 43 to program N and T, and, the flag that determines whether the MLSD algorithm 68 or the MVPD algorithm 70 is used.

Both the Acquisition TDP 40 and Track TDP 42 provide data taps at intermediate points in the processing and make these data taps available to the HCR via a raw data interface. The Acquisition TDP 40 also provides a dual-thresholding capability that allows the Acquisition data to be compared to a second fixed threshold that is independent of the adaptive threshold. This second threshold determines the volume of processed data from the Acquisition TDP 40 that will be sent to the raw data interface (for subsequent real-time downlink to the ground) when this tap is selected. The ODP 43 controls the selection of data taps and the setting of the second threshold.

A 3×3 matched filter uses a 3×3 array of streak threshold exceedances and convolves the 3×3 array of streak threshold exceedances with predicted noise-free values. The predicted values are calculated by the ODP 43 by simulating streak characteristics, taking into account the real-time implemented algorithm parameters.

Object Dependent Processing

Object dependent processing in accordance with an aspect of the present invention will now be described.

Figure 5:
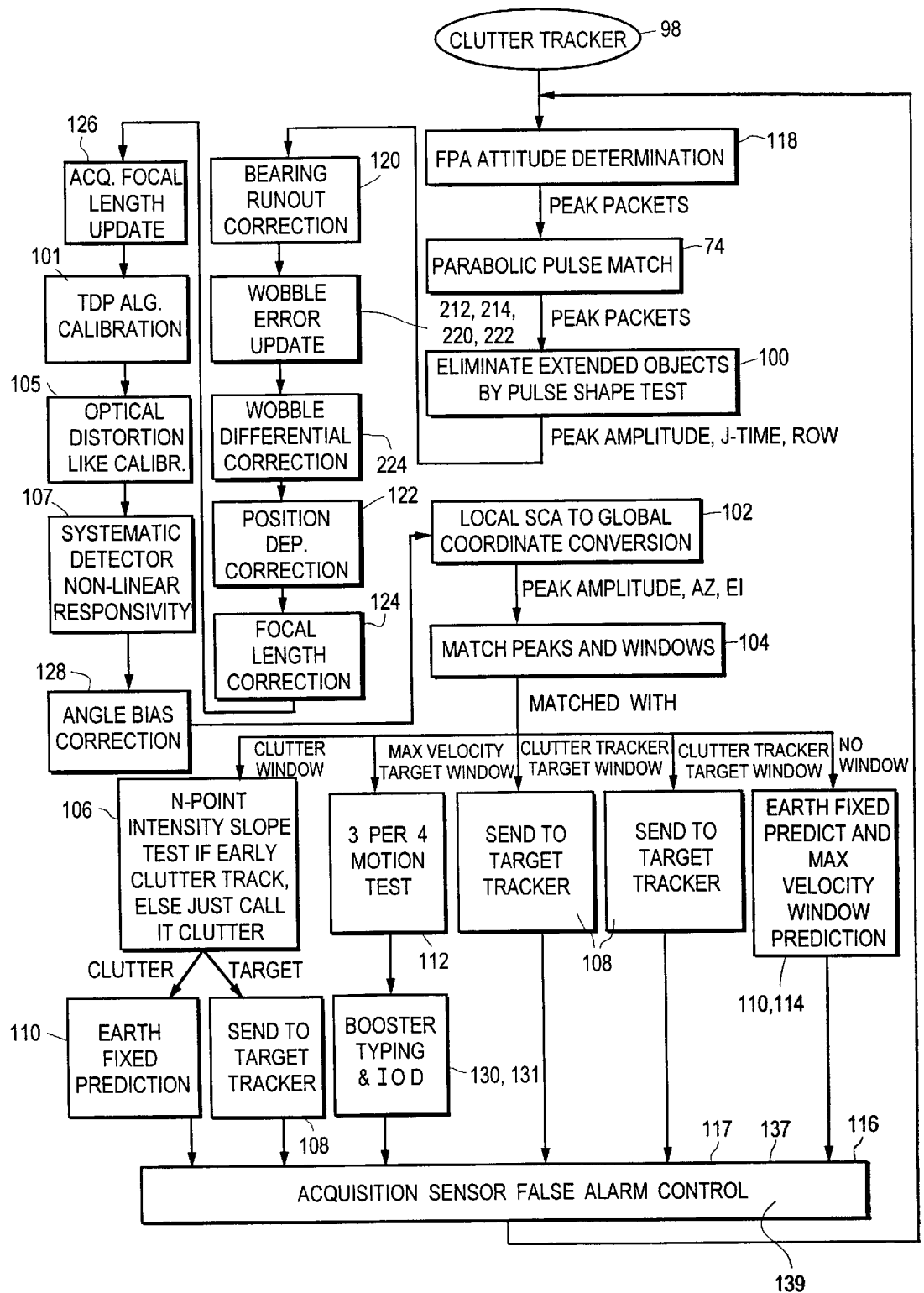
FIG. 5 is a flow diagram depicting the processing steps performed by a clutter tracker algorithm in accordance with the present invention.

The ODP 43 employs a clutter Tracker 98, as illustrated in the flow chart of FIG. 5, which identifies earth-fixed clutter points by a motion test and performs track initiation of possible targets. The Clutter Tracker 98 uses clutter and target motion tests to reduce the Acquisition Sensor TDP 40 exceedance rate. As a result, the overall processing load on the system 20 is reduced.

As attitude data comes into the Clutter Tracker 98 it is buffered, as described below in connection an FPA Attitude Determination Algorithm 118.

The Acquisition Sensor TDP 40 clutter rejection process was described above. After clutter-adaptive matched filtering and thresholding in the Acquisition Sensor TDP 40, the ODP Clutter Tracker 98 must perform:

Pulse shape test, to eliminate such phenomena as cloud edges and bodies of water;

Clutter motion test, to identify as clutter those points which appear to be fixed to the earth; and Target motion test, to eliminate those non-persistent clutter points which leak through the clutter motion test A new clutter track is created for every new peak which does not match with an existing clutter track. Any clutter track which does not get updated in a scan is treated as a possible target, i.e., an object which is moving relative to the earth. Almost all of these are non-persistent clutter points which will be rejected by the target motion test. Both motion tests will be performed in the ACQ sensor FPA coordinate system. Thus, both the Clutter Tracker and ACQ sensor TDP operate in FPA coordinates, while the Target Tracker operates in SCI coordinates.

The process which will perform these tasks, along with a timing and sizing analysis, are described here.

As peak packets come into the Clutter Tracker 98, they are converted into J-Time, row, and amplitude by the Parabolic Pulse Match interpolation algorithm 74. Then each peak packet is tested for the right shape by a Pulse Shape Test algorithm 100. If the shape of a peak packet is not acceptable then the peak packet is rejected. Otherwise the peak packet is accepted and the J-Time, row position of the peak packet is converted to azimuth and elevation by a Local SCA to Global Coordinate Conversion algorithm 102. This position is then matched against the previously predicted windows by a Match Peaks and Windows algorithm 104, described in detail below. Five outcomes are possible from this matching.

The first possible outcome is that the peak matches a clutter window. In this case the age of the clutter track is checked. If it is relatively young then it is checked to see if it is a recently launched target by an N-Point Intensity Slope Test algorithm 106, described in detail below. If the test is passed then the object is a target so it is sent to a Target Tracker 108. Otherwise, it is clutter so a clutter window is predicted for the next scan by an Earth Fixed Prediction algorithm 110.

The second possible outcome is that the peak matches a maximum velocity window. In this case, two positions are available for the target so a small Clutter Tracker target window can be predicted by a 3 per 4 Motion Test algorithm 112, described in detail below.

The third possible outcome is that the peak matched a Clutter Tracker target window. In this case three or four positions are available for the target so they are sent to the Target Tracker 108.

The fourth possible outcome is that the peak matched a Target Tracker target window. In this case the peak is sent to the Target Tracker 108 so that it can update its track.

The last possibility is that the peak matches no window. In this case the peak could be a new clutter hit or a new target hit. So a clutter window is predicted by the Earth Fixed Prediction algorithm 110 and a target window is predicted by a Maximum Velocity Window Prediction algorithm 114.

Finally, on a regular basis the TDP threshold multipliers are updated by an Acquisition Sensor False Alarm Control algorithm 116.

The FPA Attitude Determination algorithm 118 operates as follows.

The Clutter Tracker 98 receives FPA attitude and velocity data from the LCU 45 at a rate of 250 Hz. Additionally, the Clutter Tracker 98 receives spacecraft position and velocity data. The Clutter Tracker 98 stores this data and, when needed, picks the data with the time tag that is closest to the time of interest.

The FPA Attitude Determination algorithm 118 receives the following inputs from the LCU 45 at a rate of 250 Hz.

($\vec{x},\vec{y},\vec{z},\dot{x},\dot{y},\dot{z},t$)=Acquisition Sensor FPA coordinate system and its derivative in Earth-Centered Inertial (ECI) coordinates at time t ($\vec{S},\dot{S},t$)=Spacecraft position and velocity at time t in ECI coordinates The FPA Attitude Determination algorithm 118 stores the inputs received from the LCU 45 for subsequent use by the Clutter Tracker 98. No interpolation is performed.

The Clutter Tracker 98 employs the Parabolic Pulse Match Interpolation algorithm 74 to improve the SNR and angular measurement precision (AMP) of the peak data from the Acquisition Sensor 22. The Parabolic Pulse Match Interpolation algorithm 74 is intended to correct for phasing effects in the two-sample-per dwell output from the Acquisition TDP 40 which could not be corrected in the Acquisition TDP 40.

Other ACQ sensor TDP threshold exceedances are reported as "peak packets" to the Clutter Tracker 98. These consist of three-by-three arrays of amplitude estimates obtained from a two-dimensional array of background-subtracted, matched filters. The threshold-exceeding peak value is at the center. A sub-pixel estimate of object position and amplitude is obtained by using the Parabolic Pulse Match (PPM) algorithm 74 to interpolate a cruciform array of amplitude estimates (FIG. 5A). This algorithm is implemented in the ODP 43, but it is treated as part of the Acquisition Sensor TDP 40 because TDP performance goals cannot be met without PPM augmentations.

The pulse parameters to be determined are a=Peak amplitude $x_o, y_o$=Peak position X, Y=Pulse curvature parameters in x and y directions, respectively Peak packets having X and Y values not consistent with target shape will be rejected as clutter. An additional pulse shape test will be performed on the diagonal cruciform data, as will be described below.

Let $\hat{a}_2$ be the peak amplitude estimate obtained from a candidate object detection, and let $\hat{a}_1, \hat{a}_3, \hat{a}_4, \hat{a}_5$ be the smaller values obtained from neighboring increments (DELX, DELX: see FIG. 5A). Define the quantities $$S_1 = 2\hat{a}_2 - (\hat{a}_1 + \hat{a}_3)$$

$S_2 = 2\hat{a}_2 - (\hat{a}_4 + \hat{a}_5)$ $D_1 = (\hat{a}_3 - \hat{a}_1)/2$ $D_2 = (\hat{a}_5 - \hat{a}_4)/2$ The interpolated positions and amplitudes are $x_o = (DELX)(d_1/s_1)$ $Y_o = (DELY)(D_2/S_2)$ $\hat{a} = \hat{a}_2 + (D_1^2/2S_1) + (D_2^2/2S_2)$ and the estimated pulse shape parameters are, $X^2 = (DELX)^2(\hat{a}/S_1)$ $Y^2 = (DELY)^2(\hat{a}/S_2)$ The PPM algorithm 74 needs to be modified when there is a cross-scan misalignment error (FIG. 5B). This can be caused by the elevation-dependent, time delay between half-SCA's in the ACQ sensor FPA. In this case, the function $F(X,Y) = A + BX + CY + DX^2 + EY^2$ is fitted to the five in-scan Acquisition Sensor TDP 40 matched filter outputs. The five coefficients A, B, C, D and E are then determined. The estimated object position is found to be In-scan: $x = B/(2D)$ Cross-scan: $y = C/(2E)$ and the object amplitude is found to be $AMP = A + Bx + Cy + Dx^2 + Ey^2$ This algorithm performs about as well as the PPM.

Figure 5D:
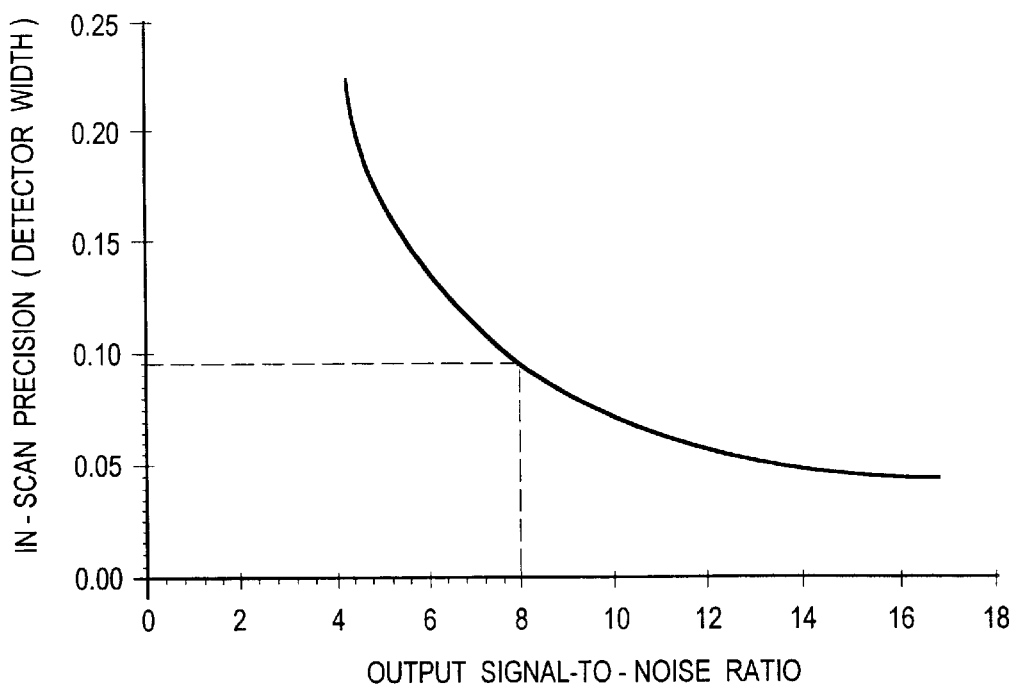
Figure 5E:
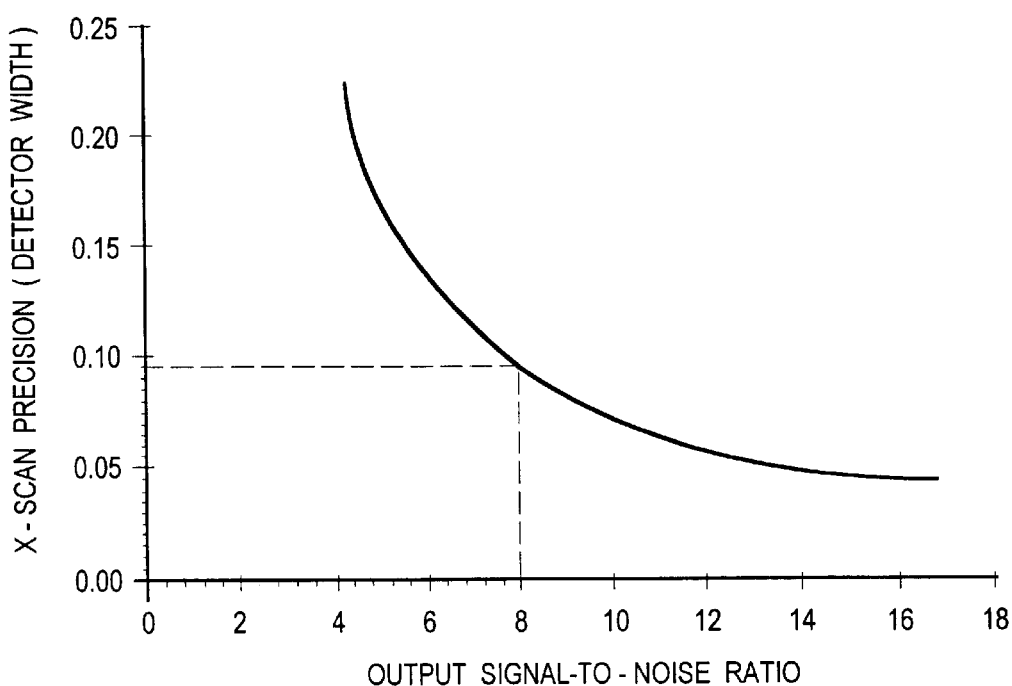
Figure 5F:
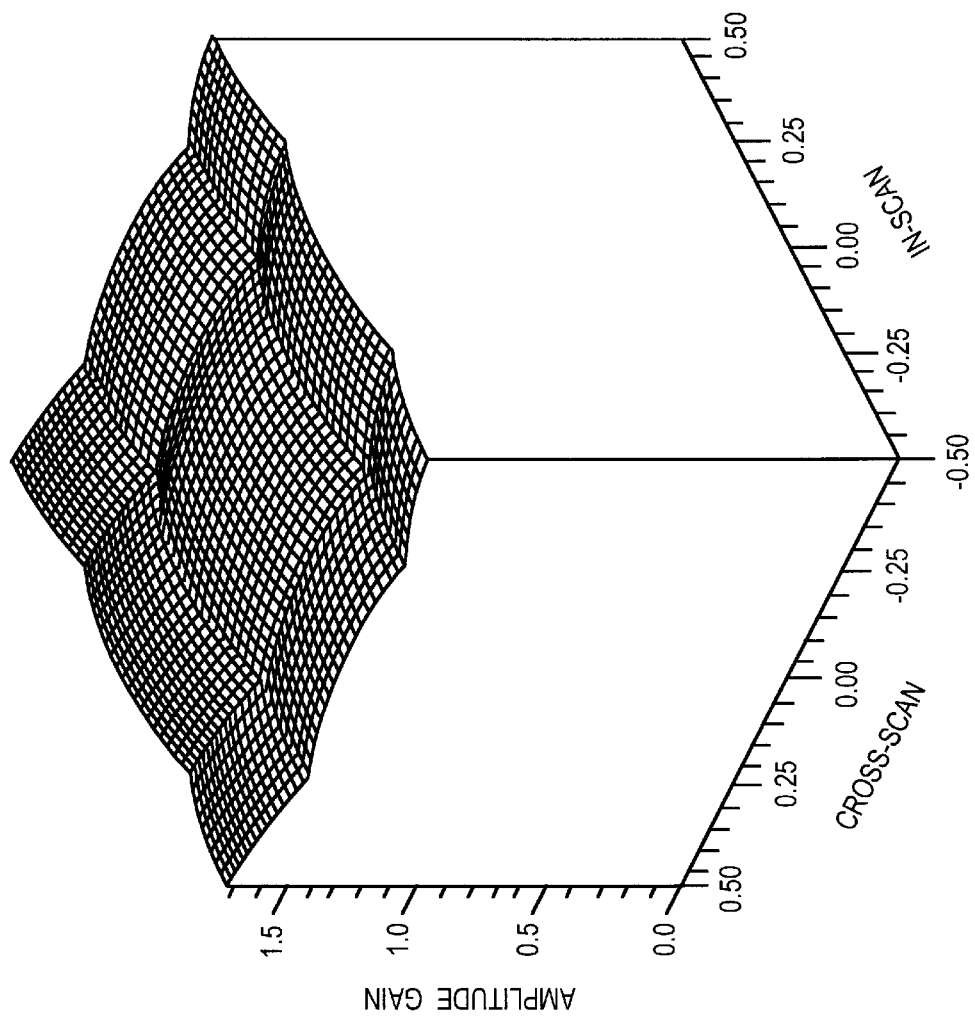
FIGS. 5F and 5G are graphs showing sample phasing errors obtained using a method in accordance with the present invention.
Figure 5G:
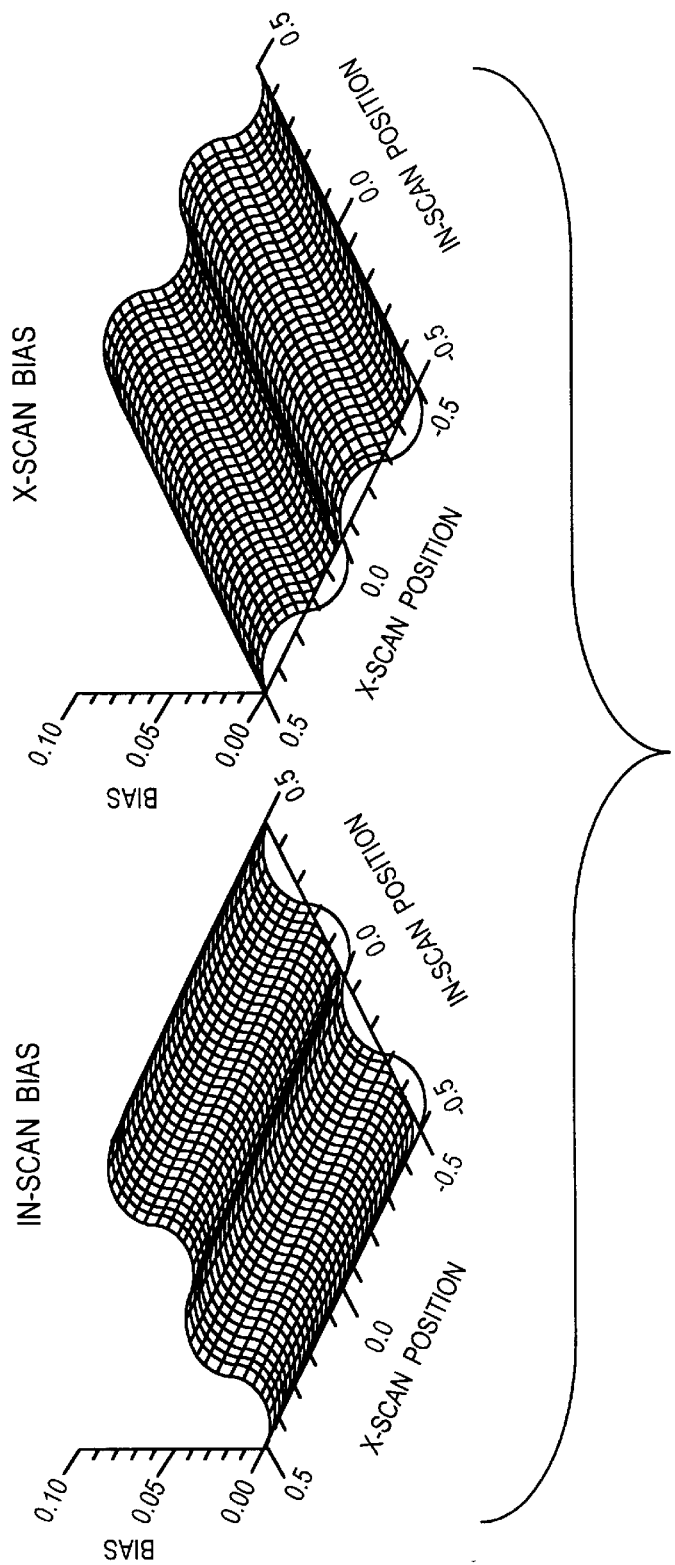

FIGS. 5C, 5D and 5E show the Acquisition Sensor TDP 40 performance which is achievable in a benign clutter environment. These data were obtained with the recursive background estimation coefficient set equal to its maximum value of 63/64. The excellent amplitude and position statistics shown are achieved because the PPM corrects for the effects "phasing errors," i.e., the effects of an object peak not being exactly at a sample time. Phasing errors could be significant in a two-sample-per-dwell sensor, but FIGS. 5F and 5G show that this is not the case.

The Parabolic Pulse Match Interpolation algorithm 74 receives the following inputs:

Amp(..)=5 amplitudes in the form of a cruciform around the peak amplitude (TDP counts)

J,ROW=j-time and row of the peak amplitude (j-time, row units)

$J_{off}$(ROW,SCA)=Table of Calibration constants to account for the half-SCA alignment error (j-time units)

SCA=SCA of peak

The Parabolic Pulse Match Interpolation algorithm 74 shall output the following data:

ΔJ=Correction to j-time

ΔK=Correction to row

A=Amplitude of peak

The Parabolic Pulse Match Interpolation algorithm 74 performs the following processing:

$a = \dfrac{Amp(J, Row-1) - 2Amp(J, Row) + Amp(J, Row+1)}{2}$ $b = \dfrac{Amp(J, Row+1) - Amp(J, Row-1)}{2}$ $d = \dfrac{Amp(J-1, Row) - 2Amp(J, Row) + Amp(J+1, Row)}{2}$ $e = \dfrac{Amp(j+1, Row) - Amp(J-1, Row)}{2}$ $\Delta J = J_{off}(Row, Sca) - \dfrac{e}{2d}$ $\Delta K = -\dfrac{b}{2a}$ $A = Amp(J, Row) - \dfrac{b^2}{4a} - \dfrac{e^2}{4d}$ The Clutter Tracker 98 employs the second-difference Pulse Shape Test algorithm 100 to reject clutter points.

The Pulse Shape Test algorithm 100 is intended to reject extended objects which have caused the Adaptive Threshold algorithm to output an exceedance flag in the Acquisition TDP 40.

The shape parameter to be used for this test is the normalized second difference $S = [2Z(i) - Z(i-1) - Z(i+1)]/[Z(i)]$ where $Z(i)$ is the $i^{th}$ value in the center row of a peak packet output by the Acquisition Sensor TDP 40. This is the same form as the spike rejection test at the front of the Acquisition Sensor TDP 40, which seeks to reject spike-like objects before pulse matching has been performed. The Pulse Shape Test algorithm 100, on the other hand, seeks to reject extended objects which have passed the post-matched-filter threshold test.

Figure 5H:
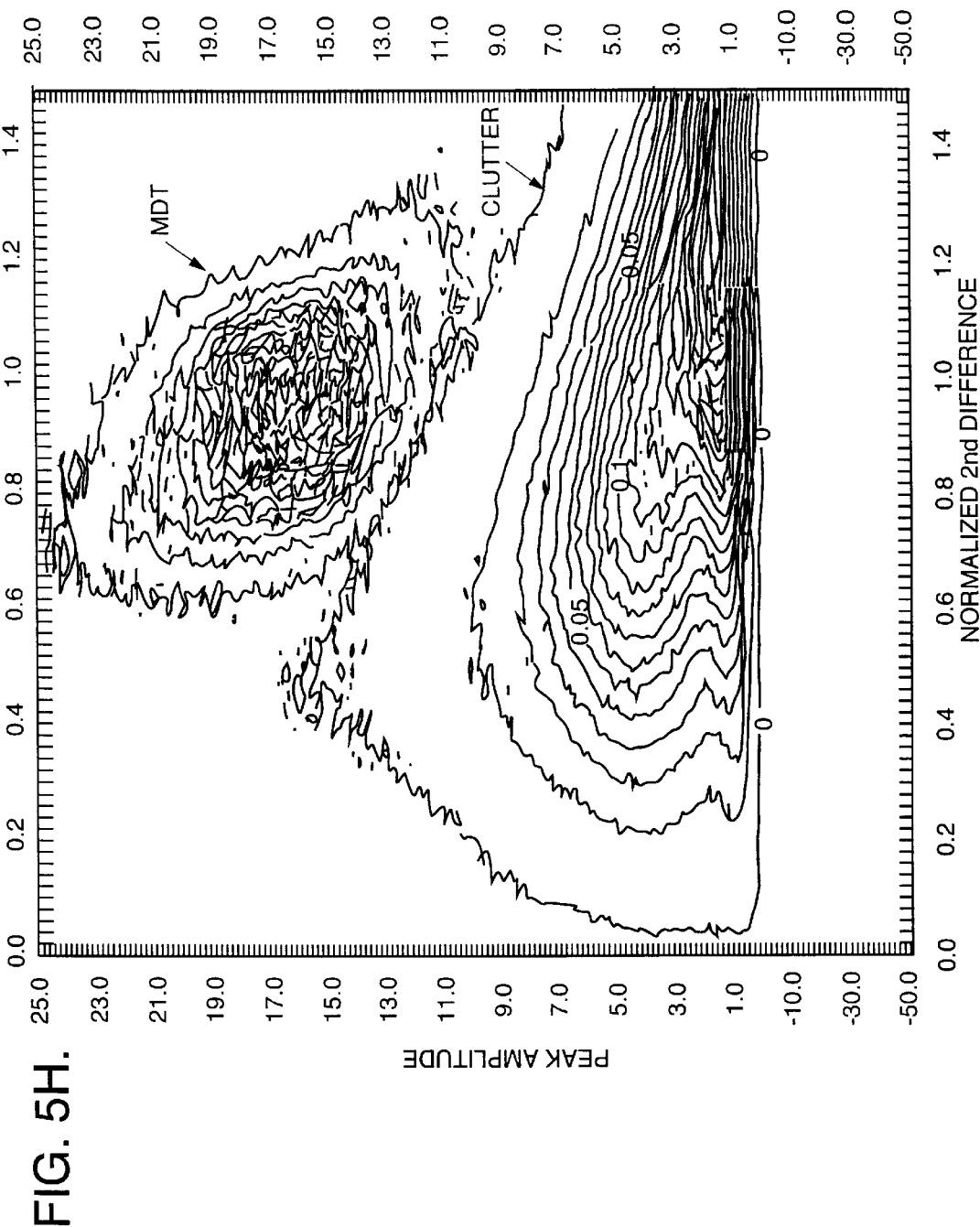
FIG. 5H is a graph showing the clutter and Minimum Detectable Target (MDT) probability densities vs. their peak amplitudes and shape parameters, as obtained from high-fidelity simulation of SSGM Scene #1 using a method in accordance with the present invention.
Figure 5I:
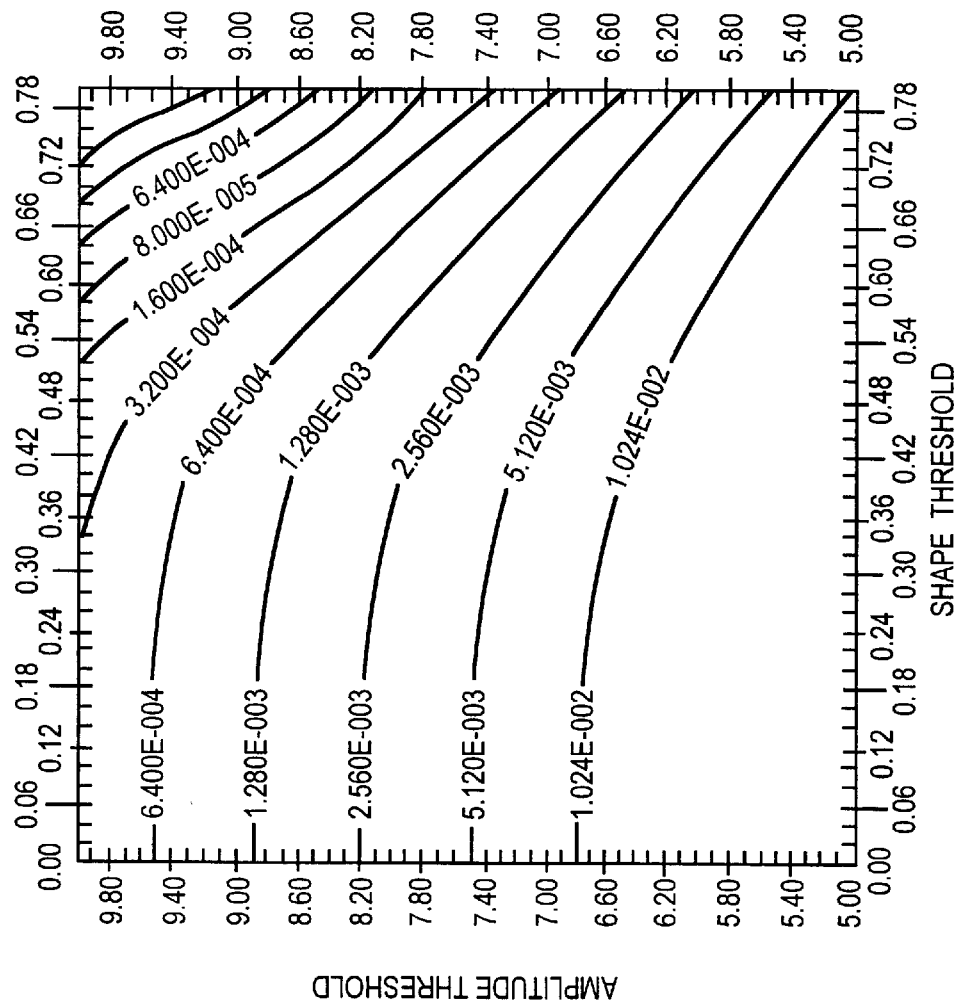
FIGS. 5I and 5J are graphs that show, respectively, the corresponding amplitude and shape threshold exceedance probabilities of a false clutter peak and the MDT using a method in accordance with the present invention.
Figure 5J:
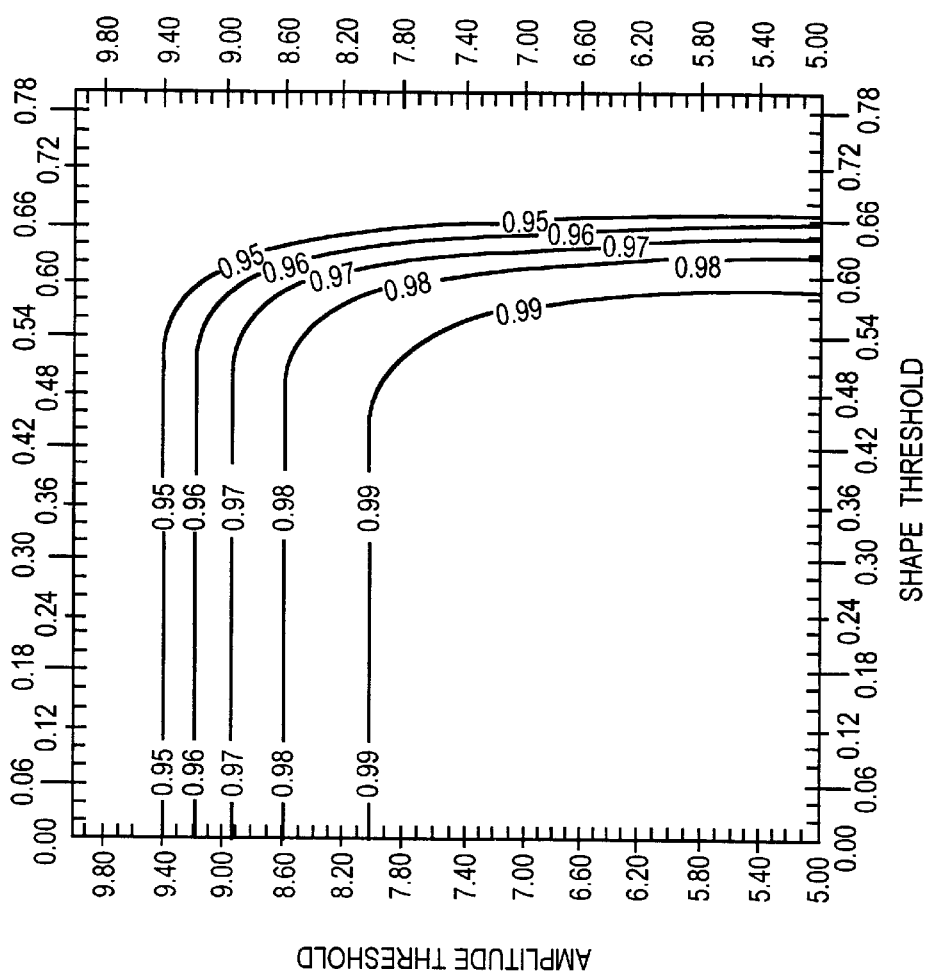

FIG. 5H shows the clutter and Minimum Detectable Target (MDT) probability densities vs. their peak amplitudes and shape parameters, as obtained from high-fidelity simulation of SSGM Scene #1. FIGS. 5I and 5J show, respectively, the corresponding amplitude and shape threshold exceedance probabilities of a false clutter peak and the MDT. Suppose that the TDP peak amplitude threshold has been at 7.5. Then it can be concluded from FIG. 5I that a shape threshold of 0.52 will eliminate (2.56/5.12)=50% of the clutter peaks. FIG. 5J shows that less than 1% of the MDT hits would be lost with this shape threshold.

This analysis has treated point source targets only. The need to detect extended objects will cause the shape threshold to be lowered. For the purpose of timing and sizing analysis, the percentage of clutter peaks which can be eliminated by the pulse shape test has therefore been set equal to 10%.

The Pulse Shape Test algorithm 100 receives the following inputs:

Amp(..)=5 amplitudes in the form of a cruciform around the peak amplitude

J,ROW=j-time and row of the peak amplitude

T=In scan threshold (nominally −0.25)

T1=Cross scan threshold 1 (nominally −0.2)

T2=Cross scan threshold 2 (nominally −0.8)

The Pulse Shape Test algorithm 100 outputs the following data:

Amp(..)=5 amplitudes in the form of a cruciform around the peak amplitude

J,ROW=j-time and row of the peak amplitude if the peak is not rejected

The Pulse Shape Test algorithm 100 fits a two-dimensional parabola (in-scan and cross-scan) to the amplitude data and then computes the second derivative for each of the parabolas (in-scan and cross-scan) and normalizes by the peak amplitude. The test then thresholds the normalized second derivatives. The following equation summarizes the required processing.

Let S(x)=in scan parabola

Let X(y)=cross scan parabola $\ddot{S}$=AMP(J−1,Row)−2AMP(J,Row)+AMP(J+1,Row)

$\ddot{X}$=AMP(J,Row−1)−2AMP(J,Row)+AMP(J,Row+1)

Reject packet as extended object when:

$$\frac{\ddot{S}}{AMP(J, Row)} > T \text{ or } \frac{\ddot{X}}{AMP(J, Row)} > T1 \text{ or } \frac{\ddot{X}}{AMP(J, Row)} < T2$$

Position and amplitude differential correction is performed on peaks as follows.

A Pechan Wobble Correction Bearing Runout algorithm 120 receives the following inputs:

Inductosyn_Angle=Inductosyn Angle of measurement

Az=Azimuth of measurement

El=Elevation of measurement

The Pechan Wobble Correction Bearing Runout algorithm 120 outputs corrected values for azimuth and elevation using the following processing:

Az=Az+Az_Correction (Inductosyn_Angle, El)

El=El+El_Correction (Inductosyn_Angle, El)

where Az_Correction and El_Correction are derived from ground-supplied look-up tables. Additional bearing runout corrections may be supplied by onboard calibration, based upon the observed differences between predicted and measured clutter points.

A Wobble Error Update algorithm 212 includes an Estimate Prediction Error algorithm 214 that receives the following inputs:

[$\vec{u}_{3p}(j)$]=predicted clutter point ECI LOS of object j at time $t_3$, j=1,2, ... N

Figure 5K:
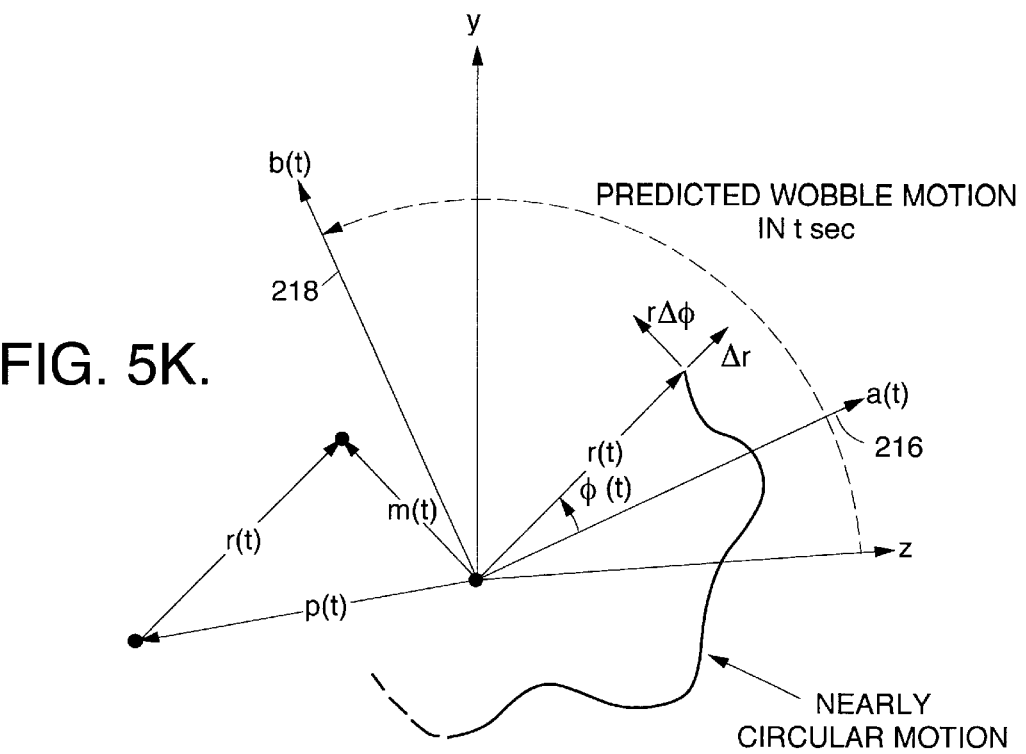
FIG. 5K is a diagram depicting a coordinate system used for prism wobble prediction.

[$\vec{u}_3(j)$]=observed clutter point ECI LOS of object j at time $t_3$, j=1, 2, ... N The Estimate Prediction Error algorithm 214 outputs estimated wobble error components in third viewing opportunity, given by [δa'(3)] and [δb'(3)], using the following processing:

Referring to FIG. 5K, let the origin of the coordinate system be the center of a perfect Pechan prism; i.e., without bearing runout or Limacon error. The a and b axes 216 and 218, are chosen to be, respectively, along and perpendicular to the direction of maximum optical error magnification. The revisit-time-averaged estimates of the a,b components of the earth-fixed point position prediction errors [δa'(3)] and [δb'(3)] are, respectively, the estimated wobble errors along the a and b axes 216 and 218 in the third viewing opportunity.

Let [$\vec{p}_{3p}(j)$] and [$\vec{p}_3(j)$] be, respectively, the projections of [$\vec{u}_{3p}(j)$] and [$\vec{u}_3(j)$] onto the focal plane, for j=1,2 ... N. The corresponding components of the wobble error are $\delta a'(j) = (0.5)[\vec{p}_3(j) - \vec{p}_{3p}(j)] \cdot [\vec{a}(t_3) - \vec{a}(t_4)]$ $\delta b'(j) = (0.5)[\vec{p}_3(j) - \vec{p}_{3p}(j)] \cdot [\vec{b}(t_3) - \vec{b}(t_4)]$ where $\vec{r}(t)$=wobble error Δr(t), Δφ(t)=independent random walks $\vec{p}(t)$=clutter point prediction $\vec{m}(t)$=clutter point measurement T=acquisition sensor revisit time Then, $$\delta a'(3) = \left[\sum_{j=1}^{N} \delta a'(j)\right] / N$$

$$\delta b'(3) = \left[\sum_{j=1}^{N} \delta a'(j)\right] / N$$

The Wobble Error Update algorithm 212 also includes an Update Recursive Filter algorithm 220 that receives [δa'(3)] and [δb'(3)] as input and outputs components of the predicted wobble error at the next revisit time, given by

[δâ'($t_i$+T), δb̂'($t_i$+T)]

where T is the acquisition sensor revisit time, using the following processing:

The corrections for optical magnification are

δa(i)=[δa'(i)]/(a magnification)

δb(i)=[δb'(i)]/(b magnification)

Assume that at any time $t_i$ the real center of the prism is moving along the arc of a circle with radius $r_i$ and at angular speed $\omega_i$. The Cartesian components of the true (after correction for optical magnification) prism error are $\delta a_i = r_i \cos \omega_i$ $\delta b_i = r_i \sin \omega_i$ where $\omega_i$ is the angular position at $t_i$ and $$\left(\frac{d\varphi}{dt}\right)_i = \omega_i$$

Assuming that $r_i$ and $\omega_i$ remain constant, the predicted errors T seconds later are $\delta\hat{a}_{i+1} = r_i \cos(\phi_i + \omega_i T)$ $\delta\hat{b}_{i+1} = r_i \sin(\phi_i + \omega_i T)$ But the radius and angular rate will change during $\Delta$, according to $$r_{i+1} = r_i + \delta r_{i+1}$$

$$\omega_{i+1} = \omega_i + \delta\omega_{i+1}$$

where $\delta r_i$ and $\delta\omega_i$ are assumed to be white state noise increments. Then (approximately)

$$\Delta a_{i+1} = a_{i+1}(\text{measured}) - \hat{a}_{i+1} = \delta r_i(\cos \hat{\varphi}_{i+1}) - (r_i\delta\omega_i T)/2$$

$$\Delta b_{i+1} = b_{i+1}(\text{measured}) - \hat{b}_{i+1} = \delta r_i(\sin \hat{\varphi}_{i+1}) + \cos (\hat{\varphi}_{i+1}) (r_i\delta\omega_i T)/2$$

where $$\hat{\varphi}_{i+1} = (\varphi_i + \omega_i T)$$

The single-revisit-time estimates of $\delta r_i$ and $\delta\omega_i$ are $$\begin{pmatrix} \delta r_{i+1} \\ \delta\omega_{i+1} \end{pmatrix} = \begin{bmatrix} \cos\hat{\varphi}_{i+1} & \sin\hat{\varphi}_{i+1} \\ -(2\sin\hat{\varphi}_{i+1})/(r_i T) & (2\cos\hat{\varphi}_{i+1})/(r_i T) \end{bmatrix} \begin{bmatrix} \Delta a_{i+1} \\ \Delta b_{i+1} \end{bmatrix}$$

These estimates will be available after each Acquisition sensor revisit time interval (T), which is four times per Pechan prism rotation with a two-spoke system.

Sequentially-updated estimates of $\delta r_i$ and $\delta\omega_i$ are obtained from $$\delta r_{i+1}^* = \delta r_i^* + K_R(\delta r_{i+1} - \delta r_i^*)$$

$$\delta\omega_{i+1}^* = \delta\omega_i^* + K_{107}(\delta\omega_{i+1} - \delta\omega_i^*)$$

where $K_R$ and $K_\omega$ are ground-supplied filter constants. The continuously-varying wobble parameters are then estimated to be:

$$r_{i+1}^* = r_i^* + \delta r_{i+1}^*$$

$$\omega_{i+1}^* = \omega_i^* + \delta\omega_{i+1}^*$$

and the estimated errors are $$a = \delta a'(t_i + T) = [(r_{i+1}^*) (\cos \hat{\varphi}_{i+1})](\text{a magnification})$$

$$b = \delta b'(t_i + T) = [(r_{i+1}^*) (\sin \hat{\varphi}_{i+1})](\text{b magnification})$$

The Wobble Error Update algorithm 212 also includes a Correct Acquisition Sensor Angular Bias algorithm 222 that uses cataloged earth-fixed sources to correct the angular bias of the acquisition sensor.

A Wobble Differential Correction algorithm 224 receives the following inputs:

a=estimate from previous scan of A error
b=estimate from previous scan of B error
Az=Azimuth after Optical distortion, etc.
El=Elevation after Optical distortion, etc.
t=Time of (Az, El)

The Wobble Differential Correction algorithm 224 outputs an azimuth and an elevation after wobble differential correction using the following processing I=Inductosyn Angle (t)

$\vec{A} = (\cos I, \sin I)$ $\vec{B} = (\sin I, \cos I)$ $\vec{E}a = a \cdot \vec{A}$ $\vec{E}b = b \cdot \vec{B}$ $\vec{P}\text{fpa} = (\text{el} \cdot \cos Az, El \cdot \sin Az)$ $\vec{P}\text{fpa\_Corrected} = \vec{P}\text{fpa} + \vec{E}a + \vec{E}b$ Az=arctan (Pfpa_Corrected_Y/Pfpa_Corrected_X)

El=Norm ($\vec{P}$fpa_Corrected)

A Position Dependent Correction algorithm 122 corrects the j, k position of each peak by finding corrections $\Delta j$, $\Delta k$ from a ground-supplied, tabular function of FPA position variables j,k and algebraically adds $\Delta j$, $\Delta k$ to j,k.

A Focal Length Correction algorithm 124 corrects the j, k position of each peak by replacing k with (k)×(scale factor), where the scale factor is supplied by an Acquisition Sensor Focal Length Update algorithm 126. The scale factor is determined by comparing the radial position of a calibrated light source to the measured radial position as determined from the FPA detectors. Differences are interpreted as due to focal length variation from which the scale factor is calculated.

The ODP 43 identifies peak packets emanating from each of two calibration light sources at each light source detection by comparing corrected Parabolic Pulse Match azimuths and elevations with predicted light source positions. Let the difference between the measured and predicted elevations at time i be denoted as [$\Delta$ELL(i)]. Let the difference between the estimate of focal length at time i and the nominal value be $\Delta F(i)$. Modelling the time variation of focal length as a random walk, a sequential estimate of the variation is $$\Delta F(i) = \Delta \hat{F}(i-1) + K_2[\Delta ELL(i) - K_1 * \Delta F(i-1)]$$

where $$K_1 = \left[\frac{\text{elevation estimate change}}{\text{focal length change}}\right]$$

$$K_2 = \text{filtergain}$$

The filter gain is set by ground command, tuned to give the best averaging time. The elevation estimate for each peak packet is scaled by the ratio of the corrected focal length to the nominal focal length.

A TDP Algorithm Calibration algorithm 101 uses formulae for $\Delta$(AZ). $\Delta$(EL), and $\Delta$(AMP) as a function of EL and SCA parameters to correct for effects of simplifying approximations used in digital TDP processing. These formulae are as follows:

Azimuth position =

{ [I-time of peak sample]

− [spike detection I-time delay (2)]

− [rate restore factor (SCA dependent) − 1]

− [(I-time delay) * (rate restore factor)]

+ [0.5 * (rate restore factor)]

* [(phasing correction by parabolic pulse match) *

(rate restore factor)] }

-continued

* (I-time sample angular spacing)

+ [TDI error correction]

+ [half-SCA alignment correction]

+$\tan^{-1}$ [0.5*(half SCA spacing in detector width + TDI detector spacing in detector width)/(detector elevation of peak in unit of detector width)]

+ [Azimuth off-set of SCA center line]

TDI error correction = (TDI detector spacing)

− (number of J-sample delay in TDI) * (rate restore factor) * (I-sample angular spacing)

Half-SCA alignment correction:

half-SCA alignment error: HSCADE = (half SCA spacing)

− (peak detector elevation: detector widths in radians)

* (rate restore factor) * (I-sample angular spacing)

If peak detector is in lagging half-SCA, half-SCA alignment correction = 0.5 * HSCADE If peak detection in leading half-SCA, half-SCA alignment correction = − 0.5 * HSCADE Elevation position =

(elevation in radians of bottom detector producing peak packet)

+0.5 * (detector number from bottom − 1) * (detector widths in radians)

+ (phasing correction from parabolic match in fractional J-sample spacing)

* (rate restore factor) * (I-sample angular sample spacing in radians)

A table of Δ(AMP) vs. TDP sigma and amplitude are also provided for each SCA to account for the effect of the clutter-adaptive background filter length. Each SCA table has 256 entries, corresponding to eight sigma values and eight amplitude values. The TDP-sigma is provided in each peak packet. The amplitude estimate is obtained from the Parabolic Pulse Match Interpolation algorithm 74.

An Optical-Distortion-Like Calibration algorithm 105 uses Δ(AZ) and Δ(EL) corrections as a function of (EL) that are described by a 4th order polynomial for each SCA.

A Systematic Detector Non-linear Responsivity Error algorithm 107 uses Δ(AMP) vs. (AMP) corrections that are described by a 4th order polynomial for each SCA. The coefficients of these polynomials will be set to zero if test results show that this type of correction is not useful.

An Angle Bias Correction algorithm 128 corrects the j,k position of each peak by replacing j,k with j+$\Delta j_b$, k+$\Delta k_b$, where $\Delta j_b$ and $\Delta k_b$ are ground-supplied corrections.

The Local SCA to Global Coordinate Conversion algorithm 102 computes the azimuth and elevation angle of each peak. Prior to this conversion, the peak position is represented in FPA coordinates.

The Local SCA to Global Coordinate Conversion algorithm 102 receives the following inputs:

$bias_{Az}$(SCA)=Calibration table of angle between scan bar and SCA centerline in radians $bias_{system}$(SCA)=Calibration table of various system delays in units of i-time J=j-time of peak J2I(SCA)=SCA dependent conversion factor from j-time to i-time R(Row,SCA)=radial distance to Row on SCA in meters Row=row of peak SCA=SCA of peak α=Conversion factor from radial distance to angular elevation in radians/meter $\omega_{scan}$=scan rate in radians/second Δ=distance from middle of leading half SCA to halfway point between half SCAs Δi=length of an i-time in seconds ΔJ=J-time correction from Parabolic Pulse Match ΔK=Row correction from Parabolic Pulse Match $T_{sos}$=Time at start of scan in seconds The outputs of the Local SCA to Global Coordinate Conversion algorithm 102 are:

Az=azimuth of peak in radians

El=elevation of peak in radians t=time of peak in seconds

The Local SCA to Global Coordinate Conversion algorithm 102 performs the following processing:

$$Az = ((J + \Delta J)J2I(SCA) + bias_{system}(SCA))(\Delta i)(\omega)_{scan} +$$

$$bias_{AZ}(SCA) - \tan^{-1}\left(\frac{\Delta}{R(Row,\ SCA)}\right)$$

R=R(Row)+ΔK

E1=αR t=((J+ΔJ)J2I(SCA)+$bias_{system}$(SCA))Δi+$T_{SOS}$

The Match Peaks and Windows algorithm 104 matches current peak packets against previously computed windows. The windows include clutter windows, maximum velocity target windows, Clutter Tracker target windows, and Target Tracker target windows.

The Match Peaks and Windows algorithm 104 receives the following inputs:

($Az_{peak}$(•),$El_{peak}$(•))=List of peaks ($Az_{window}$(•),$El_{window}$(•),$\Delta Az_{window}$(•),$\Delta El_{window}$(•))=List of windows The outputs of the Match Peaks and Windows algorithm 104 are:

Matching_Peaks (•)=List of peaks which match a window and which window it matches.

Non_Matching_Peaks (•)=List of peaks which match no window.

The Match Peaks and Windows algorithm 104 uses the following logic:

$(Az_{peak}^{(l)}, El_{peak}^{(l)})$ matches $(Az_{window}^{(m)}, El_{window}^{(m)}, \Delta Az_{window}^{(m)}, \Delta El_{window}^{(m)})$ if $|Az_{peak}^{(l)} - Az_{window}(m)| < \Delta Az_{window}^{(m)}$ and $|El_{peak}^{(l)} - El_{window}^{(m)}| < \Delta El_{window}^{(m)}$ The N-Point Intensity Slope Test algorithm 106 classifies a peak as either a "clutter hit" or a "target." An N-point least squares fit shall be performed to determine the slope.

The N-Point Intensity Slope Test algorithm 106 receives the following inputs:

($t_1$, $A_1$)=time and amplitude of peak from scan 1

($t_2$, $A_2$) time and amplitude of peak from scan 2

($t_3$, $A_3$)=time and amplitude of peak from scan 3 if available ($t_4$, $A_4$)=time and amplitude of peak from scan 4 if available T=slope threshold The N-Point Intensity Slope Test algorithm 106 performs the following processing:

Let N=number of points involved in a least squares fit=3.

Let $$s = \text{slope} = \frac{N \sum t_i A_i - \sum t_i \sum A_i}{N \sum t_i^2 - (\sum t_i)^2}$$

The N-Point Intensity Slope Test algorithm 106 classifies the peak as a target if $$s > T\left(\frac{\sum A_i}{N}\right);$$

otherwise, the peak is classified as clutter.

The 3 per 4 motion test 112 eliminates non-persistent clutter points. The term "3 per 4" is used in the context that this test classifies an object as a target if it is tracked for 3 out of 4 consecutive scans with hits in the third and fourth (latest) scan required. A motion bin is centered on each point in the latest scan, with a bin radius equal to the maximum angular distance that a target can move in a scan. A straight line track is formed with each third-scan object in a fourth-scan object's motion bin. Each such track is extended to the first and second scan, and a small test bin is centered on the first and second frame prediction. The object is declared a possible target if a peak position is found in its first or second frame test bin. Otherwise, the object is declared a noise point and deleted.

The 3 per 4 Motion Test algorithm 112 receives the following inputs:

($A_1, E_1$)=Azimuth and Elevation for target on first scan $t_1$=time of validity of ($A_1, E_1$)

($A_2, E_2$)=Azimuth and Elevation for target on second scan $t_2$=time of validity of ($A_2, E_2$)

$\vec{x}_1$=ECI coordinates of FPA x axis at time $t_1$ $\vec{y}_1$=ECI coordinates of FPA y axis at time $t_1$ $\vec{z}_1$=ECI coordinates of FPA z axis at time $t_1$ $\vec{x}_2$=ECI coordinates of FPA x axis at time $t_2$ $\vec{y}_2$=ECI coordinates of FPA y axis at time $t_2$ $\vec{z}_2$=ECI coordinates of FPA z axis at time $t_2$ $\vec{x}_3$=ECI coordinates of FPA x axis at time $t_3$ $\vec{y}_3$=ECI coordinates of FPA y axis at time $t_3$ $\vec{z}_3$=ECI coordinates of FPA z axis at time $t_3$ $\vec{x}_4$=ECI coordinates of FPA x axis at time $t_4$ $\vec{y}_4$=ECI coordinates of FPA y axis at time $t_4$ $\vec{z}_4$=ECI coordinates of FPA z axis at time $t_4$ The 3 per 4 Motion Test algorithm 112 outputs the following values.

$(\hat{A}_3, \hat{E}_3, \hat{t}_3)$=predicted azimuth, elevation, and time for target on 3rd scan $(\Delta A_3, \Delta E_3)$=bin size $(\hat{A}_4, \hat{E}_4, \hat{t}_4)$=predicted azimuth, elevation, and time for target on 4th scan $(\Delta A_4, \Delta E_4)$=bin size The 3 per 4 Motion Test algorithm 112 performs the following processing:

$\vec{u}_1 = \sin E_1 \cos A_1 \vec{x}_1 + \sin E_1 \sin A_1 \vec{y}_1 + \cos E_1 \vec{z}_1$ $\vec{u}_2 = \sin E_2 \cos A_2 \vec{x}_2 + \sin E_2 \sin A_2 \vec{y}_2 + \cos E_2 \vec{z}_2$ $\vec{u}_3 = (2\vec{u}_2 - \vec{u}_1)/\|2\vec{u}_2 - \vec{u}_1\|$ $\hat{E}_3 = \cos^{-1}(\vec{u}_3 \cdot \vec{z}_3)$ $\hat{A}_3 = a\tan 2(\vec{u}_3 \cdot \vec{y}_3, \vec{u}_3 \cdot \vec{x}_3)$ $t_3 = 2t_2 - t_1$ $\hat{\vec{u}}_4 = (3\vec{u}_2 - 2\vec{u}_1)/\|3\vec{u}_2 - 2\vec{u}_1\|$ $\hat{E}_4 = \cos^{-1}(\vec{u}_4 \cdot \vec{z}_4)$ $\hat{A}_4 = a\tan 2(\vec{u}_4 \cdot \vec{y}_4, \vec{u}_4 \cdot \vec{x}_4)$ $t_4 = 3t_2 - 2t_1$ $(\Delta A_3, \Delta E_3)$=predefined constants $(\Delta A_4, \Delta E_4)$=predefined constants where $$\text{atan2}(n, d) = \begin{cases} \pi/2 & d = o, \; n > o \\ 3\pi/2 & d = o \;\; n < o \\ \tan^{-1}(n/d) & d > o \;\; n > o \\ \tan^{-1}(n/d) + 2\pi & d > o \;\; n < o \\ \tan^{-1}(n/d) + \pi & d < o \\ o & n = o \end{cases}$$

In order to reduce false alarms caused by semi-persistent clutter and to estimate target range and range rate for the purpose of handover to another sensor platform, the ODP 43 includes a Booster Typing and Parameter Estimation Test algorithm 130. The processing performed by the Booster Typing and Parameter Estimation Test algorithm 130 was performed using a ground-based processor in prior surveillance systems. The Booster Typing and Parameter Estimation Test algorithm 130 operates as follows.

By way of background, a booster following a simple gravity-turn trajectory rises vertically from the launch point for $t_R$ seconds after launch (at a time $t_L$), when an impulse is applied to the velocity (V) so as to achieve a desired launch azimuth (A) and flight path angle ($\phi$). This kick-over time is $t_K = t_L + t_R$. Launch azimuth is the angle between the trajectory ground trace and North at $t_K$. Flight path angle is measured between the velocity vector and the local horizontal at $t_K$. Thereafter, the vehicle points its thrust vector along the velocity vector until shutoff, after the desired burn time ($t_B$).

The thrust acceleration at any time t is [T/m(t)], where T is the thrust force, m(t) is the vehicle mass given by $$m(t) = m_L - \dot{m}(t - t_L)$$

and $\dot{m}$, $m_L$ are, respectively, the mass flow rate and mass at launch. The drag force is $C_D \times$(atmospheric density)$\times V^2$, where $C_D$ is the drag coefficient. The atmospheric density may be approximated by an exponential function of altitude.

Thus, a single stage of a simple gravity turn trajectory is completely specified by eleven constants:

(1) LAT=latitude of launch site
(2) LON=longitude of launch site
(3) $t_R$=vertical rise time (assumed fixed)
(4) $m_L$=vehicle mass at lift-off
(5) $\dot{m}_1$=mass flow rate
(6) $T_1$=thrust force
(7) $C_{D1}$=drag coefficient
(8) $t_L$=launch time
(9) $\phi$=kick-over angle
(10) A=launch azimuth
(11) $t_B$=burn time=(burnout time-$t_L$)

The first seven are booster constants, for which a priori information is available. The other four are kinematic constants, which can only be estimated in real time. The constants LAT, LON, $T_L$ and A specify the inertial position and orientation of the booster plane-of-motion, while the other constants specify the in plane characteristics. For example, the booster altitude and altitude rate can be calculated unambiguously at any time $\Delta$ after $t_L + t_R$.

The ODP 43 will perform a simplified booster typing and parameter estimation hypothesis test by assuming that the curve-fit data used to define a given line-of-sight state vector was obtained from a gravity-turn, boosting trajectory. A powered flight extension of the Laplace method of Initial Orbit Determination will be used to estimate, at the center of a given observation interval, booster time from kick-over and the corresponding altitude and altitude rate. For any given booster type/loft hypothesis, these parameters are then used to calculate LOS acceleration residual at the center of the observation interval. This value shall be compared to a threshold to determine whether the booster hypothesis is acceptable. If more than one hypothesis is acceptable, the minimum LOS acceleration residual will be chosen to denote the best booster vehicle type/loft hypothesis. Otherwise, "No Match" will be declared.

The input to the process will be (1) LOS state vector $[u(t_o), \dot{u}(t_o), \ddot{u}(t_o)]$ at the epoch time $t_o$, where the observation interval was a segment of a powered flight (thrusting) trajectory; and (2) the Booster LOS Template matrix which is a 3M by N array describing M booster types, each with a depressed, nominal and lofted profile, and N postulated times from Kickover ($\Delta$) corresponding to typical fist look and subsequent values. Each row of the matrix contains, for each vehicle type/loft (m): time from kickover ($\Delta$), and the corresponding vehicle altitude (H); altitude rate ($\dot{H}$); and thrust acceleration divided by speed (T).

The output of the process is (1) A vehicle type and loft estimate, an estimate of time from kickover at $t_o$, and the corresponding estimates of altitude, altitude range, range, and range rate at $t_o$, or (2) the declaration "No Match" if no meaningful estimate of booster type and loft can be made.

The processing to be performed is as follows. Define the observables $$a = [\ddot{u}(t_o)] \cdot [u(t_o) \times \dot{u}(t_o)]$$
$$b = [\dot{s}(t_o)] \cdot [u(t_o) \times \dot{u}(t_o)]$$
$$c = [\ddot{s}(t_o)] \cdot [u(t_o) \times \dot{u}(t_o)]$$

components of $\ddot{u}$, $\dot{\vec{s}}$ and $\ddot{\vec{s}}$ in the orthogonal $(\vec{u} \times \dot{\vec{u}})$ and $(\dot{\vec{u}})$ directions $$d = [\ddot{u}(t_o)] \cdot [\dot{u}(t_o)]$$
$$e = [\dot{\vec{s}}(t_o)] \cdot [\dot{u}(t_o)]$$
$$f = [\ddot{\vec{s}}(t_o)] \cdot [\dot{\vec{u}}(t_o)]$$

Solve the following equation by Newtonian iteration:

$$G(\Delta) = [r(\Delta)]a + \left(\frac{\mu}{s^3}\right)[g(\Delta) - 1]b - [T(\Delta)]c = 0$$

where
$\Delta$=time from kick-over at $t_0$
$g(\Delta) = [S^3(t_0)]/R^3(\Delta)$
$r(\Delta) = [u(t_0) \cdot s(t_0)] - x(\Delta)$
$x(\Delta) = [R^2(\Delta) - s^2(t_0) + u(t_0) \cdot s(t_0)]^{1/2}$
$\mu$=(gravitational constant)*(earth mass)

Note that
$[G(\Delta)][R(\Delta)]^3/(MB)$=same as IOD F(r) except:

$$r, R(r) \rightarrow r(\Delta), R(\Delta) \text{ and } r\ddot{u} \rightarrow [r(\Delta)\ddot{u} - T(\Delta)]$$

The curve-fit LOS and its derivatives at the center of the tracking interval are equivalent to two angle measurements at the beginning, middle and end of the tracking interval. These six measurements in the ballistic IOD case are used to calculate the three position components and three velocity components of the ECI state vector of the object, using Newtonian mechanics to relate object acceleration to range. Object acceleration for a gravity-turn booster with known profile and known vertical rise time, on the other hand, is determined by time from kickover. Both IOD and booster template matching can therefore be reduced to a single-parameter search.

If $\Delta_i$ is an estimate of $\Delta$, the next iteration will yield the value $$\Delta_{i+1} = \Delta_i + (d\Delta)_{i+1}$$

where $$G(\Delta_i) + \left[a\left(\frac{\partial r}{\partial \Delta}\right) + \left(\frac{b\mu}{S^3}\right)\left(\frac{\partial g}{\partial \Delta}\right) - c\left(\frac{\partial T}{\partial \Delta}\right)\right](d\Delta_{i+1}) = 0$$

$$\left(\frac{\partial r}{\partial \Delta}\right) = -[R(\Delta)\dot{H}(\Delta)]/[x(\Delta)]$$

$$\left(\frac{\partial g}{\partial \Delta}\right) = -3\left[\frac{S^3(t_0)}{R^4(\Delta)}\right]\dot{H}(\Delta)$$

Convergence at iteration i+1 is true when $d\Delta_{i+1} \leq$ (threshold #1)

Then set $\Delta_t=\Delta$ and calculate $$P(\Delta) = [r(\Delta)]d + (\mu/s^3)[g(\Delta) - 1]e - [T(\Delta)][f + r(\Delta)\ddot{u}^2]$$

$$SOS(\Delta) = [G(\Delta)]^2 + [P(\Delta)]^2$$
$$= (r\dot{u})^2 * [LOS\ \text{acceleration data residuals}]$$

where the LOS acceleration data residuals are the sum-of-squares of the components in the plane perpendicular to $\vec{u}$. Declare an acceptable boost vehicle type/loft match if, and only if, $$SOS(\Delta) \leq (\text{threshold \#2})$$

Continue through all of the 3M vehicle type/loft hypotheses and choose the smallest SOS as denoting the best booster hypothesis. If no SOS is acceptable, then declare "No Match".

This process is to be repeated for selected entries in the Booster LOS template test matrix at each hypothesis testing time. The most recent test is to supersede previous tests, because it is based upon the line-of-sight state vector which has been obtained as a curve-fit to the longest span of booster thrusting.

A successful match to an entry in the booster template matrix allows the burnout state vector to be estimated. Given a vehicle type and loft estimate, an estimate of time from kickover at $t_0$, and the corresponding estimates of range and range rate at $t_0$, satellite platform ephemeris $s(t)$, $\dot{s}(t)$ estimates of booster burnout time ($t_b$) and ECI position and velocity vectors $R(t_b)$, $V(t_b)$ can be calculated as follows:

(1) Identify booster burnout by a greater than 50% drop in intensity between adjacent acquisition sensor observation times.

(2) Estimate the burnout time ($t_b$) to be the average of the bracketing observation times.

(3) Extrapolate the R and $\dot{R}$ estimates from the last LOS template test to $t_b$ to produce an altitude and altitude rate estimate at burnout: $H(t_b)$, $\dot{H}(t_b)$ (4) Calculate range and range date at $t_b$ (5) Extrapolate LOS state to $t_b$ to obtain $\vec{u}(t_b)$, $\dot{u}(t_b)$ (6) $\vec{R}(t_b) = \vec{S}(t_b) + [\vec{r}(t_b)][\vec{u}(t_b)]$ (7) $\vec{V}(t_b) = \dot{S}(t_b) + [\vec{r}(t_b)][\dot{u}(t_b)] + [\dot{r}(t_b)][\vec{u}(t_b)]$ This state vector can be propagated to a post-boost point and the resulting sensor-to-target range used to initialize and/or improve the accuracy of the Initial Orbit Determination algorithm 131, that operates in a manner similar to the Laplace IOD algorithm used in the MSX Onboard Signal and Data Processor. This initialization process should cause the IOD algorithm 131 to converge with a relatively short arc of track sensor observations. The probability of a false solution (doppelganger) should be negligible.

The IOD algorithm 131 operates as follows: (1) the LOS acceleration vector is determined by differentiating the LOS velocity vector; (2) the object ECI acceleration and the sensor ECI acceleration are set equal to the gravitational acceleration of the object and the sensor, respectively; and (3) the following calculations are performed:

$$\ddot{\vec{u}}_o \cdot (\vec{u}_o x \vec{u}_o) = (\mu/S^3 \vec{S} - \mu/R^3 \vec{R}) \cdot (\vec{u}_o x \vec{u}_o)/r$$

where $\mu$=(Gravitational Constant)*(Earth Mass)

Then (4)

$$F(r)=\{(r/\mu)[\ddot{\vec{u}}_o \cdot (\vec{u}_o x \vec{u}_o)]/[\vec{S} \cdot (\vec{u}_o x \vec{u}_o)]-1/S^3\} * \{r^2+2r(\vec{u}_o \cdot \vec{S})+S^2\}^{3/2}+1=0$$

and the range r is a root of $F(r)$, which can be found by Newtonian iteration. Similarly (5), $$(\ddot{\vec{u}}_o \cdot \dot{\vec{u}}_o) = \mu\left(\frac{\vec{u} \cdot \vec{S}}{r}\right)\left(\frac{1}{S^3} - \frac{1}{R^3}\right) - 2(\dot{\vec{u}}_o \cdot \vec{u})\left(\frac{\dot{r}}{r}\right)$$

Thus (6)

$$\vec{R} = \vec{S} + r\vec{u}_o$$

$$\vec{V} = \dot{\vec{S}} + r\{\dot{\vec{u}}_o - [\vec{u}_o/(2\dot{\vec{u}}_o \cdot \vec{u}_o)]*[(\dot{\vec{u}}_o \cdot \ddot{\vec{u}}_o) + (\mu/r)(1/R^3 - 1/S^3)(\dot{\vec{u}}_o \cdot \vec{S})]\}$$

New LOS observations update the estimates of range and range rate by linearizing the IOD equation about the previously-estimated range. This is a one step Newtonian iteration at every update time.

The Newtonian iterations to find r may or may not converge to a meaningful solution, depending upon the number of LOS vectors available, their noise characteristics, and the tracking geometry. Three forms of F(r) are possible, corresponding to no solution for r, a unique solution or a dual solution. The no solution case is handled by declaring "no convergence" and waiting for more LOS vectors in order to try again. The two solution case is adjudicated with information from the booster Booster LOS template test calculation. An interesting special case arises when the no-solution and two-solution cases merge to have F(r) be tangent to the r axis. This is a singular geometry case.

Aircraft tracking by the Track Sensor is initiated by a pointing command from the ground. After a LOS state vector has been established, the 3-D state vector $[R((t), V(t))]$ describing an aircraft moving with a constant velocity at a known altitude can be calculated directly from the angle-only equations because the H and $\dot{H}=0$ are known. The Booster LOS template test can be applied if, and only if, aircraft speed is also known. Aircraft maneuvers would appear as state noise. Maneuvers would have a significant effect upon platform-to-platform handover if only if the resulting deviation from a nominal straight line path, divided by the range to the second-platform track sensor, is comparable to the field of regard 30 of the track sensor 28.

The Earth-Fixed Prediction algorithm 110 predicts the position and time in FPA coordinates of a peak for the next scan.

The Earth-Fixed Prediction algorithm 110 receives the following inputs:

($A_1, E_1, t_1$)=azimuth, elevation, and time of measured clutter point during first scan $\vec{R}_{1+\Delta}$=prediction of where clutter point will be when scan bar passes clutter point on first scan ($\vec{x}_1, \vec{y}_1, \vec{z}_1$)=acquisition Tracker FPA coordinate system in ECI coordinates at time $t_1$ $\vec{S}_1$=spacecraft position at time $t_1$ in ECI coordinates ($\vec{x}_2, \vec{y}_2, \vec{z}_2$) acquisition Tracker FPA coordinate system in ECI coordinates at time $t_2$ ($\dot{x}_2, \dot{y}_2, \dot{z}_2$)=acquisition Tracker FPA coordinate system derivative in ECI coordinates at time $t_2$ $\vec{S}_1$=spacecraft position in ECI coordinates at time $t_2$ $\dot{S}_1$=spacecraft velocity in ECI coordinates at time $t_2$ $(\vec{x}_{2+\Delta}, \vec{y}_{s+\Delta}, \vec{z}_{2+\Delta})$=acquisition Tracker FPA coordinate system in ECI coordinates at time $t_{2+\Delta}$ $\vec{S}_{2+\Delta}$=spacecraft position in ECI coordinates at time $t_{2+\Delta}$ $T_s$=nominal acquisition sensor revisit time $W_E$=nominal earth rotation rate about z ECI axis (nominally $\frac{2\pi \text{ radians}}{86400 \text{ sec}}$)

R=nominal radius of earth

S=nominal radius of spacecraft orbit $W_1, W_2$=filter constants

The Earth-Fixed Prediction algorithm 110 outputs the following values:

$(A_{2+\Delta}, E_{2+\Delta}, t_{2+\Delta})$=azimuth, elevation, and time when scan bar passes clutter point on second scan $(\Delta A, \Delta E)$=bin size $\vec{R}_{2+\Delta}$=prediction of where clutter point will be when scan bar passes clutter point on second scan (used as $\vec{R}_{1+\Delta}$ on next scan)

The Earth-Fixed Prediction algorithm 110 determines the unit vector going from a clutter point as seen on the FPA to a clutter point on earth in ECI coordinates at time t1 using the following equation:

$$\vec{u}_1 = \sin(E_1)(\vec{x}_1 \cos(A_1) + \vec{y}_1 \sin(A_1)) + \vec{z}_1 \cos(E_1)$$

To determine the ECI position of the clutter point on the earth at time t1, the following equations are used, assuming a nearly-circular spacecraft orbit:

Expanding $\|\vec{S}_1\|\cos(E_1) - (R^2 - \|\vec{S}_1\|^2 \sin^2(E_1))^{1/2}$ in a Taylor series about S, the nominal radius of the orbit, $$\hat{\vec{R}}_1 \approx \vec{S}_1 + \left(\cos E_1 + \frac{S \sin^2 E_1}{(R^2 - S^2 \sin^2 E_1)^{1/2}}(\|\vec{S}_1\| - S)\right)\vec{u}_1$$

If $\vec{R}_{1+\Delta}$ available then $\vec{R}_1 = w_1 \vec{R}_{1+\Delta} + w_2 \hat{\vec{R}}_1$ otherwise $\vec{R}_1 = \hat{\vec{R}}_1$ To predict, approximately, where the clutter point will be on the earth during the next scan, the following equations are used:

Initially let $\Delta t = 0$. Thereafter $\Delta t = t_{i+1} - t_i - T_s$ where $T_s$=nominal revisit time. Then position at time $t_2 = t_1 + T_s + \Delta t$ is $$\vec{R}_2 \approx \begin{bmatrix} R_{11} & R_{12} & 0 \\ R_{21} & R_{22} & 0 \\ 0 & 0 & 1 \end{bmatrix} \vec{R}_1$$

where, $R_{11} = \cos(\omega_E T_s) - (\omega_E \sin(\omega_E T_s))\Delta t$ $R_{12} = -\sin(\omega_E T_s) + (\omega_E \cos(\omega_E T_s))\Delta t$ $R_{21} = \sin(\omega_E T_s) + (\omega_E \cos(\omega_E T_s))\Delta t$ $R_{22} = \cos(\omega_E T_s) - (\omega_E T_s)\Delta t$ To calculate the azimuth where the clutter point will be seen on the FPA at time $t_2 = t_1 + T_s + \Delta t$, the following equation is used:

$$A_2 = a\tan 2((\vec{R}_2 - \vec{S}_2) \cdot \vec{y}_2, (\vec{R}_2 - \vec{S}_2) \cdot \vec{x}_2)$$

To calculate the azimuth velocity at time $t_2$ in order to determine the exact time and position when the scan bar sees the clutter point, the following approximation is used:

$$\dot{A}_2 = \begin{pmatrix} \cos A_2\left(\left(\dot{\vec{R}}_2 - \dot{\vec{S}}_2\right) \cdot \vec{y}_2 + (\vec{R}_2 - \vec{S}_2) \cdot \dot{\vec{y}}_2\right) - \\ \sin A_2\left(\left(\dot{\vec{R}}_2 - \dot{\vec{S}}_2\right) \cdot \vec{x}_2 + (\vec{R}_2 - \vec{S}_2) \cdot \dot{\vec{x}}_2\right) \\ (\cos A_2(\vec{R}_2 - \vec{S}_2) \cdot \vec{x}_2 + \sin A_2 (\vec{R}_2 - \vec{S}_2) \cdot \vec{y}_2) \end{pmatrix} \Bigg/$$

$$\dot{\vec{R}}_2 \approx \begin{bmatrix} -\omega_E(\sin(\omega_E T_s) + (\omega_E \cos(\omega_E T_s))\Delta t)R_{1,x} - \\ \omega_E(\cos(\omega_E T_s) - (\omega_E \sin(\omega_E T_s))\Delta t)R_{1,y} \\ \omega_E(\cos(\omega_E T_s) - (\omega_E \sin(\omega_E T_s))\Delta t)R_{11,x} - \\ \omega_E(\sin(\omega_E T_s) + (\omega_E \cos(\omega_E T_s))\Delta t)R_{1,y} \\ 0 \end{bmatrix}$$

To find the time that the scan bar hits the moving clutter point and the azimuth and elevation where they intersect, the following equations are used:

$$A_{2+\Delta} = A_2 + \dot{A}_2 \left( \frac{(t_2 \bmod T_s)\frac{2\pi}{T_s} - A_2}{\dot{A}_2 - \frac{2\pi}{T_2}} \right)$$

$$E_{2+\Delta} = \cos^{-1}\left( \frac{(\vec{R}_{2+\Delta} - \vec{S}_{2+\Delta}) \cdot \vec{z}_{2+\Delta}}{\sqrt{R^2 + 2(\vec{R}_{2+\Delta} - \vec{S}_{2+\Delta}) \cdot \vec{z}_{2+\Delta}\|\vec{S}_{2+\Delta}\| - \|\vec{S}_{2+\Delta}\|^2}} \right)$$

$$t_{2+\Delta} = t_2 + \left( \frac{(t_2 \bmod T_s)\frac{2\pi}{T_s} - A_2}{\dot{A}_2 - \frac{2\pi}{T_s}} \right)$$

$$\Delta = \left( \frac{(t_2 \bmod T_s)\frac{2\pi}{T_s} - A_2}{\dot{A}_2 - \frac{2\pi}{T_s}} \right)$$

where $$\vec{R}_2 \approx \begin{bmatrix} R_{11} & R_{12} & 0 \\ R_{21} & R_{22} & 0 \\ 0 & 0 & 1 \end{bmatrix}$$

and $R_{11} = \cos(\omega_E T_s) - (\omega_E \sin(\omega_E T_s))(\Delta t + \Delta)$ $R_{12} = -(\sin(\omega_E T_s) + (\omega_E \cos(\omega_E T_s))(\Delta t + \Delta))$ $R_{21} = \sin(\omega_E T_s) + (\omega_E \cos(\omega_E T_s))(\Delta t + \Delta)$ $R_{22} = \cos(\omega_E T_s) - (\omega_E \sin(\omega_E T_s))(\Delta t + \Delta)(\Delta A, \Delta E)$=predefined constants When performing the 3 per 4 motion test algorithm 112, hits from the fourth scan must be associated with hits from third scan. To do this a prediction is made by the Maximum Velocity Window Prediction algorithm 114 that the third scan hit will be seen at the same position as in the fourth scan but with an uncertainty (bin size) determined by the maximum velocity of the target. The Maximum Velocity Window Prediction algorithm 114 allows for three bin sizes for three classes of targets.

The Maximum Velocity Window Prediction algorithm 114 receives the following inputs:

($A_1,E_1$)=azimuth and elevation of the target on fourth scan

The Maximum Velocity Window Prediction algorithm 114 outputs the following values:

($A_2,E_2$) azimuth and elevation of the target on third scan ($\Delta A, \Delta E$)=uncertainty bin size on third scan The Maximum Velocity Window Prediction algorithm 114 performs the following processing:

($A_2,E_2$)=($A_1,E_1$)

($\Delta A, \Delta E$)=3 sets of predefined constants (1 per target class)

The Clutter Tracker 98 controls the false alarm rate out of the Acquisition TDP 40 on an SCA-by-SCA basis. The Acquisition Sensor False Alarm Control algorithm 116 uses the input data rates at various stages of Clutter Tracker processing to set the exceedance thresholds in the Acquisition TDP 40.

The ODP 43 allots three-eights of its commanded false alarm rate to the elevation swath corresponding to the top SCA 39, and one-eighth to each of the other five SCA's 39. These allotments were determined by simulation of Acquisition Sensor clutter rejection in the TDP, which showed clutter threshold exceedances to be approximately uniformly distributed on the lower portion of the physical (Cartesian) focal plane, while the top SCA 39 had a little more than twice as many as the others. An additional allotment can be made to the top SCA 39 when a sunlit crescent is predicted. The Cartesian focal plane is determined as follows.

The Acquisition Sensor FPA is in a plane perpendicular to the LOS axis (z), which nominally points to nadir. The x and y axes can be chosen relative to an arbitrary reference on the spacecraft. The Parabolic Pulse Match Interpolation algorithm 74 operates on TDP outputs to produce an FPA object "position", which comprises the time at which the object center crossed the center of the FPA and the linear distance from the bottom of the FPA where this occurred (measured in fractional detector widths). The object elevation angle (E) relative to the z axis (the "nadir angle") is proportional (after calibration) to this linear distance, because the Pechan prism is a fish-eye lens. Inductosyn measurements determine the Pechan prism rotation angle at the observation time, from which the object azimuth (A) relative to x can be calculated. With the ECI positions of x, y and z given at a 200 HZ rate, the ECI unit LOS vector from the spacecraft to the object at the FPA centerline crossing time t is then calculated as $$u(t)=[\sin E(t) \cos A(t)]x+[\sin E(t) \sin A(t)]y(t)+[\cos E(t)]z$$

The ODP 43 uses a smoothed sequence of such LOS vectors from an object to construct a "mono track", which is described by the LOS state vector estimate of $u_o, \dot{u}_o$, and $\ddot{u}_o$ at some arbitrary epoch time $t_0$.

The transformation from ECI to Cartesian FPA coordinates is straightforward. Let u(t) be the ECI prediction at time t, so that $$u_x(t)=[u(t) \cdot x(t)]=\sin E(t) \cos A(t)$$

$$u_x(t)=[u(t) \cdot y(t)]=\sin E(t) \cos A(t)$$

Then $$[X(t), Y(t)]=[E(t)/\sin E(t)]*[u_x,(t), u_y(t)]$$

Note that $$(\sin E/E)=1-E^2/3!+E^4/5!- \ldots$$

Is a well behaved function of E, e.g., the Cartesian FPA has no singularity at nadir.

It might seem that an earth-fixed coordinate system would be better suited for tracking clutter points and gathering statistics for false alarm and clutter throughput control, since clutter points (i.e., sunlit clouds), ought to be physically distributed approximately uniformly over the earth. If so, a sensor with infinite resolution capability would have to be blanked out at the horizon, where the partial derivative of earth footprint length with respect to sensor elevation angle goes to infinity. The Acquisition Sensor 22 does not have infinite resolution capability, however, and the clutter-adaptive algorithms in the Acquisition Sensor TDP 40 cause the detection of earth clutter to be distributed in a non-intuitive way.

Hi-Fi TDP simulation with U.S. Air Force Strategic Scene Generation Model scenes have shown that clutter points tend to be approximately uniformly distributed in linear (Cartesian) FPA space. Although it is true that this conclusion is inconsistent with well-known clutter exceedance patterns seen on other programs (e.g., hit sequences along cloud edges) it must be understood that such phenomena arise from sensor and algorithm characteristics, not inherent earth physics.

The SMTS TDP algorithms operate on object images which are smeared by the optics, detector convolution and finite sampling. These data are used to adapt the time constant of the background estimation filter to the clutter severity. Two-dimensional averaging is then applied to the background-subtracted data residuals in order to calculate a "sigma" value for the global threshold multiplier supplied by the ODP 43. The local detection threshold so obtained tends to cause adjacent hits to be suppressed, so that only well-separated, bright points appear.

Given an actual and desired throughput measurement, the ODP 43 interrogates a table of throughput need vs. TDP false alarm rate to find the desired rate. The threshold correction described above is then applied. This control is exercised every 128 ms.

The Acquisition Sensor False Alarm Control algorithm 116 determines whether the non-target peak packets input to the ODP 43 from the Acquisition Sensor TDP 40 are primarily Earth-Fixed False Alarms (EFFAS, e.g., due to persistent clutter points and other earth-fixed sources) or primarily Noise-Like False Alarms (NLFAs). In the first case, sun-oriented FPA bins are defined and EFFA-dependent threshold multipliers are calculated for each bin. In the second case, a common threshold multiplier is used for the entire acquisition field of regard 24. This multiplier can be ground commanded or calculated by the ODP 43 so as to cause a constant NLFA rate.

The Acquisition Sensor False Alarm Control algorithm 116 includes an Update EFFA Amplitude Histograms algorithm 117 that receives the following inputs:

(1) Amplitudes of EFFAs which are observed in each of either five or sixteen spatial bins (depending upon sun position) during one revisit of the Acq Sensor field of regard 24; and (2) ten ground-commanded amplitude intervals (in counts) defining the EFFA amplitude histograms, with the lowest count corresponding to the empirically-derived cutoff between EFFAs and NLFAs.

The Update EFFA Amplitude Histograms algorithm 117 outputs the number of EFFAs which fall into each of the ten amplitude intervals for each of the spatial bins (either 50 or 160 words), using the following processing.

Figure 6:
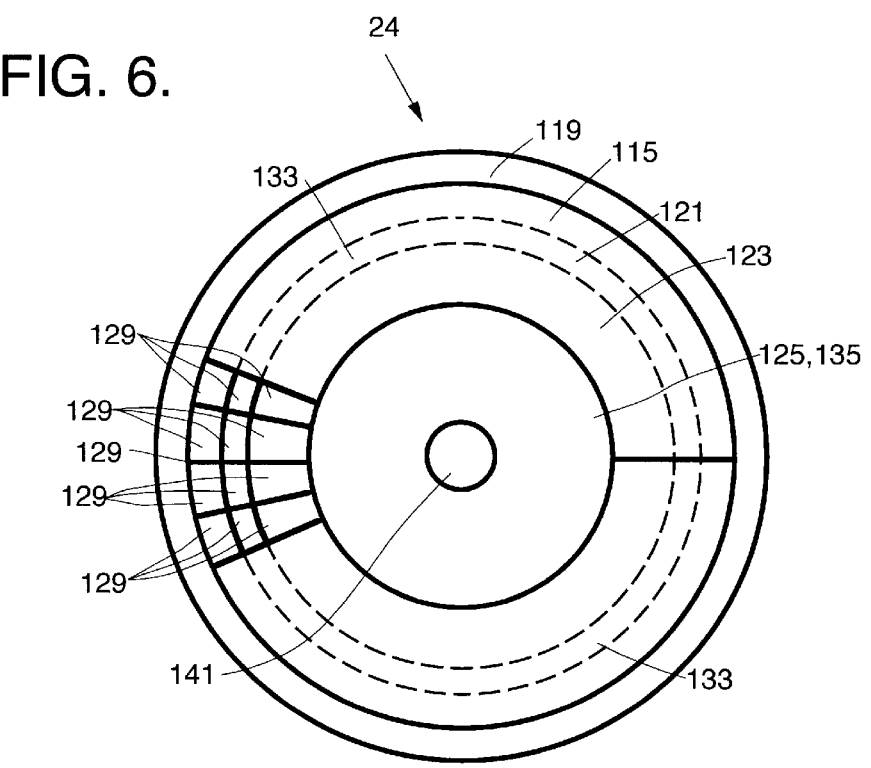
FIG. 6 is a schematic drawing of the division of an acquisition sensor field of regard into separate bins for calculating threshold multipliers in accordance with the present invention.

Referring to FIG. 6, five rings are defined in the acquisition sensor field of regard 24 as follows: (1) top ½ of top SCA, 119; (2) next ¼ of top SCA, 115 (3) bottom ¼ of top SCA, 121; (4) second-from-top SCA, 123; and (5) bottom four SCAs, 125. Next, the FPA position 127 of a solar specular point is calculated at the center of the observation interval. If the solar specular point position 127 is not in the acquisition field of regard 24, the EFFA bins are defined as the five rings 119, 115, 121, 123 and 125. If the solar specular point 127 is in the acquisition field of regard 24, the nearest ODP interrupt time ($t_i$) which has an azimuth closest to that of the solar specular point 127 is found, and the second, third and fourth FPA rings, 115, 121 and 123, are partitioned into twelve crescent bins 129 and two edge bins 133. The crescent bins 129 each have azimuth widths corresponding to two ODP interrupt intervals, with two bins on either side of $t_i$. The edge bins 133 are each one-half of the remaining portion of the second, third and fourth FPA rings, 115, 121 and 123. A center (15th) bin 135 comprises the bottom four SCAs 125, adjacent to a nadir hole 141 created by the absence of a SCA 125 at the center of the two-spoke FPA 35. Given the EFFA amplitudes in each FPA bin, the number of values falling into each amplitude interval in each bin are recorded.

The Acquisition Sensor False Alarm Control algorithm 116 also includes a Calculate EFFA-Dependent Threshold Multipliers algorithm 137 that receives the following inputs:

EF(km)=number of EFFAs in $k^{th}$ interval of $m^{th}$ bin.

EFMIN=ground-commanded minimum number of EFFAs.

EFMAX=ground-commanded maximum number of EFFAs.

XGRND=ground-commanded NLFA threshold multiplier

The output of the Calculate EFFA-Dependent Threshold Multiplier algorithm 137 are EFFA-dependent threshold multipliers or a declaration that there are no EFFA-dependent threshold multipliers.

The Calculate EFFA-dependent Threshold Multipliers algorithm 137 uses the following processing:

The number of EFFAs observed is $$EFOBS = \sum_{k,m} EF(km)$$

(1) If EFMIN≦EFOBS≦EFMAX, then there are no EFFA-dependent threshold multipliers, (2) If (EFMAX−EFOBS)=DNMAX>0, then sort EF(km) values and, starting with the highest value, accumulate the counts up to a total count which is closest to DNMAX. Define EFFA-dependent thresholds for the bins contributing to the accumulated count as lowest k value for each such bin. Set the threshold multipliers for the remaining bins equal to XGRND.

(3) If (EFOBS−EFMIN)=DNMIN>0, then sort EF(km) values; and, starting with the lowest value, accumulate the counts up to a total count which is closest to DNMIN. Define EFFA-dependent thresholds for bins contributing to the accumulated count as the highest k value for each such bin. Set the threshold multipliers for the remaining bins equal to XGRND.

An Update Threshold Multipliers algorithm 139, that is also part of the Acquisition Sensor False Alarm Control algorithm 116, receives the following inputs:

NLFA FLAG $n_i$=number of noise-like false alarms (NLFAs) observed during an observation interval Δt from the entire acquisition sensor field of regard 24

$R_c$=ground-commanded NLFA rate

The Update Threshold Multipliers algorithm 139 outputs threshold multipliers for each FPA bin using the following processing:

(1) If EFFA-dependent threshold multipliers exist, then set threshold multipliers equal to these values.

(2) Else, if NLFA FLAG is set, then all threshold multipliers are equal to the ground-commanded NLFA value.

(3) Else, let $R_i$=estimated false alarm rate at $t_i = R_c + K[n_i/\Delta t - R_c]$ $\Delta X_{i+1}$=threshold multiplier update at $(i+1) = K(n_i/\Delta t - R_c)/(X_i R_i)$ $X_{i+1} = X_i + \Delta X_{i+1}$=threshold multiplier at i+1 for all bins.

where

K=sequential filter gain $n_i$=number of false alarms observed in Δt $\Delta t = (t_i - t_{i-1})$=clutter region averaging time.

Figure 7:
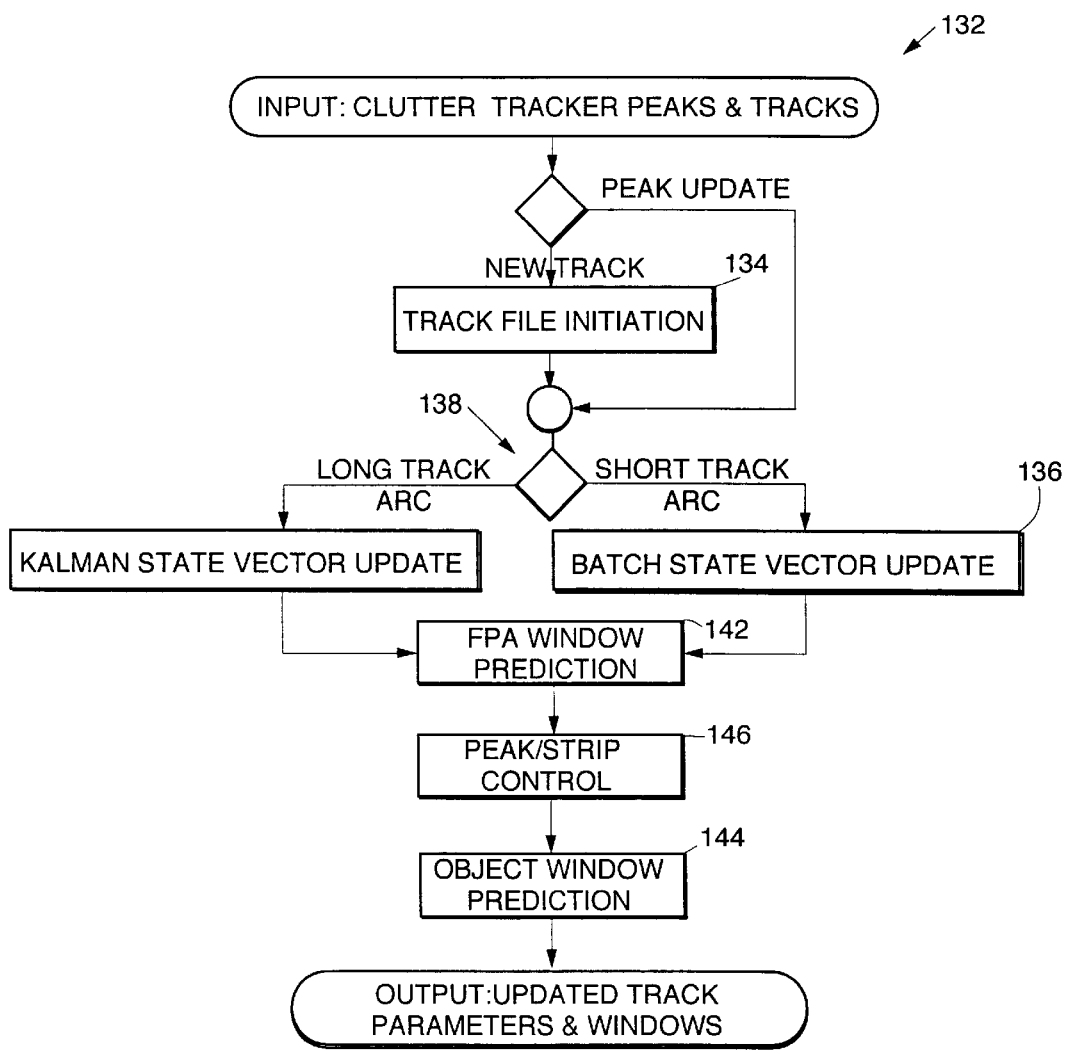
FIG. 7 is a flow diagram depicting the processing steps performed by a target track update algorithm in accordance with the present invention.

A Target Track Update algorithm 132, illustrated in FIG. 7, tracks Acquisition sensor peaks and Track Sensor strips and generates Object Sighting Messages (OSMs) that are sent to a Mission Data Processor 82 (FIG. 2) for subsequent transmission to the ground. The Target Track Update algorithm 132 generates OSMs for each object processed. The Target Track Update algorithm 132 also generates window predictions for both the Clutter Tracker 98 and the Target Tracker 108 and maintains a list of targets in track for use by a Track Sensor Revisit Update algorithm 210. The Target Track Update algorithm 132 employs batch processing for track initiation and update for a fixed number of looks. After a target has been in track for the fixed number of looks, the Target Track Update algorithm 132 employs a Kalman filter to update the LOS state-vector for the object in track.

Using a Process Handover Tracks from Clutter Tracker algorithm 134 the Target Track Update algorithm 132 receives handover tracks from the Clutter Tracker 98 and allocates and initializes a new target track.

The Process Handover Tracks from Clutter Tracker algorithm 134 receives handover tracks from the Clutter Tracker, and initiates new target tracks in a Target Track Update database.

The Process Handover Tracks from Clutter Tracker algorithm 134 allocates and initializes a new target track in the Target Tracker database. For each look in the handover target track, a LOS Batch State Vector Update algorithm 136 is called to update its parameters for the matrices $(A^T A)^{-1}$ and $(A^T U)$, which are described below in connection with the Batch State Vector Update algorithm 136. The LOS Batch State Vector Update algorithm 136 is called to compute the smoothed LOS 9-state vector at the LOS Batch center time. The LOS Batch State Vector Update algorithm 136 is also called to compute the new predicted object observation time. Each target track shall have a "missed look" counter, which shall be set to zero upon handover from the Clutter Tracker 98.

Using a Process Windowed Peaks from Clutter Tracker algorithm 138, the Target Track Update algorithm 132 receives windowed peaks from the Clutter Track and shall process this data and call either the LOS Batch State Vector Update algorithm 136 or a Sequential Kalman-like State Vector Update algorithm 140 for track update.

The Process Windowed Peaks from Clutter Tracker algorithm 138 receives peak packets with corresponding window IDs from the Clutter Tracker 98 which have resulted from peak windows, specified by the Target Track Update, and sent to the Clutter Tracker 98.

The Process Windowed Peaks from Clutter Tracker algorithm 138 outputs updated target tracks to the Target Track Update database.

The Process Windowed Peaks from Clutter Tracker algorithm 138 associates each windowed peak with the target track that requested it via the window ID of the peak packet. The following-execution is represented in pseudo-code.

If the Kalman Filter start-up flag is set, then

Change filter mode to the Sequential Kalman-like State Vector Update algorithm 140

Call the Sequential Kalman-like State Vector Update algorithm 140 for parameter initialization Call the Sequential Kalman-like State Vector Update algorithm 140 to update parameters to a new observation time else if in the Batch State Vector Update mode, then Call the LOS Batch State Vector Update algorithm 136 to update its parameters If the LOS Batch track has matured (the number of looks has exceeded a programmable parameter) then Set the Kalman Filter start-up flag.

end if else if in the Kalman Filter State Vector Update mode, then

Call the Sequential Kalman-like State Vector Update algorithm 140 to update its parameters to a new observation time end if LOS calibration is accomplished by comparing cataloged star positions with measured positions for the same stars. If the cataloged and measured positions are sufficiently close, the differences are determined to be a LOS bias due to misalignment.

Each target track has a "missed look" counter, which is initially set to zero by the Process Handover Tracks from Clutter Tracker algorithm 134. This counter is reset to zero every time a new look of the target is found. It is incremented for every scan for which there is no corresponding windowed peaks returned from the Clutter Tracker 98 and there are no corresponding TDP strips found. If the number of missed looks exceeds a threshold, which has a different value for the LOS Batch State Vector Update algorithm 136 and Sequential Kalman-like State Vector Update algorithm 140, then the track is terminated and deleted from the Target Track Update database.

The Target Track Update algorithm 132 uses batch processing for track update for a fixed number of looks. The LOS Batch State Vector Update algorithm 136 updates the LOS parameters so that they can be used to compute the object LOS 9-state vector, $X_0$, (position, velocity and acceleration) at the track center time $T_0$. $X_0$ is used to compute an object LOS 9-state vector, $X_p$, at the predicted observation time, $T_p$.

The LOS Batch State Vector Update algorithm 136 receives the following inputs:

N=Number of looks at this scan $T_i$=Observation Time at look # i $T_n$=Observation Time at look # n $u_0$=Least-squared fit LOS vector at $T_0$ $u_i$=Measured LOS vector at $i^{th}$ look (observation time=$T_i$)

$u_n$=New Measured LOS vector at nth look

The LOS Batch State Vector Update algorithm 136 generates the following output data:

$X_p$=Predicted LOS 9-state vector at predicted observation time $T_p$ $X_0$=Object LOS 9-state vector at track center time $T_0$ The LOS Batch State Vector Update Algorithm 136 implements the following equations:

Let:

N'=Number of looks at last scan=N−1

$$T_0' = \text{Old Average/Center Time for } N - 1 \text{ looks} = \sum_{i=1}^{N'} (T_i)/N'$$

$$T_0 = \text{New Average/Center Time for } N \text{ looks} = \sum_{i=1}^{N} (T_i)/N$$

$T_0 = [(N-1)*T_0' + T_n]/N = T_0' + (T_n - T_0')/N$ $dt_0 = T_0' - T_0$ $\dot{u}_0 = du_0/dt =$ Estimated LOS velocity at $T_0$ $\ddot{u}_0 = du_0^2/dt^2 =$ Estimated LOS acceleration at $T_0$ $X_0 = [u\ \dot{u}\ \ddot{u}]^T = 9 \times 1$ matrix of smoothed state vectors at $T_0$ $I = I_{3\times3} = 3\times 3$ Identity Matrix $U = [u_1^T, \ldots, u_n^T]^T$ $a_i =$ State transition from $X_0(T_0)$ to $X_i(T_i)$, so that $X_i(T_i) = a_i X_0$ $= [I, (T_i - T_0)I, ((T_i - t_0)^2/2)I]$ $A = [a_1^T, \ldots, a_n^T]^T$ $A^T = \text{Transpose}(A) = [a_1^T, \ldots, a_n^T]$ Assuming smooth LOS motion with constant LOS vector acceleration at time $T_0$, the model for the object LOS vector is:

$$u_i = u_o + (T_i - T_o)\dot{u}_o + (T_i - T_o)^2 \ddot{u}_o$$

-continued $$= [I, (T_i - T_o)I, ((T_i - T_o)^2/)I]X_o$$

$$= a_i X_o$$

$$\Rightarrow U = AX_o$$

$$\Rightarrow X_o = (A^T A)^{-1}(A^T U)$$

where $(A^T A)^{-1}$ and $(A^T U)$ are solved separately. Solving for the $(A^T U)$ matrix:

$$(A^T U) = [a_1^T, \ldots, a_n^T]\begin{bmatrix} u_1 \\ \vdots \\ u_n \end{bmatrix} =$$

$$\sum_{i=1}^{N}(a_i^T u_i) = \begin{bmatrix} \sum_i^N u_i \\ \sum_i^N u_i(T_i - T_o) \\ \sum_i^N u_i(T_i - T_o)^2/2 \end{bmatrix} \overset{\Delta}{=} \begin{bmatrix} P(N) \\ Q(N) \\ R(N) \end{bmatrix}$$

At a new observation time $T_n$, P(N), Q(N), R(N) are updated based on their last values P(N-1), Q(N-1), and R(N-1) by:

$$P(N) = P(N-1) + u_n$$

$$Q(N) = Q(N-1) + (T_0' - T_0)P(N-1) + (T_0' - T_0)u_n$$

$$R(N) = R(N-1) + (T_0' - T_0)Q(N-1) + \tfrac{1}{2}(T_0' - T_0)^2 P(N-1) + \tfrac{1}{2}(T_0' - T_0)^2 u_n$$

Solving for the symmetric $(A^T A)^{-1}$ matrix:

$$(A^T A)^{-1} = \begin{bmatrix} NI & cI & 0.5aI \\ cI & aI & dI \\ 0.5aI & dI & bI \end{bmatrix} = \begin{bmatrix} eI & kI & mI \\ kI & fI & nI \\ mI & nI & gI \end{bmatrix}$$

where $$a(N) = \sum_{i=1}^{N}(T_i - T_0)^2$$

$$b(N) = (1/4)\sum_{i=1}^{N}(T_i - T_0)^4$$

$$c(N) = \sum_{i=1}^{N}(T_i - T_0)$$

$$d(N) = (1/2)\sum_{i=1}^{N}(T_i - T_0)^3$$

Expanding a(N), b(N), c(N), and d(N) in terms of a(N-1), b(N-1), c(N-1), and d(N-1), and replacing $(T_n - T_0)$ with $(N-1)(T'_0 - T_0)$ the update equations shall be:

$$c(N) = \sum_{i=1}^{N}(T_i - T_0) = (T_n - T_0) + \sum_{i=1}^{N'}[(T_i - T'_0) + (T'_0 - T_0)]$$

$$c(N) = c(N-1) + (N-1)(T'_0 - T_0) + (T_n - T_0)$$

$$a(N) = \sum_{i=1}^{N}(T_i - T_0)^2$$

$$a(N) = a(N-1) + 2(T'_0 - T_0)c(N-1) + (N-1)(T'_0 - T_0)^2 + (T_n - T_0)^2$$

$$d(N) = (1/2)\sum_{i=1}^{N}(T_i - T_0)^3$$

$$d(N) = d(N-1) + 3/2(T'_0 - T_0)a(N-1) + 3/2(T'_0 - T_0)^2 c(N-1) + 1/2(N-1)(T'_0 - T_0)^3 + 1/2(T_n - T_0)^3$$

$$b(N) = (1/4)\sum_{i=1}^{N}(T_i - T_0)^4$$

$$b(N) = b(N-1) + 2(T'_0 - T_0)d(N-1) + 3/2(T'_0 - T_0)^2 a(N-1) + (T'_0 - T_0)^3 c(N-1) + 1/4(N-1)(T'_0 - T_0)^4$$

$$\Rightarrow (A^T A)^{-1} \Rightarrow \begin{bmatrix} N & c & 0.5a \\ c & a & d \\ 0.5a & d & b \end{bmatrix}^{-1} = \frac{\begin{bmatrix} e & k & m \\ k & f & n \\ m & n & g \end{bmatrix}}{\text{Determinant}}$$

where:

$$e = ab - d^2, \ k = ad/2 - cb$$

$$m = cd - a^2/2, \ f = Nb - a^2/4$$

$$n = ac/2 - Nd, \ g = Na - c^2$$

$$DET = Nab + cad - Nd^2 - bc^2 - a^3/4 = \text{Determinant}$$

Solving for object LOS 9-state $X_0$ at time $T_0$ at N looks:

$$X_0(N) = \begin{bmatrix} u_0 \\ \dot{u}_0 \\ \ddot{u}_0 \end{bmatrix} = (A^T A)^{-1}(A^T U) = 1/DET * \begin{bmatrix} Ie & Ik & Im \\ Ik & If & In \\ Im & In & Ig \end{bmatrix}\begin{bmatrix} P(N) \\ Q(N) \\ R(N) \end{bmatrix}$$

Updating the object LOS 9-state $X_p = [u(T_p) \ \dot{u}(T_p) \ \ddot{u}(T_p)]^T$ for new predicted observation time is computed by:

$$X_p = \begin{bmatrix} 1 & T_p - T_0 & 0.5(T_p - T_0)^2 \\ 0 & 1 & (T_p - T_0) \\ 0 & 0 & 1 \end{bmatrix} X_0$$

After a track has reached a track arc length threshold and a number of looks threshold (nominally set to nine looks), the method of LOS state vector update transitions to a Sequential Kalman-like State Vector Update algorithm 140. This algorithm updates the Kalman Filter parameters needed to compute the object LOS 9-state vector for the last Kalman Filter time and uses this state vector to compute the object LOS 9-state vector at the predicted observation time.

The Sequential Kalman-like State Vector Update algorithm 140 receives the following inputs:

$T_i$=Object Observation Time for the current scan $T_p$=Predicted Observation Time for the same scan $T_0$=LOS Batch Center Time for startup sn=Sigma=Measurement Variance The Sequential Kalman-like State Vector Update algorithm 140 outputs the following data:

X=Kalman Filter predicted 9-state vector of object at current predict time

X=Kalman Filter predicted 9-state vector of object from last observation time

The Sequential Kalman-like State Vector Update algorithm 140 implements the following equations:

Let: $T_k$=Last Kalman Filter Time ($T_k$=Object observation time of the previous scan except at Batch-to-Kalman Filter startup where $T_k=T_0$)

$I=I_{3\times 3}$=3×3 Identity Matrix $a_i=[I, (T_i-t_0) I, 0.5(T_i-T_0)^2 I]$=state transition matrix where $X(T_i)=a_i X_0$ $$(A^T A)^{-1} = \text{Matrix computed by LOS Batch Filter at last center line}$$

$$= \begin{bmatrix} el & kl & ml \\ kl & fl & nl \\ ml & nl & gl \end{bmatrix}$$

$X_+$=Re-Estimated Kalman Filter 9-states at new observation time $dt=T_i-T_k$

H=[I 0 0]=Matrix to make 3×1 LOS position from 9×1 states $$S = \text{State Transition Matrix} = \begin{bmatrix} I & Idt & Idt^2/2 \\ 0 & I & Idt \\ 0 & 0 & I \end{bmatrix}$$

$U_p=(HS) X$ $$K = \text{Kalman Filter Matrix} = \begin{bmatrix} kf_1 I \\ kf_2 I \\ kf_3 I \end{bmatrix}$$

Z=LOS Covariance Matrix=$(sn^2)S(A^T A)^{-1} S^T$

=>$(Z/sn^2)=S(A^T A)^{-1} S^T$=Normalized LOS Covariance Matrix

The Kalman Filter matrix elements $kf_1$, $kf_2$, $kf_3$, the LOS 9-state X, and the Kalman Filter time $T_k$ at transition from LOS Batch Filter to Kalman Filter are computed.

The Kalman Filter matrix K can be described as:

$K=[Z H^T][H Z H^T+sn^2 I]^{-1}=[(Z/sn^2) H^T][H (Z/sn^2)H^T+I]^{-1}=[S (A^T A)^{-1} S^T H^T][H S(A^T A)^{-1} S^T H^T+I]^{-1}=>K=R Q$ where:

$$R = S(A^T A)^{-1} S^T H^T$$

$$= \begin{bmatrix} I & Idt & Idt^2/2 \\ 0 & I & Idt \\ 0 & 0 & I \end{bmatrix} \begin{bmatrix} e & k & m \\ k & f & n \\ m & n & g \end{bmatrix} \begin{bmatrix} I & 0 & 0 \\ Idt & I & 0 \\ Idt^2/2 & Idt & I \end{bmatrix} \begin{bmatrix} I \\ 0 \\ 0 \end{bmatrix}$$

$$= \begin{bmatrix} I & Idt & Idt^2/2 \\ 0 & I & Idt \\ 0 & 0 & I \end{bmatrix} \begin{bmatrix} e & K & m \\ k & f & n \\ m & n & g \end{bmatrix} \begin{bmatrix} I \\ 0 \\ 0 \end{bmatrix}$$

$$= \begin{bmatrix} I & Idt & Idt^2/2 \\ 0 & I & Idt \\ 0 & 0 & I \end{bmatrix} \begin{bmatrix} (e+kdt+mdt^2/2)I \\ (k+fdt+ndt^2/2)I \\ (m+ndt+gdt^2/2)I \end{bmatrix}$$

$$= \begin{bmatrix} (e+2kdt+(m+f)dt^2+ndt^3+0.25gdt^4)I \\ (k+(m+f)dt+1.5ndt^2+0.5gdt^3)I \\ (m+ndt+gdt^2/2)I \end{bmatrix} = \begin{bmatrix} r_1 I \\ r_2 I \\ r_3 I \end{bmatrix}$$

and:

$$Q = [HS(A^T A)^{-1} S^T H^T + I]^{-1} = [HR+I]^{-1}$$

$$= \left[ [I\ 0\ 0] \begin{bmatrix} r_1 I \\ r_2 I \\ r_3 I \end{bmatrix} + I \right]^{-1}$$

$$= [(r_1+1)I]^{-1} = I\left(\frac{1}{r_1+1}\right) = r_0 I$$

$\Rightarrow r_0 = 1/(r_1+1)$ $r_1 = e + 2kdt + (m+f)dt^2 + ndt^3 + 0.25gdt^4$ $r_3 = m + ndt + 0.5gdt^2$ Thus, $$K = RQ = \begin{bmatrix} kf_1 I \\ kf_2 I \\ kf_3 I \end{bmatrix} = \begin{bmatrix} r_1 r_0 I \\ r_2 r_0 I \\ r_3 r_0 I \end{bmatrix}$$

The Kalman Filter LOS 9-state vector X− and time $T_k$ shall be updated as follows:

$T_k=T_0$=LOS Batch center line $$X = \begin{bmatrix} I & I(T_i-T_p) & I(T_i-T_p)2/2 \\ 0 & I & I(T_i-T_p) \\ 0 & 0 & I \end{bmatrix} X(T_p)$$

where $X(T_p)$=Predicted object LOS 9-state at predicted observation time $T_p$.

The Kalman Filter coefficients $kf_1$, $kf_2$, $kf_3$, the Kalman Filter LOS 9-state $X_+$, and Kalman Filter time $T_k$ at the new observation time $T_i$ shall be updated as follows:

$$U_p(T_i)=U_p(T_p)+(T_i-T_p)\dot{U}+0.5(T_i-T_p)^2\ddot{U}$$

$$X_+ = X_- + K[U_m(T_i) - U_p(T_i)]$$

$$= X_- + [kf_1(U_m - U_p)\ kf_2(U_m - U_p)\ kf_3(U_m - U_p)]^T$$

$T_k=T_i$
$X_-=X_+$
where:
  $U_p(T_p)$=Predicted LOS position at predicted observation time $T_p$
  $U_p(T_i)$=Predicted LOS position at observation time $T_i$
  $U_m(T_i)$=Measured LOS position at observation time $T_i$
  $\dot{U}$=Predicted LOS velocity at time $T_p$
  $\ddot{U}$=Predicted LOS acceleration at time $T_p$
  $X_-$=Kalman Filter predicted 9-state from last observation time
  $X_+$=Re-Estimated Kalman Filter 9-state at new observation time $T_i$ The object LOS 9-state vector for the new predicted observation time $T_p$ shall be computed as follows:

$$X_p = [U_p(T_p)\dot{U}(T_p)\ddot{U}(T_p)]^T$$
$$= \begin{bmatrix} I & I(T_p-T_k) & I(T_p-T_k)^2/2 \\ 0 & I & I(T_p-T_k) \\ 0 & 0 & I \end{bmatrix}$$

An FPA Window Prediction algorithm 142 receives the predicted object observation time $T_p$ from either the LOS Batch State Vector Update algorithm 136 or the Sequential Kalman-like State Vector Update algorithm 140.

The FPA Attitude Determination algorithm 118 outputs the FPA axis X, Y, Z vectors, the corresponding rates and the absolute FPA azimuth A of spoke# 1.
where:
  Z=ACQ Sensor FPA Boresight (Nadir) vector
  X=Orthogonal ACQ Sensor FPA axis in the plane of trajectory looking forward
  Y=Orthogonal ACQ Sensor FPA axis making the right-handed XYZ coordinates
  A=Azimuth angle in direction from X to Y where A=zero at X axis.

The FPA Attitude, comprising direction cosines of the FPA X, Y and Z axes, is received from the LCU at 250 Hz and is stored in the attitude database with the attitude time tag. The attitude database is searched to find two attitude data sets for which the corresponding time tags $T_1$ and $T_2$ are nearest to the requested time T. A linear interpolation is performed to compute the FPA X, Y, Z vectors and azimuth at time T.

$$X(T)=X(T_1)+(T-T_1)[X(T_2)-X(T_1)]/(T_2-T_1)$$
$$Y(T)=Y(T_1)+(T-T_1)[Y(T_2)-Y(T_1)]/(T_2-T_1)$$
$$Z(T)=Z(T_1)+(T-T_1)[Z(T_2)-Z(T_1)]/(T_2-T_1)$$

The rate of change of the FPA X, Y, Z vectors is estimated as the slope between the two attitude data sets:

$$\dot{X}(T)=[X(T_2)-X(T_1)]/(T_2-T_1)$$

$$\dot{Y}(T)=[Y(T_2)-Y(T_1)]/(T_2-T_1)$$
$$\dot{Z}(T)=[Z(T_2)-Z(T_1)]/(T_2-T_1)$$

For computational efficiency, the FPA Window Prediction algorithm 142 has the option of using the FPA X, Y, Z vectors and their rates of the attitude quaternion set nearest to time T without having to perform the above interpolation.

The Target Track Update algorithm 132 employs an Object Window Prediction algorithm 144 that computes the adjustment to the predicted object observation time $T_p$, computes the predicted absolute FPA azimuth and elevation of the object, selects the SCA(s) that will see the object in the next scan and computes the predicted j-time and row for the selected SCA(s).

The Object Window Prediction algorithm 144 receives the following inputs:
  $T_i$=Object Observation Time from latest scan #i.
  $T_{i0}$=Object Observation Time from previous scan #(i−1)
  $T_h$=Center time of the Batch Filter or Kalman Filter
  U(T)=Object LOS position vector at time T
  $\dot{U}$(T)=Object LOS velocity vector at time T
  $\ddot{U}$(T)=Object LOS acceleration vector at time T
  Z=Acquisition Sensor FPA Boresight (Nadir) vector at time $T_p$
  X=Orthogonal Acquisition Sensor FPA axis in plane of trajectory looking forward
  Y=Orthogonal Acquisition Sensor FPA axis making the right-handed XYZ coordinates
  $\dot{X}$, $\dot{Y}$, and $\dot{Z}$=Rate of change of X, Y, Z vectors
  Az_Offset=Array of azimuth offset from the centerline of each SCA to the centerline of Spoke #1
  $T_{SOS}$=Start-of-Scan time of next scan #(i+1)
  $Az_{SOS}$=Start-of-Scan angle of scan #(i+1) of Spoke #1, where $Az_{SOS}$=0 at X axis, and positive angle is going from X axis to Y axis.
  $\dot{Az}_{spoke\ \#1}$=Average FPA Azimuth scan rate of Spoke #1

The Object Window Prediction algorithm 144 outputs the following:
  dt=Small adjustment to the predicted observation time $T_p$
  Az($T_p$), El($T_p$)=$Az_{obj}(T_p)$, $El_{obj}(T_p)$=Object absolute FPA azimuth and elevation
  SCA=SCA that is predicted to scan over the object in the new scan The Object Window Prediction algorithm 144 is implemented as follows:
Let:
  $T_p$=Predicted observation time for new scan #i+1
  $\dot{Az}_{obj}$=Object azimuth rate across the FPA
  $Az_{sca}$=($T_p$)=Absolute FPA Azimuth of the SCA at time $T_p$
  $\dot{Az}_{sca}$=FPA Azimuth Scan Rate of an SCA=$\dot{Az}_{spoke\#}$1

The next start-of-scan time $T_{SOS}$ and the next start-of-scan angle $Az_{SOS}$ are estimated based on past history if not known at the time of the calculation. The average scan rate $Az_{sca}$ (or $Az_{spoke\ \#1}$) based on known start-of-scan times and start-of-scan angles is estimated. The object observation time $T_p$ for the new scan is predicted as:

$$T_p=T_i+(T_i-T_{i0})$$

The LOS Batch State Vector Update algorithm 136 or the Sequential Kalman-like State Vector Update algorithm 140 is called to compute the predicted object LOS position U($T_p$)

and velocity ($T_p$) at the predicted observation time. The FPA Attitude Determination algorithm 118 is called to compute the FPA attitude X, Y, Z vectors and their velocities $\dot{X}$, $\dot{Y}$ and $\dot{Z}$ at the predicted time $T_p$. The predicted object azimuth and elevation projected onto the FPA shall be computed as:

$El_{obj}(T_p) = \arccos(U(T_p) \cdot Z)$ $Az_{obj}(T_p) = \text{atan2}(U(T_p) \cdot Y, U(T_p) \cdot X)$ where:

atan2=arctan function that can return angle values in all 4 quadrants (from 0 to $2\pi$) The sensor spoke and the SCA(s) that will scan over the object in the new scan based on the predicted object FPA azimuth and elevation are selected based on the start-of-scan angle $Az_{SOS}$, object FPA azimuth $Az_{obj}$ and elevation $El_{obj}$ as:

SCA=SCA_Lookup_Function ($Az_{SOS}$, $Az_{obj}$, $El_{obj}$) and the selected SCA azimuth A at time Tp is estimated as:

$Az_{sca} = Az_{SOS} + Az\_\text{Offset}(SCA) + (T_p - T_{sos})\text{Scan\_Rate}$ or alternatively, using the FPA azimuth reported with the quaternions:

$Az_{sca} = \text{FPA\_Az}(T_p) + Az\_\text{Offset}(SCA)$, where:

Az_Offset $\Delta$ Lookup Table for azimuth offset from the SCAs to FPA spoke# 1

FPA_Az($T_p$) $\Delta$ Interpolate Function using the attitude DB~= $Az_{SOS} + (T_p - T_{sos})\dot{Az}_{sca}$ Next, the object azimuth rate $\dot{Az}_{obj}$ across the FPA shall be derived and computed as follows:

Starting with, $$\cos^2(Az) = \frac{(U \cdot X)^2}{(U \cdot X)^2 + (U \cdot Y)^2}$$

Therefore, $$\frac{d(Az)}{dt} = \frac{(U \cdot X)\frac{d(U \cdot Y)}{dt} - (U \cdot Y)\frac{d(U \cdot X)}{dt}}{(U \cdot X)^2 + (U \cdot Y)^2} \Rightarrow \dot{Az}_{obj} =$$

$$\frac{d(Az)}{dt} = \frac{(U \cdot Y)(\dot{U} \cdot Y + U \cdot \dot{Y}) - (U \cdot Y)(\dot{U} \cdot X + U \cdot \dot{X})}{(U \cdot X)^2 + (U \cdot Y)^2}$$

The time correction dt from the predicted observation time can then be computed, and then:

$Az_{obj} + \dot{Az}_{obj}dt = Az_{sca} + \dot{Az}_{sca}dt$ $dt = (Az_{obj} - Az_{sca})/(\dot{Az}_{sca} - \dot{Az}_{obj})$ The new predicted observation time, object FPA azimuth and elevation can be updated as follows:

If $dt$ is still significant (larger than a calibration threshold), then

Compute $T_p = T_p + dt$

Compute $X, Y, Z$ vectors at new time $T_p$

Compute $U(T_p)$

Loop back to recompute $Az_{obj}$,

-continued $El_{obj}$ and $dt$ at new time $T_p$ as described above

Else $T_p = T_p + dt$ $Z = Z + \dot{Z}dt$ $U = U + \dot{U}dt + 0.5\ddot{U}dt^2$ $Az_{obj} = Az_{obj} + \dot{Az}_{obj}dt = Az_{sca} + \dot{Az}_{sca}dt$ $El_{obj} = \arcsin(U \cdot Z)$, or alternaively:

$El_{obj} = El_{obj} + \dot{El}_{obj}dt$, where:

$\dot{El}_{obj} =$ $$\frac{d(\sin(El))/dt}{\cos(El)} = \frac{d(U \cdot Z)/dt}{\sqrt{1 - \sin^2(El)}} = \frac{(\dot{U} \cdot Z + U \cdot \dot{Z})}{\sqrt{1 - (U \cdot Z)^2}}$$

End If

The predicted object j-time $J_{obj}$ and k-row $K_{obj}$ for the selected SCA based on the new predicted object FPA azimuth and elevation are computed as follows:

$J_{obj} = [Az_{obj} - Az_{SOS} - Az\_\text{Offset}(SCA)]/J\_\text{Angle}$ $K_{obj} = [El\_\text{Offset}(SCA)] - El_{obj}]/K\_\text{Angle}(SCA) + K\_\text{Adjustment}(SCA, El)$ where:

J_Angle $\Delta$ Average_Scan_Rate/Sample_Rate

K_Angle $\Delta$ Lookup Table for Average K pixel angle for the selected SCA

K_Adjustment $\Delta$ Lookup Table for additional K adjustment per SCA due to FPA elevation Az_Offset $\Delta$ Lookup Table for azimuth offset from the SCAs to FPA spoke# 1

El_Offset $\Delta$ Lookup Table for elevation offset from Acq FPA boresight.

The following pseudo-code operations are executed:

```
If the prediction is for a peak window then
    Create and send a target peak window to the
Clutter Tracker 98
    Else If the prediction is for a strip window then
        If strips exist for the object from the last
scan, then
            Use the strips from the last scan to
            create ODP strip windows around the
            predicted j and k values.
        Else
            Create a NxN (i.e. 3x3) ODP strip windows
around the predicted
            j and k values
        End If
        Tag each ODP strip window with the object ID
    End If
```

The ODP strip windows are grouped into larger TDP strip windows based on the SCA IDs, the distance between the ODP strip windows and the minimum TDP strip window size. The sizes of the TDP strip windows may need to be enlarged to compensate for the uncertainty factor due to Acq Sensor jitter/vibration about the boresight axis. The ODP strip windows are sorted in order of increasing j-time and k-row. The ODP strip window sorting can be done either per group of ODP strip windows in a TDP strip window or per group of ODP strip windows in an SCA.

The ODP primarily operates with peak packets from the TDP. When an object is tracked by the Clutter Tracker 98 and subsequently tracked by the Target Track Update algorithm 132, strips will be needed from the Track Sensor TDP 42 for a short duration that will allow an object classification to be made. For a given object, strips or peaks are available from the Track Sensor TDP 42 but not both. A Strip vs Peak Control algorithm 146 makes the determination of when to switch to strips for an object in track and issues a window for that object to the Track Sensor TDP 42.

The Strip vs Peak Control algorithm 146 receives as inputs an LOS State Vector and object classification (if available).

The Strip vs Peak Control algorithm 146 outputs strip windows to the Track Sensor TDP 42.

Acq TDP strips shall be applied on designated strip scans at every N scans (i.e. every 3 scans nominally). For each new handover track from the Clutter Tracker at scan #, the following logic is implemented by the Strip vs Peak Control algorithm 146:

---

If the next scan is not a strip-designated
scan, predict peak window for the track.
If the next scan is a strip-designated scan
(scan #i), predict strip window for the track.
At scan #i, process TDP strips for the track to
determine target moments and classification
(for extended objects).
If the object type is extended-object, then
Predict strip windows for the object in
subsequent designated strip scans until the
object type changes to single.
    Predict peak windows for the other scans.
Else
    Predict peak window for the track for
subsequent scans.
End If

---

Figure 8:
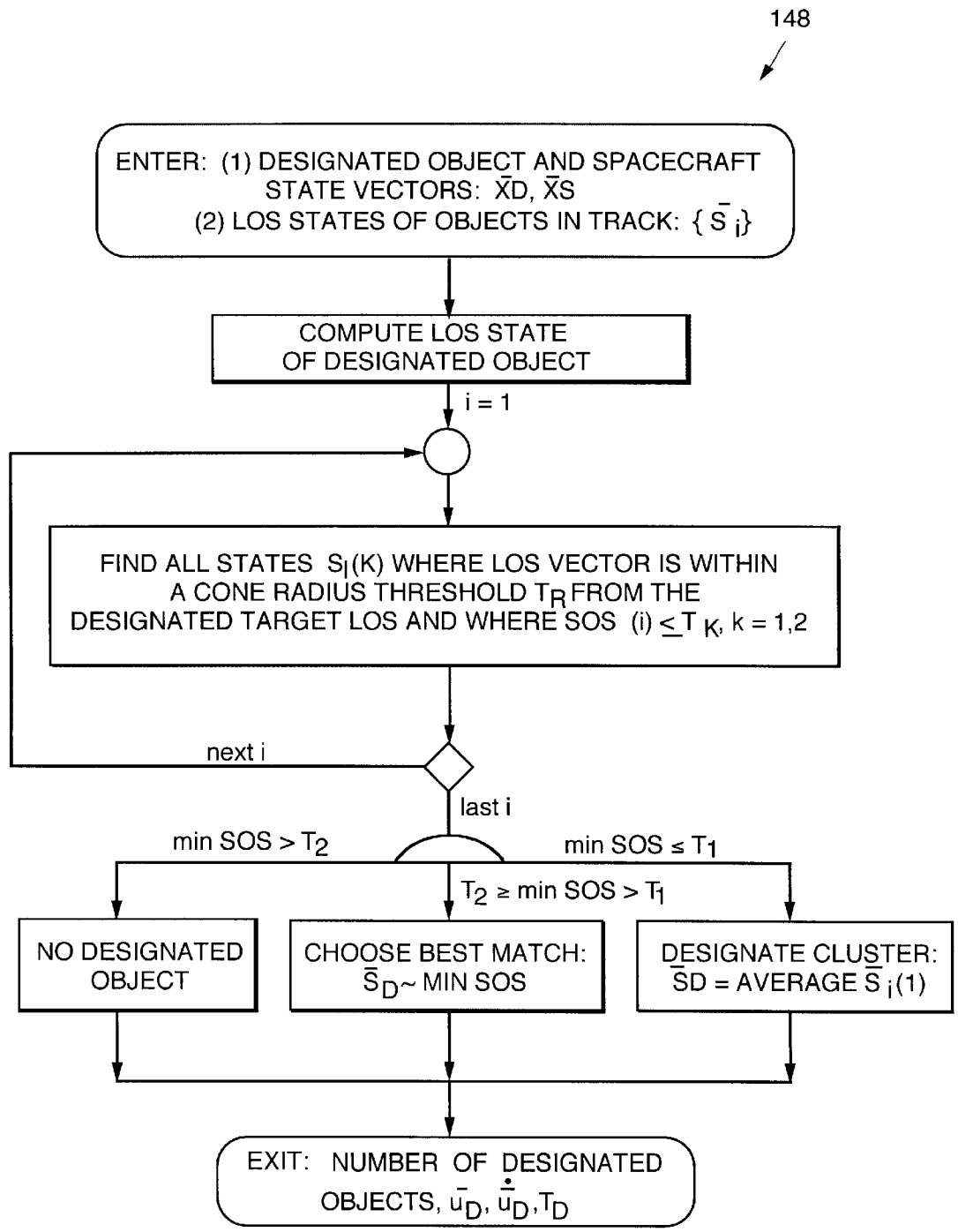
FIG. 8 is a flow diagram depicting the processing steps performed by a handover target designation algorithm in accordance with the present invention.

Using a Handover Target Designation algorithm 148, illustrated in FIG. 8, the Target Tracker 108 can identify a target object that has been "designated" via ground command by comparing its line-of-sight (LOS) rate and acceleration with similar values from each object being tracked. The "best fit object," as determined by a sum-of-squares of residuals test, shall be chosen.

Inputs to the Handover Target Designation algorithm 148 are:

Designated object and spacecraft state vectors: $\overline{X}_D, \overline{X}_S$ LOS states of objects in track $\{\overline{S}_1\}$ Cone radius threshold $T_R$ from the designated target LOS Sum-of-square thresholds for designated target contenders and possible contenders: $T_1, T_2$ The Handover Target Designation algorithm 148 outputs the following data:

Number of designated objects found: $N_D$

Average LOS states of the designated object(s): $\overline{u}_D, \overline{\dot{u}}_D$ Average sum-of-square residuals of the designated object (s): $T_D$ The target object LOS rate and acceleration are calculated from the spacecraft states and the commanded target states, and a sum-of-squares (SOS) prediction error is obtained for the objects in track to indicate how "close" each is to the target. Three situations can arise:

(1) Minimum SOS is large (min SOS>T2)—no object is designated (2) Minimum SOS is acceptable but not small (T2>min SOS>T1)
designate the closest object (smallest SOS)

(3) Minimum SOS is small (T1≧min SOS)
designate the centroid of all objects with SOS≦T1

A problem could arise if multiple objects are following almost the same trajectory as the designated object, (i.e., the designated object is a member of a "cluster"), because then noise effects could cause the designation label to randomly jump from object to object. The logic used by the Handover Target Designation algorithm 148 treats this case by designating the cluster centroid when ambiguity exists.

A cluster is a group of objects moving with a nearly common velocity, so a cluster is present if more than one object satisfies criterion (3). The centroid of a many-object cluster is a relatively stable entity, in that adding or subtracting a few members won't have much effect upon the predicted position.

Given the designated object and spacecraft state vectors $\overline{X}_D, \overline{X}_S$ at the observation time t of object I, the LOS state of the designated target can be computed as:

$$\overline{R} = \overline{X}_D - \overline{X}_S$$

$$\overline{u} = \frac{\overline{R}}{R} \Rightarrow = \overline{R} = R\overline{u}, \text{ where } R = \overline{R}$$

$$\dot{\overline{R}} \cong \frac{\Delta \overline{R}}{\Delta t} = \frac{\overline{R}(t) - \overline{R}(t - \Delta t)}{\Delta t}$$

$$\dot{\overline{R}} = \dot{R}\overline{u} + R\dot{\overline{u}}$$

$$\dot{R} = \dot{\overline{R}} \cdot \overline{u} \cong \frac{\Delta \overline{R}}{\Delta t} \cdot \overline{u}$$

$$\Rightarrow \dot{\overline{u}} = \left(\dot{\overline{R}} - \dot{R}\overline{u}\right) / R$$

$$\cong \left(\frac{\Delta \overline{R}}{\Delta t} - \left(\frac{\Delta \overline{R}}{\Delta t} \cdot \overline{u}\right)\overline{u}\right) / R$$

$$\ddot{\overline{u}} \cong \Delta \dot{\overline{u}} / \Delta t = \frac{(\dot{\overline{u}}(t) - \dot{\overline{u}}(t - \Delta t))}{\Delta t}$$

The sum-of-square residual for object #I with LOS status $\overline{S}_I$ can be computed as:

$$SOS = |\dot{\overline{S}}_I - \dot{\overline{S}}|^2 + |Scan\_Time(\ddot{\overline{u}} - \ddot{\overline{u}})|^2$$

The ODP 43 has the capability to maintain a catalog of up to 1,000 RSO's, with scheduled viewing by the track sensor 28 adjusted so that the predicted position uncertainty of a given RSO will always be within the field of regard 30 of the tracking sensor 28. A relatively simple, mono, 3-D tracking algorithm may be used to update the RSO orbits, since the cataloged objects are selected to have viewing opportunities with frequent, variable geometry observations. The RSO orbits are initiated from the ground and can be updated from the ground. Platform-to-platform handover capability, as available, improves the mono-cataloging capability. Such an inherent RSO surveillance capability may be exploited to circumvent the need for complex processing such as that presently used to maintain the existing NORAD RSO catalog.

Accordingly, an Update Cataloged RSO State Vector algorithm 180 (FIG. 18) receives the following inputs: LOS measurement at observation time t for an RSO in an onboard catalog; associated nearby estimate of RSO ECI position, velocity; Kalman filter gain matrix; and state transition matrix. The Update Cataloged RSO State Vector algorithm 180 outputs updated values of catalog contents for a given RSO by using a conventional, six-state Kalman filter (three ECI position components and three ECI velocity components), using the spherical-earth gravity model. The estimation error covariance matrix is generated by the matrix Ricatti equation. State noise can be added to account for drag and non-spherical gravity effects. The state vector and covariance matrix are initiated by ground command, and can also be updated by ground command. The latter capability may also be used as a lost-target backup.

Each RSO orbit is updated to the next-scheduled track sensor viewing time, while the ODP 43 is in a "sleeper" mode, i.e., when no sensor operations are being performed.

A Generate Second Platform Cue Message algorithm 182 (FIG. 18) generates cues for transmission to another sensor platform (not shown) and includes a Thrusted Vehicle Cue algorithm 184 and an RSO Cue algorithm 186.

The Thrusted Vehicle Cue algorithm 184 receives the following inputs: LOS state at some epoch time; range; and range rate estimates obtained from the Booster Typing and Parameter Estimation Test algorithm 130.

The Thrusted Vehicle Cue algorithm 184 outputs ECI position and velocity vectors at a predicted second-sensor observation time by constructing a 3-D mono track, and propagating the 3-D mono track to correspond to the predicted second sensor observation time.

The RSO Cue algorithm 186 receives as input a 3-D state vector from the Update Cataloged RSO State Vector algorithm 180 and outputs ECI position and velocity vectors at predicted second-sensor observation time.

The RSO Cue algorithm 186 propagates the 3-D state vector to generate a predicted second sensor observation time.

Figure 9:
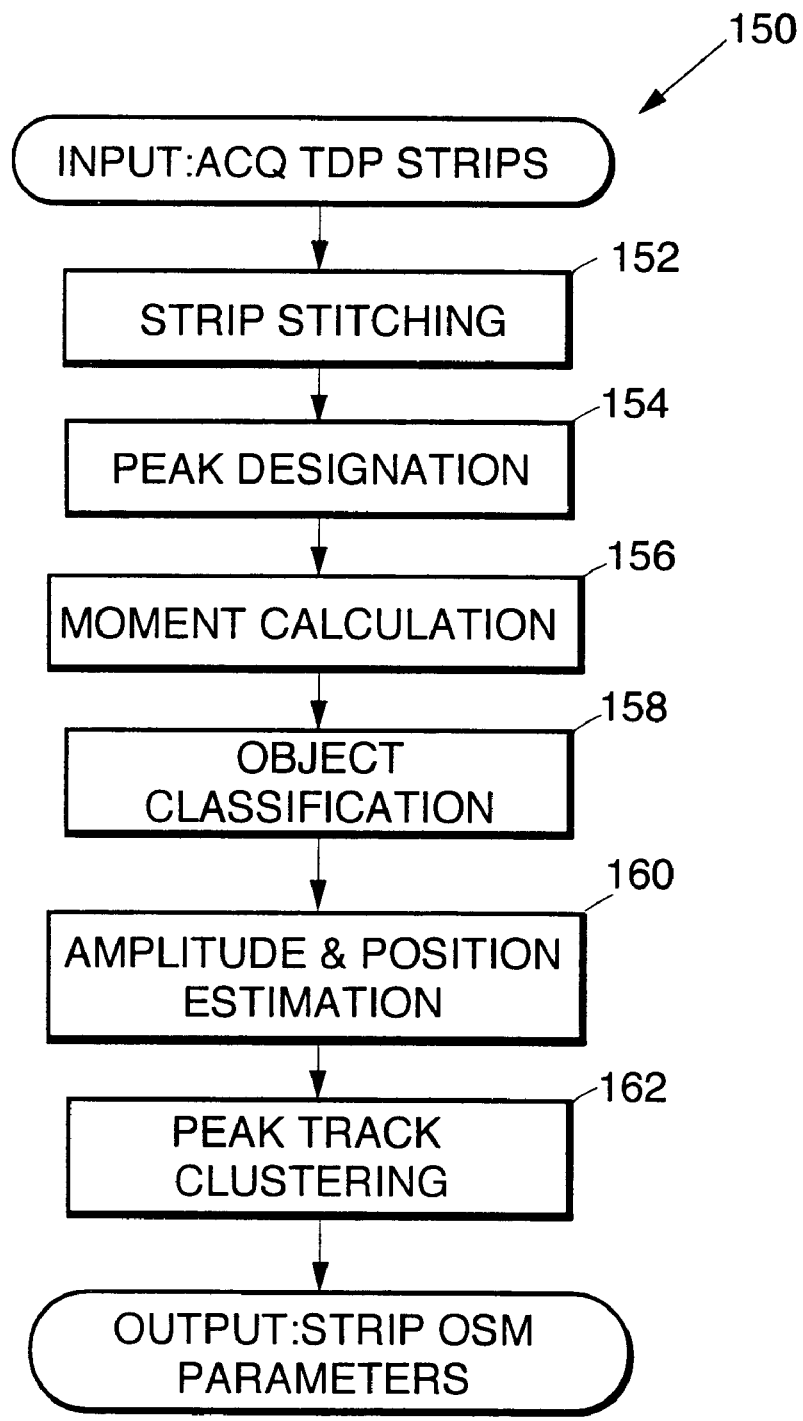
FIG. 9 is a flow diagram depicting the processing steps performed by an acquisition sensor strip processing algorithm in accordance with the present invention.

Now referring to FIG. 9, an Acquisition Sensor Strip Processing algorithm 150 processes strips sent from the Acquisition TDP 40 and sends the processed strip data to the Target Track Update algorithm 132. When the Acquisition TDP 40 is outputting strips, the Acquisition Sensor Strip Processing algorithm 150 performs strip stitching, computes moments, performs object classification and estimate object position and amplitude. The amplitude and position estimates for each object are passed on to the Target Track Update algorithm 132.

The Acquisition Sensor Strip Processing algorithm 150 stitches the vertically-oriented strips received from the Acquisition TDP 40 into two-dimensional object arrays.

A Strip Stitching algorithm 152 receives a set of TDP strips for a requested TDP strip window from the TDP. The Strip Stitching algorithm 152 outputs objects for which TDP strips are stitched together based on the strip adjacency.

Figure 10:
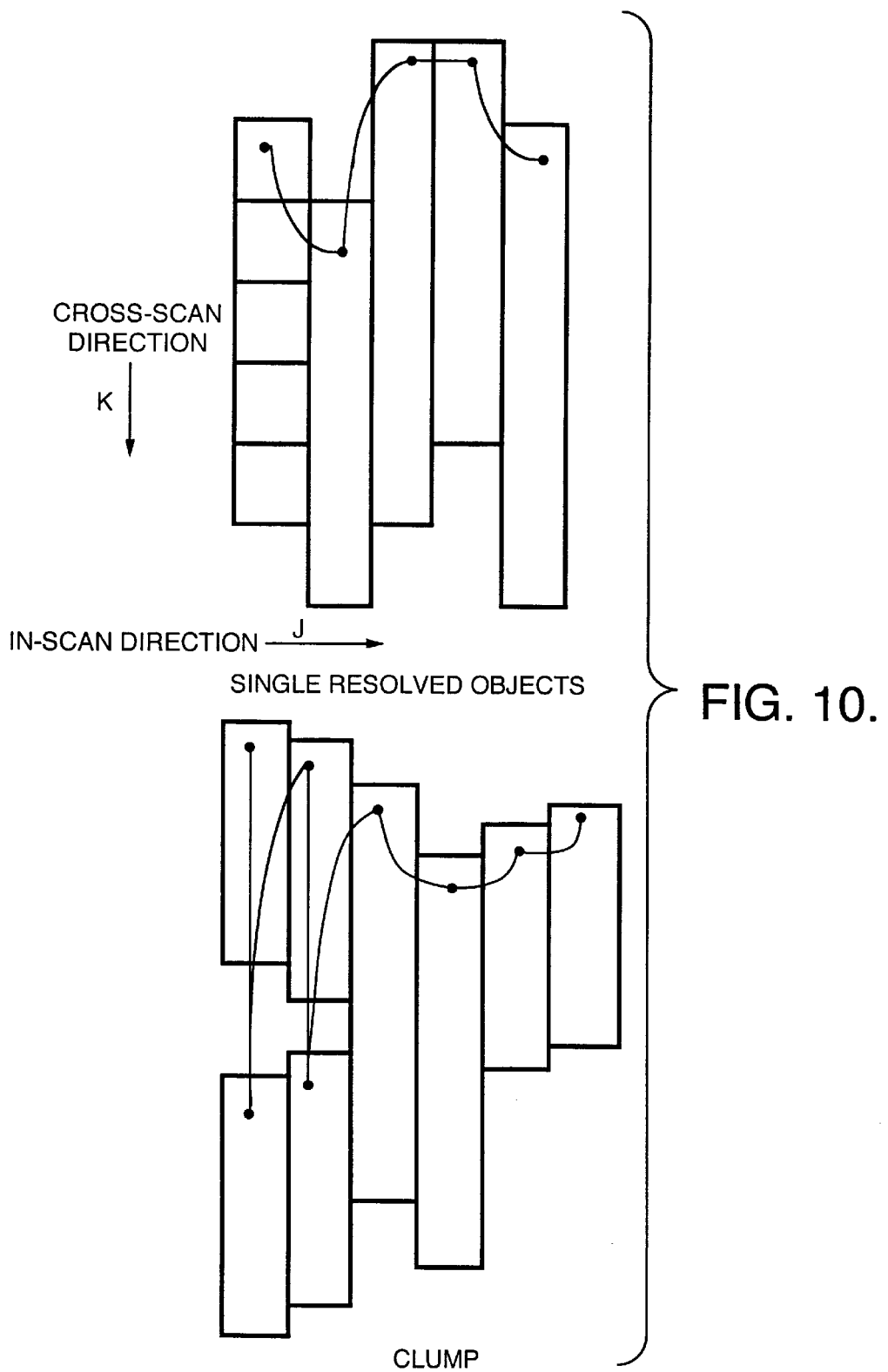
FIG. 10 is a schematic drawing depicting the concept of strip data.
Figure 11:
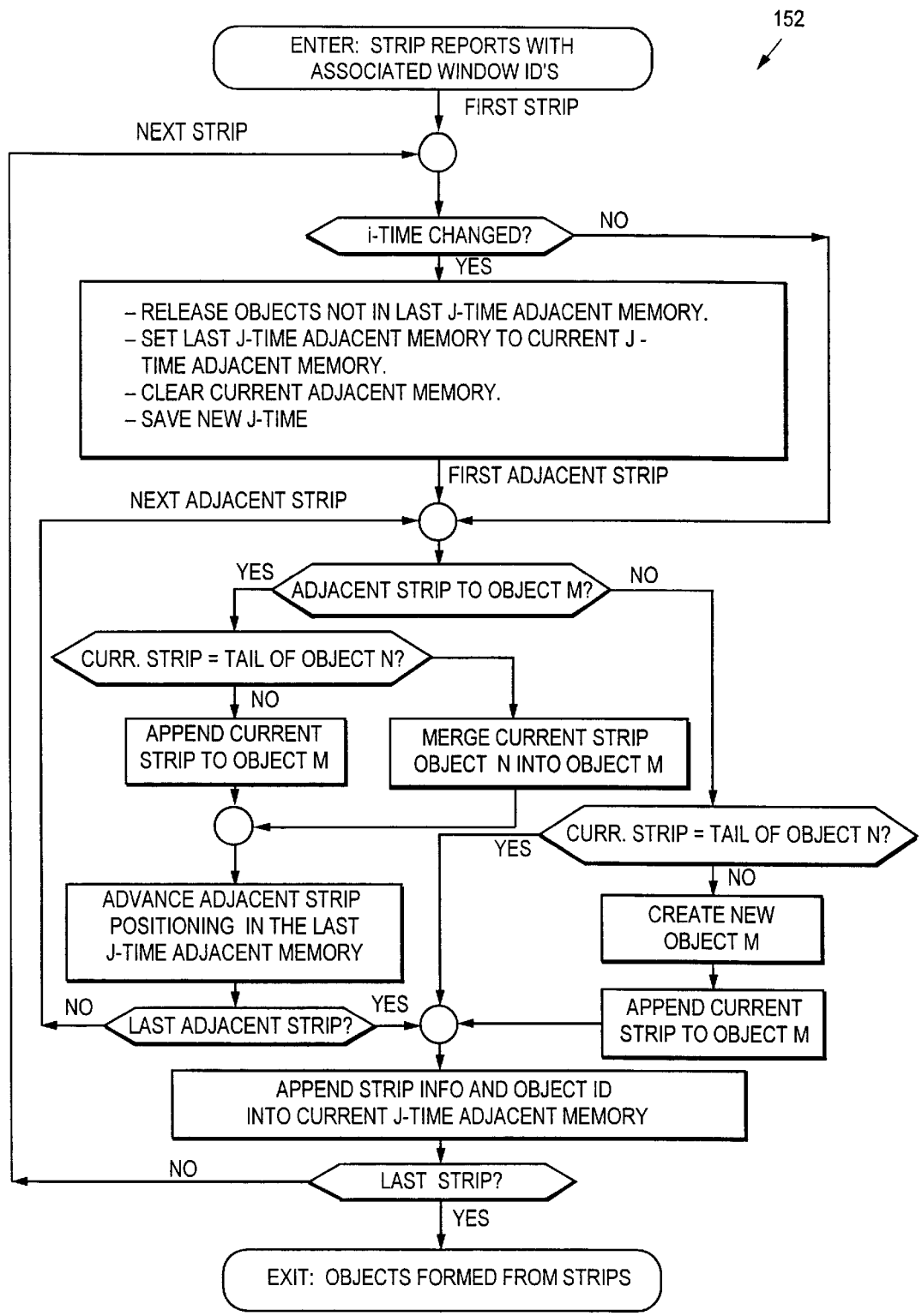
FIG. 11 is a flow diagram depicting the processing steps performed by a strip stitching algorithm in accordance with the present invention.

The concept of strips is illustrated in FIG. 10. The Strip Stitching algorithm 152 is described in the flow diagram of FIG. 11.

The term "tail" means the last strip in a set of strips belonging to an object, while "head" means the first strip. Searching for touching strips is done only on the previous J-time's collection of strips, and since the strips come from the TDP in the natural order of Kmin to Kmax for each sequential J-time, there is no need to sort the strips.

After an Acquisition strip object is stitched, a Peak Designation algorithm 154, searches for TDP peak packets via the peak flags accompanying each strip amplitude. The peak flags are set by the Acquisition TDP 40 to identify peak packets inside TDP strip windows. The peak packets that match the predicted peak windows of in-track targets are used to update the corresponding Acquisition peak track. The other peak packets are returned to the Clutter Tracker 98 for further processing.

A Moment Calculation algorithm 156 calculates the zeroth, first and second amplitude weighted velocity-corrected moments of each object array.

The Moment Calculation algorithm 156 receives as input a set of TDP strips stitched together, making an object. The Moment Calculation algorithm 156 outputs moments $M_0$, $M_1$, $M_2$, $M_{11}$, $M_{22}$, and $M_{12}$ for each object.

The Moment Calculation algorithm 156 executes the following equations in order to compute the moments for an object.

Let:

SCA=SCA of the TDP strips j=Sample frame time counting from start-of-scan k=SCA row number $A_{jk}$=Strip amplitude at j-time and k-row The following moments are calculated from the amplitudes $A_{jk}$, with the moments for the leading HSCA rows treated separately from the trailing rows:

$$j' = j + dj$$

$$dj = HSCA\_Alignment\_Correction\_Table(SCA, k)$$

$$M_0 = \sum_j \sum_k A_{jk}$$

$$M_1 = (1/m_0) \sum_j \sum_k j A_{jk}$$

$$M_2 = (1/M_0) \sum_j \sum_k k A_{jk}$$

$$M_{11} = (1/M_0) \sum_j \sum_k (j - M_1^2) A_{jk}$$

$$M_{22} = (1/M_0) \sum_j \sum_k (k - M_2^2) A_{jk}$$

$$M_{12} = (1/M_0) \sum_j \sum_k (j - M_1)(k - M_2) A_{jk}$$

where

HSCA_Alignment_Correction_Table is a lookup table to correct for integer HSCA alignments set in the TDP.

El(SCA,k) $\triangleq$ Elevation of row k of an SCA

Sj $\triangleq$ In-Scan Distance covered per rate-restored J-Sample

Sj=El(SCA,k)*Rate_Restore_Factor*(Scan_Rate/Sample_Rate)

g(SCA,k) $\triangleq$ Function for the ideal HSCA Alignment g(SCA,k)=HSCA_Distance_Table[SCA]/Sj f(SCA,k) $\triangleq$ Function used to fill the HSCA_Alignment_Correction_Table f(SCA,k)=g(SCA,k)−TDP_HSCA_Alignment_Table[SCA,k]

The corrected moments are used to classify the data set, using a Tracking Object Classification algorithm 158, as one of four possible object types: a spike; a single, resolved object; a Closely-Spaced Object (CSO); or a clump of unresolved objects.

The Tracking Object Classification algorithm 158 receives the following inputs:

Object moments: $M_0$, $M_1$, $M_2$, $M_{11}$, $M_{22}$ and $M_{12}$
$S1^2$=Nominal pulse shape variance
T1=In-scan Spike Upper-Bound Threshold
T2=Cross-scan Spike Upper-Bound Threshold
T3=EMIN Single Upper-Bound Threshold
T4=EMAX Single Upper-Bound Threshold
T5=EMAX CSO Lower-Bound Threshold
T6=EMAX CSO Upper-Bound Threshold The Tracking Object Classification algorithm 158 outputs a classification for each object. The classification shall be one of the aforementioned four object types.

The Tracking Object Classification algorithm executes the following equations and logic in order to classify an object. First, the Eigenvalues $E_{MIN}$ and $E_{MAX}$ are calculated as a measure the object height and width.

$$E_{max} = (M_{11} + M_{22})/2 + \sqrt{(M_{11} - M_{22})^2/4 + M_{12}^2}$$

$$E_{min} = (M_{11} + M_{22})/2 - \sqrt{(M_{11} - M_{22})^2/4 + M_{12}^2}$$

if $[M_{11} - S_1^2] < T_1$, and $[M_{22}] < T_2$ then classify object as a spike else if $E_{MIN} \leq T_3$ and $E_{MAX} \leq T_4$ classify object as a single else if $E_{MIN} \leq T_3$ and $E_{MAX} \geq T5$ and $E_{MAX} \leq T6$ then classify object as a CSO.

else classify object as a clump.

End if

An Acquisition Object Amplitude and Position Estimation algorithm 160 estimates the amplitude and LOS for each object. A sub-pixel estimate of object position and amplitude is obtained by using the Parabolic Pulse Match Interpolation algorithm 74 to interpolate a cruciform array of amplitude estimates.

The Acquisition Object Amplitude and Position Estimation algorithm 160 receives the following inputs:

$Amp_{j,k}$=5 amplitudes surrounding the peak amplitude (cruciform)

j, k=j-time and row of the peak amplitude

SCA=SCA of the peak amplitude

J-Offset Calibration constants to account for the half-SCA alignment error as a function of SCA and k The Acquisition Object Amplitude and Position Estimation algorithm 160 outputs the following data:

dJ=Correction to j-time dK=Correction to k

A=Corrected amplitude of peak

The Acquisition Object Amplitude and Position Estimation algorithm 160 uses similar processing to estimate the amplitude and position to the Parabolic Pulse Match Interpolation algorithm 74. The following equations are used:

$a = (AMP_{j,k-1} - 2Amp_{j,k} + AmP_{j,k+1})/2$ $b = (AmP_{j,k+1} - Amp_{j,k-1})/2$ $d = (AMP_{j-1,k} - 2Amp_{j,k} + Amp_{j+1,k})/2$ $e = (Amp_{j+1,k} - AmP_{j-1,k})/2$ $dJ$=J-offset(SCA,$k$)−$e(2d)$ $dK = -b(2a)$ $$A = Amp(J, Row) - \frac{b^2}{4_a} - \frac{e^2}{4_d}$$

The Target Tracker 108 performs this function when it processes TDP strips. (Note that the Clutter Tracker 98 performs this function for peak packets.).

Peak track clustering occurs when strips are processed and there is only one resulting stitched object corresponding to the windows predicted by two or more peak tracks. In this case, the peak tracks shall be considered parts of a merged cluster identified by the use of Acquisition TDP strips A Peak Track Clustering algorithm 162 receives the following inputs:

In Track target windows

Objects stitched from ACQ TDP strips

The Peak Track Clustering algorithm 162 outputs the following data:

Association between ACQ strip objects and ACQ peak tracks.

Information for reporting ACQ strip OSMs and the related in-track peak OSMs.

A stitched strip object without any associated in-track peak shall be deleted (i.e., new peaks are to be handled by the Clutter Tracker 98). A stitched strip object with one or more associated in-track peaks is used to report an Acquisition strip OSM. An Acquisition strip OSM includes various information such as:

Unique object ID

Moments

Classification based on moments

LOS vector (of the centroid or of peak amplitude)

Scan number

TDP window size

Number of in-track peaks

Each associated target track uses the ID of the corresponding strip object as the cluster ID in its Acquisition peak OSM report.

After the Acquisition TDP strips have been stitched together, each stitched strip object is scanned for peak packets. The peaks inside the TDP strip windows shall have been flagged by the TDP as part of the TDP strip data. A peak packet that matches an in-track target window is used to update the corresponding target track. Otherwise, the peak packet is sent back to the Clutter Tracker 98 for processing.

A Track Sensor Strip Processing algorithm 164 processes strips sent from the Track TDP 42 and sends the processed strip data to the Target Track Update algorithm 132. The Track Sensor Strip Processing algorithm 164 includes the following Algorithms: a Track TDP Algorithm Iteration algorithm 166; a False Alarm Table Update algorithm 168; a Strip Sewing algorithm 170; a Track MVPD Processing algorithm 172; a Track Sensor CSO Pair Resolution algorithm 174; a Tracking Object Classification & Moments algorithm 176; and a Tracking Object Amplitude & Position Estimation algorithm 178.

Figure 12:
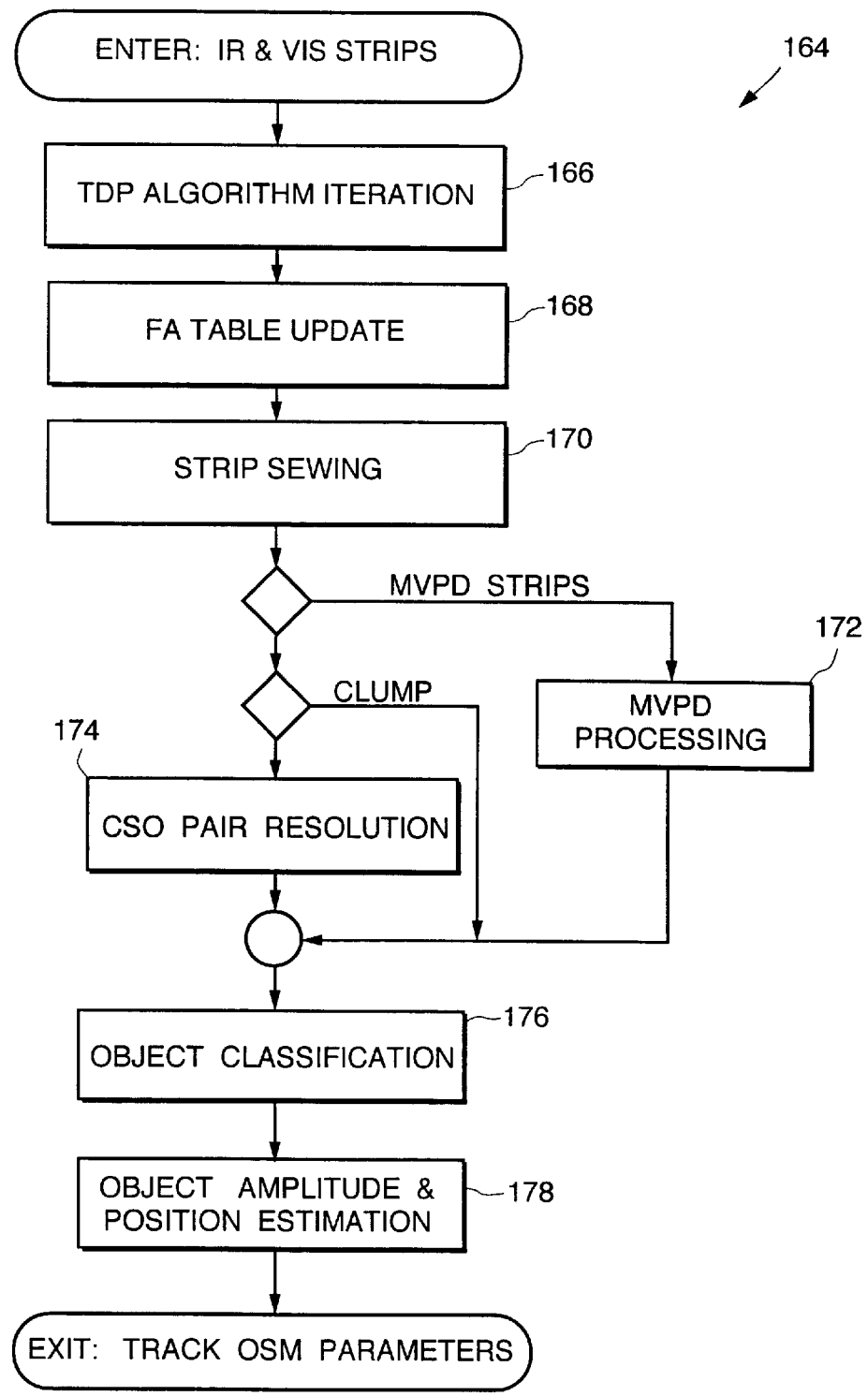
FIG. 12 is a flow diagram depicting the processing steps performed by a track sensor strip processing algorithm in accordance with the present invention.

The Track Sensor Strip Processing algorithm 164 logic is shown in FIG. 12.

The Track Sensor Strip Processing algorithm 164 provides the capability for the MLSD or MVPD algorithms to be iteratively applied to the Track TDP 42 using the Multi-Frame Storage in the Track TDP 42. The data in the Multi-frame Storage is double-buffered which allows the algorithm iteration to occur either during the subsequent LCU slewing interval or the next staring interval.

Figure 13:
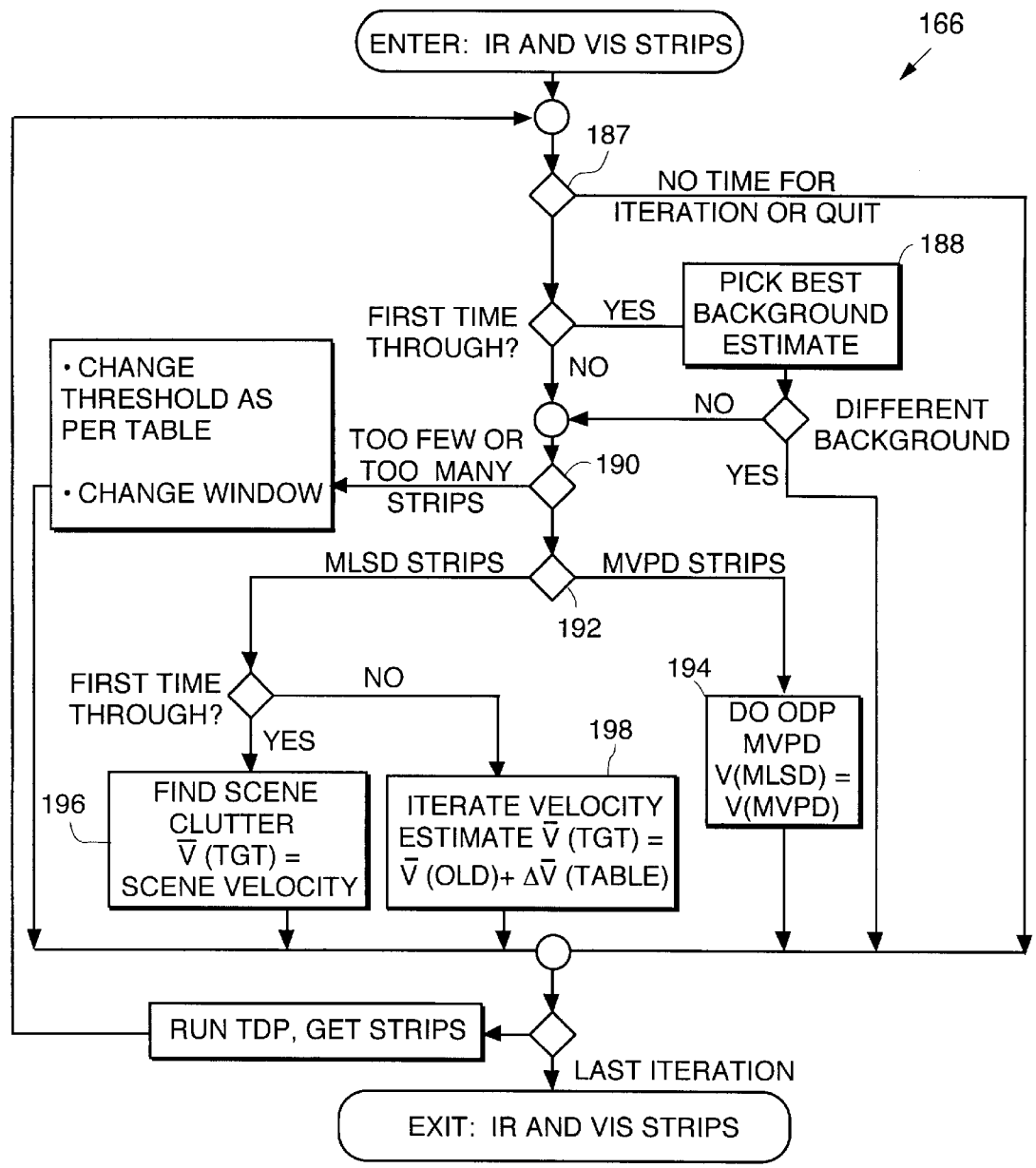
FIG. 13 is a flow diagram depicting the processing steps performed by a track time dependent processor algorithm iteration algorithm in accordance with the present invention.

The Track TDP Algorithm Iteration algorithm 166 receives the output of either the Track TDP MLSD or MVPD algorithm and uses the functional logic shown in FIG. 13.

The first decision to be made by the Track TDP Algorithm Iteration algorithm 166 is whether or not there is either a need or adequate time to iterate. If the targets are known to be bright or have been seen previously by the track sensor then iteration should not be necessary. This decision, shown at step 187 of FIG. 13, is repeated on the basis of time following each iteration.

If algorithm iteration is to be performed, a Background Estimation Verification step 188 verifies that the right background estimate was used. This decision is made the first time through the Track TDP Algorithm Iteration algorithm 166 for which there is a need and adequate time to iterate, and the chosen background is used for all subsequent iterations. The ODP reads N pixels (a minimum of a 5×5 array or 25 pixels) of the background estimate from the Track TDP 42. The residual responsivity error for this band and integration time is obtained from a table and multiplied by the average of the N background pixels to form an estimate of the focal plane clutter. This quantity is then compared to the noise sigma, which is obtained by table lookup. If the noise is large compared to the focal plane clutter, or the streak length (product of target velocity and stare time) is less than three pixels, either the 3×3 array of pixels (BTH) or 5×5 array of pixels (ATH) background estimate is used. Otherwise, the 1×1 (single pixel) background estimate is used.

If the background estimate selected is different from the background estimate used, the Track TDP Algorithm Iteration algorithm 166 discards the existing strips and obtain new strips for the new background estimate. If the background estimate is unchanged, the Track TDP Algorithm Iteration algorithm 166 proceeds to false alarm control.

Once the background has been selected, a False Alarm Control step 190 determines if the threshold has been set properly. The strips are examined to determine how many peaks have been reported. If this number is smaller or much larger than the expected number of targets (MLSD), or than the expected number of targets times half the number of rate restored frames (MVPD), the threshold is changed according to a table. If the region of the focal plane that bounds the strips is smaller than the processing window, the processing window is reduced for any iterations that follow. The False Alarm Control Step 190 is performed the first time through for each processing technique (MLSD or MVPD).

The best results are produced by the Track Sensor TDP 42 when the MLSD algorithm 68 is used, but in some cases the required velocity estimate is not available. The MVPD algorithm 70 is then used to establish the best possible velocity estimate for iteration with the MLSD algorithm 68. It is desirable to find the optimum number of samples to be summed in the Track TDP 42 before the portion of the MVPD algorithm 70 executed by the ODP 43 is run.

The MVPD algorithm 70 produces best SNR when the object velocity is one pixel per sample. The Track Rate Restore algorithm 86 is initially tuned to a high guess of object velocity, and then one to five samples (N) are summed for each detector, to provide increased SNR for a slower moving target. The MVPD algorithm 70 is repeated at step 192 in the Track TDP 42 while saving the two most recent set of strips. When the average peak (normalized by number of samples summed) is lower for N than for N−1, then N−1 is the optimum value. At step 194, the ODP portion of the MVPD algorithm 70 executed by the ODP 43 is performed for the strips obtained with N−1, and the resulting velocity estimate from the MVPD algorithm 70 is used as the initial velocity estimate for the MLSD algorithm 68. The strips generated by the MVPD algorithm 70 can be discarded at this point.

Target velocity is used for the first pass through the MLSD algorithm 68. The next iteration with a slow moving target will tune the MLSD algorithm 68 to scene velocity as at step 196 in order to distinguish between targets and stars ATH, or targets and clutter points BTH. A peak at the same FPA position in both iterations is labeled a target if the target velocity iteration yields the brightest output from the MLSD algorithm 68, and a nontarget if the scene velocity iteration yields the brightest output from the MLSD algorithm 68. This determination is not made during the Track TDP Algorithm Iteration algorithm 166, but the strips are saved so that the Target Tracker 108 can perform the test.

Remaining TDP iterations should vary the velocity estimate, as shown at step 198, and only the set of strips that produce the brightest targets should be saved.

The False Alarm Table Update algorithm 168 receives the following inputs:

(1) A False Alarm Control Table, consisting of expected false alarm rates (FAR) vs stare time for each of 5 elevation angles, for each waveband and for both the MLSD and MVPD streak detection algorithms 68 and 70;

(2) Algorithm parameters used on previous algorithm iterations, consisting of FPA window size, stare time, sensor elevation angle, waveband, and streak detection algorithm selection (MVPD or MLSD); and (3) Observed number of threshold exceedances from each previous algorithm iteration.

The False Alarm Table Update algorithm 168 outputs an updated FAR control table.

The processing for the Strip Sewing algorithm 170, for stitching strips output by the Track TDP 42 is similar to the processing for the Strip Stitching algorithm 152 used for stitching strips output by the Acquisition TDP 40.

The Track MVPD Processing algorithm 172 receives the following inputs:
  Maximum rate-restored sample (max value) from each detector which is above threshold
  Corresponding sample time for each sample
  Threshold for SOS test The Track MVPD Processing algorithm 172 outputs candidate multi-port tracks and corresponding SOS performance measures.

The Track MVPD Processing algorithm 172 uses the logic shown in FIG. 14.

The Track Sensor CSO Pair Resolution algorithm 174 calculates the parameters to be used by object classification to distinguish single objects, CSO pairs and clumps.

The Track Sensor CSO Pair Resolution algorithm 174 receives the following inputs:
  Stitched strips (contiguous two-dimensional set of threshold-exceeding MLSD streak amplitudes).
  Single Object Template The Track Sensor CSO Pair Resolution algorithm 174 outputs an estimate of the CSO amplitude and position and, a correlation value, C.

Figure 15:
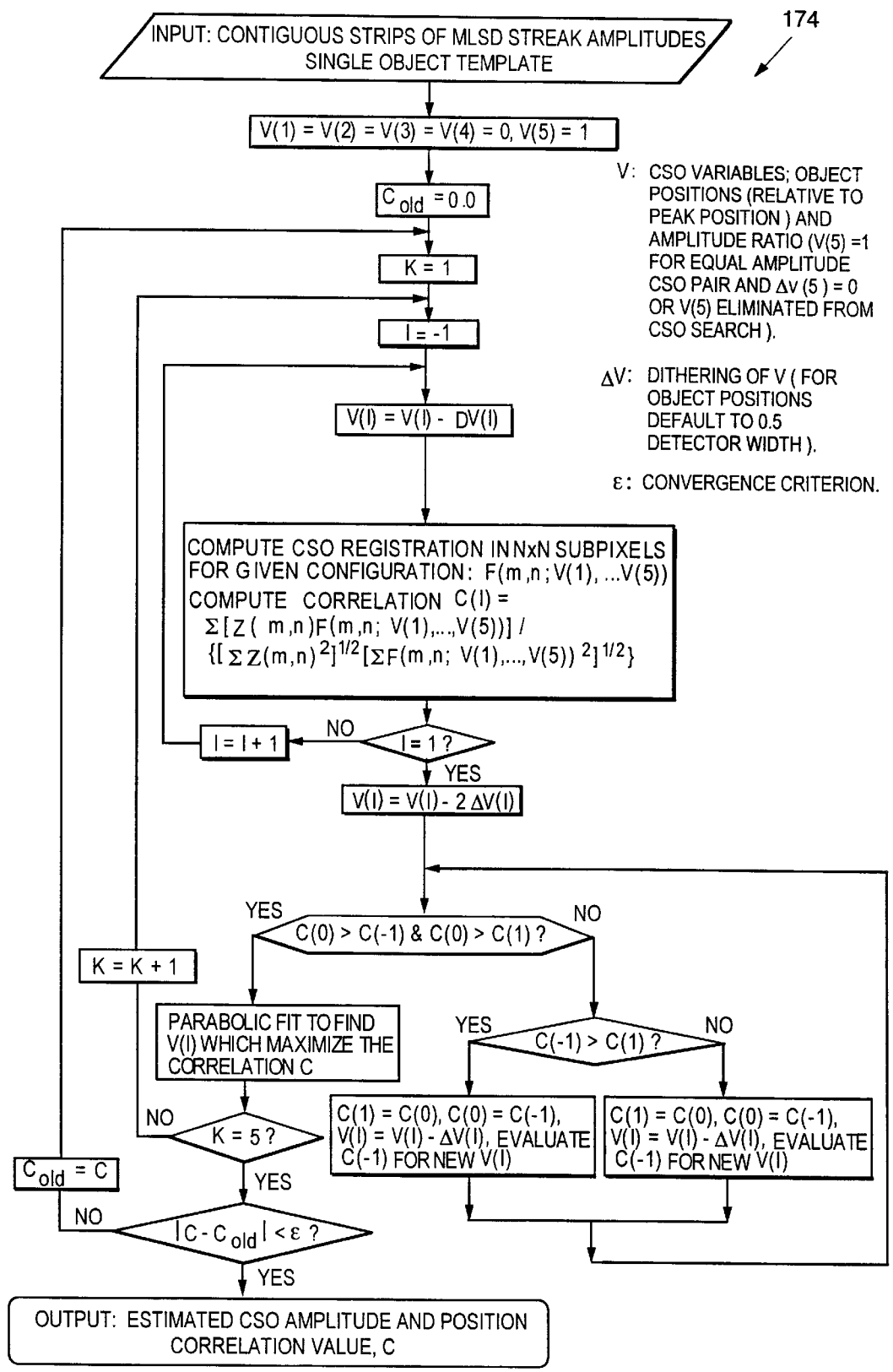
FIG. 15 is a flow diagram depicting the processing steps performed by a closely spaced object pair resolution algorithm in accordance with the present invention.

The Track Sensor CSO Pair Resolution algorithm 174 performs the processing shown in FIG. 15, in which CSO variables V(i) through V(4) represent the object positions relative to the peak position and V(5) is the amplitude ratio. For an equal amplitude CSO pair, V(5) shall equal 1 and Δ(5) shall equal zero. ΔV(i) represents the dithering of V(i) and ΔV(1) through ΔV(4) shall be set to 0.5 detector width as a default. ε is the convergence criterion.

The Tracking Object Classification & Moments algorithm 176 identifies each object as a CSO pair or a single-resolved object or a clump of unresolved objects.

The Tracking Object Classification & Moments algorithm 176 receives the following inputs:

Outputs of the CSO Pair Resolution algorithm 174 (if available) and strips.

The Tracking Object Classification & Moments algorithm 176 outputs a classification for each object.

The classification shall be one of the following four types:
(1) Single, resolved object;
(2) CSO object pair; or
(3) Clump of unresolved objects.

Figure 16:
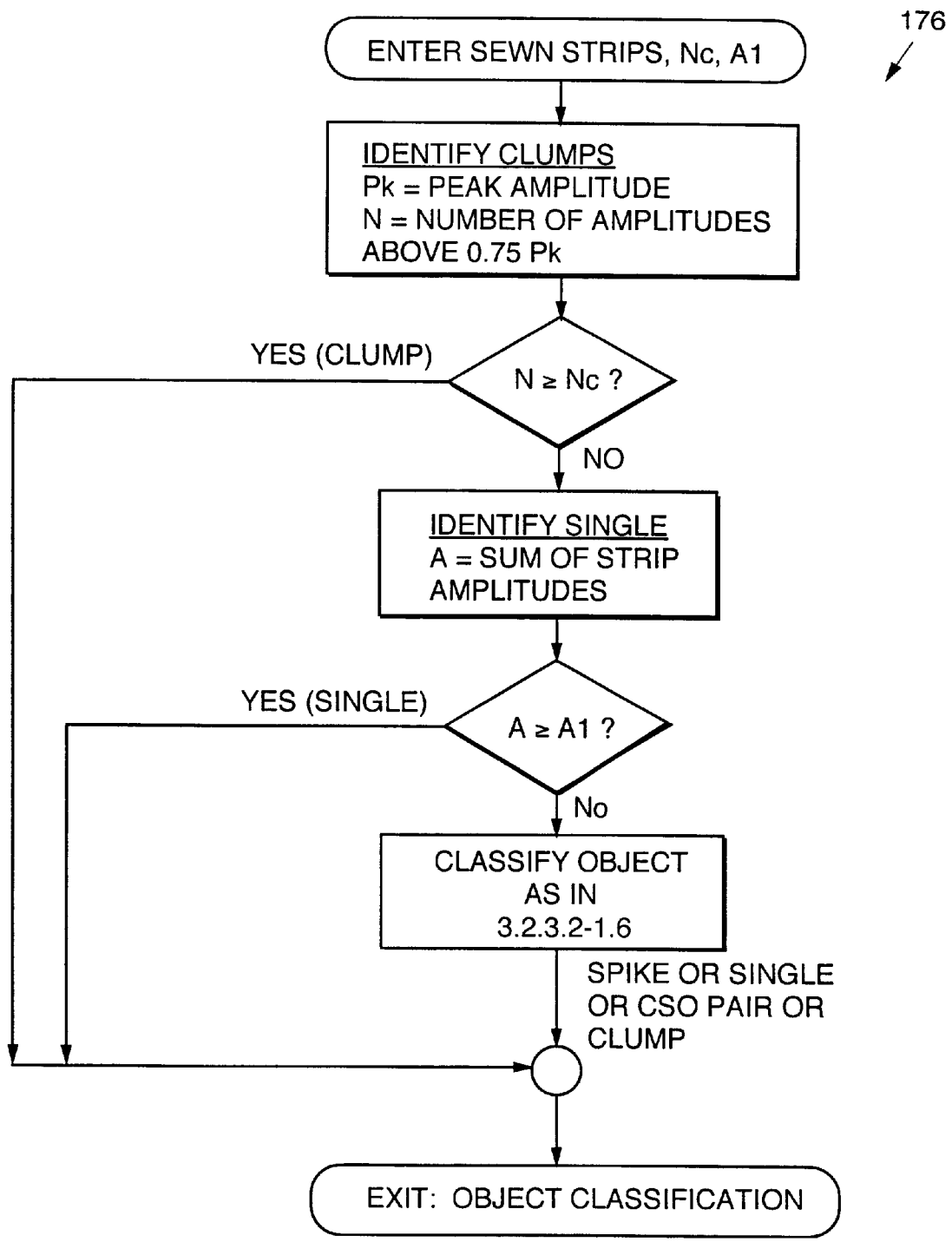
FIG. 16 is a flow diagram depicting the processing steps performed by a tracking object classification and moments algorithm in accordance with the present invention.

The Tracking Object Classification & Moments algorithm 176 performs the processing shown in FIG. 16.

The Track Sensor Strip Processing algorithm 164 estimates the amplitude and LOS for each object using the Tracking Object Amplitude and Position Estimation algorithm 178. The Tracking Object Amplitude and Position Estimation algorithm 178 receives the following inputs:

Tracking Object Classification; and Strips or peak packet.

The Tracking Object Amplitude and Position Estimation algorithm 178 outputs one of the following:

Tracking Object Classification,
  with clump zero$^{th}$, first and second moments and amplitude;
or
  CSO pair amplitude estimate and centroid (first moment);
or
  Single object position and amplitude.

Figure 17:
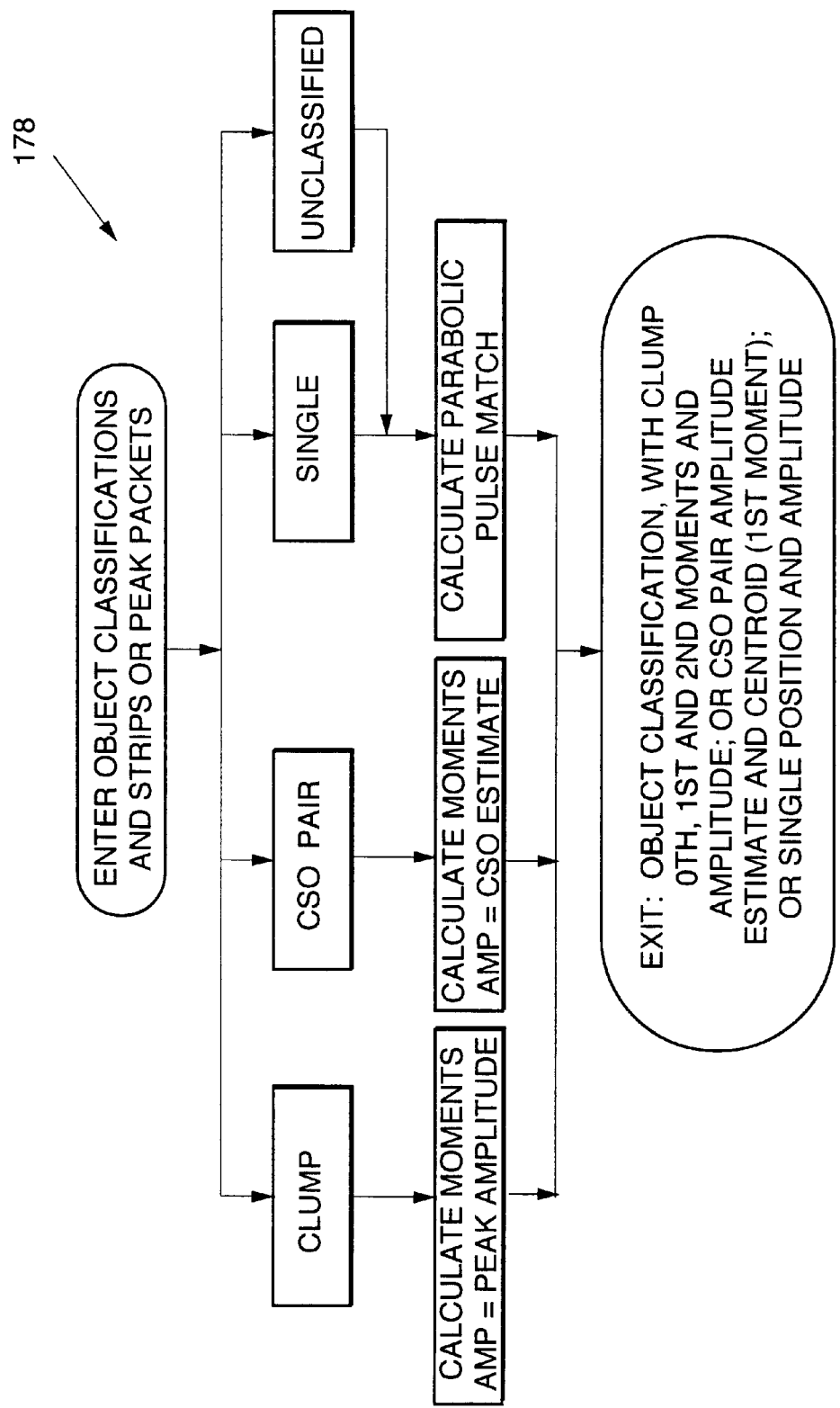
FIG. 17 is a flow diagram depicting the processing steps performed by an object amplitude and position estimation algorithm in accordance with the present invention.

The Tracking Object Amplitude and Position Estimation algorithm 178 performs the processing shown in FIG. 17. The processing for computing the moments of track sensor objects is identical to that for the Acquisition Sensor Strip Processing algorithm 150, except that half-SCA alignment is not needed.

Ground Station commands and autonomous operation rules in accordance with a T-rack Sensor Scheduling algorithm 200 (also modifiable by the Ground Station) are used to schedule the use of the Track Sensor 28. The capability to schedule the use of the Track Sensor 28 using on-orbit processing is an advantageous feature of the present invention, because it allows for real-time pointing of the Track Sensor 28 that would be impossible using only commands from a ground station. Object state vectors and track quality parameters are provided by the Target Track Update algorithm 132 for this purpose. High priority objects to be viewed by the Track Sensor 28 are scheduled first, with lower priority tasks treated only if adequate time is available.

Figure 18:
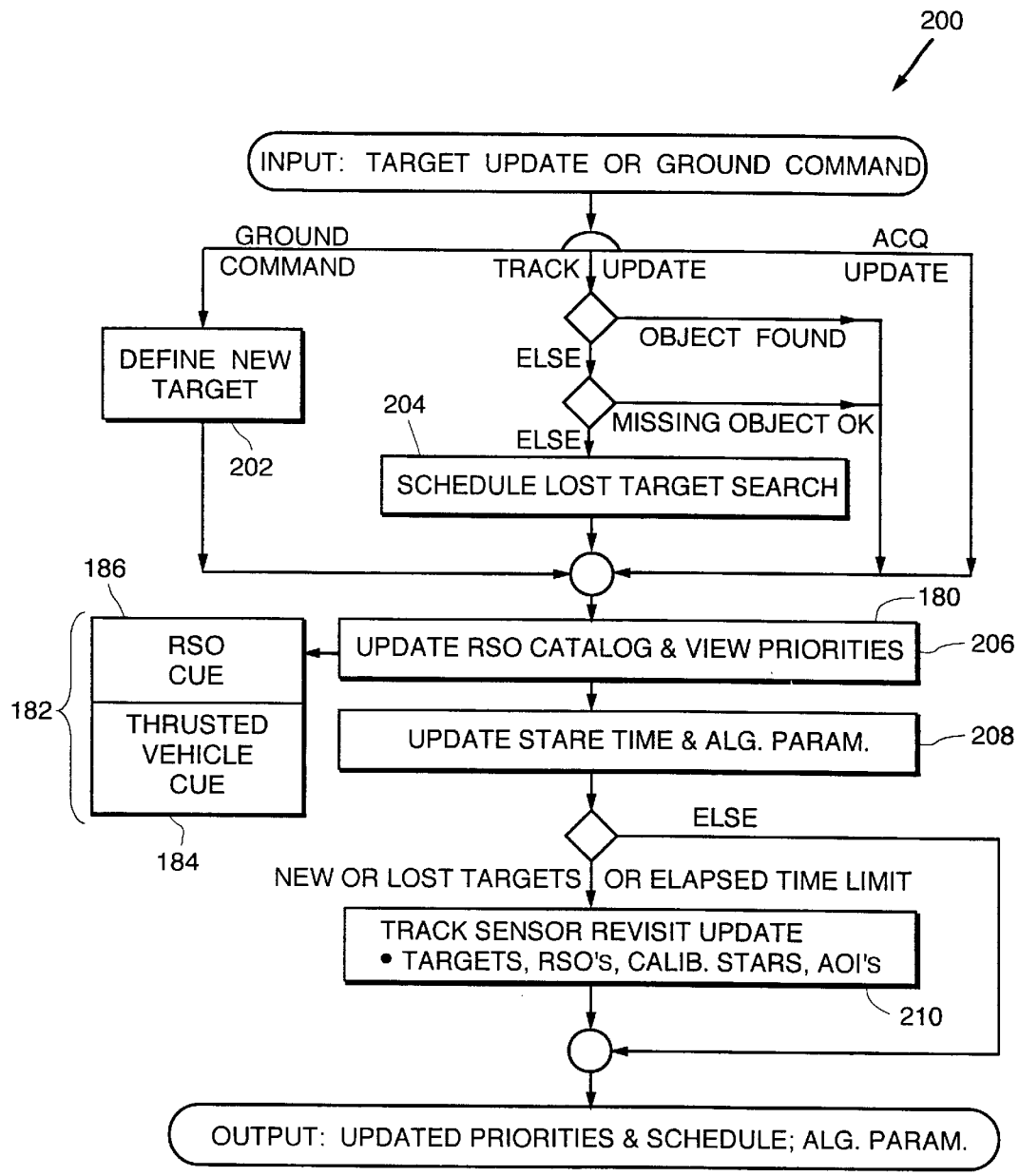
FIG. 18 is a flow diagram depicting the processing steps performed by a track sensor scheduling algorithm in accordance with the present invention.

The Track Sensor Scheduling algorithm 200 processing is shown in FIG. 18. The Track sensor schedule shall be updated when:

(1) A scheduling command is received from a ground station, or
(2) The Acquisition Sensor has detected a new object or lost an object in track; or
(3) The Track Sensor has lost an object in track; or
(4) More than a predetermined amount of time has elapsed since the last update of an object; or
(5) A cue is received from a second sensor platform.

Each object in the list for track sensor revisit scheduling is assigned a base priority and a current priority. The base priority is either a default priority from a priority look-up table or a ground station-specified priority. The priority look-up table includes values for default priority, maximum priority boost and revisit times for each of the following types of inputs, grouped in descending default priority order:

Ground station commands (default priority=1.0), such as:
  Designated launch: missile template relative to earth
  Target handover: ECI position/velocity state vectors; covariance
  Track Sensor object search: fixed points on earth or ECI state vector; search window
  RSO update: ID of RSO in ODP catalog
  Raw or dual threshold data: area and time of interest, threshold
  Discrimination experiment: Track Sensor schedule
  Discrimination update: object ID, desired feature vector Time-Critical Targets-of Opportunity (default priority= 2.0), such as:
  Burned out ACQ sensor objects with <3 Track Sensor looks: Space-Centered Inertial LOS state vector from ACQ sensor
  Lost targets: Space-Centered Inertial LOS state vector from ACQ or Track Sensors Targets of Opportunity (default priority=3.0), such as:
  Track quality update: lowest quality LOS state vectors
  Active RSO's (possibly maneuvering): stored orbital elements
  In-track ACQ or Track object update: Space-Centered Inertial LOS state vector
  Inactive RSO's: stored orbital elements Background Data Requests (default priority=4.0), such as:
  Raw or dual threshold data: area and time of interest, threshold
  Discrimination experiments in RSO's: stored orbital elements
  RSO search with MVPD algorithm: area and time of interest Calibration Updates (default priority=5.0), such as:
  Calibration Stars: stored catalog, with ground update
  Earth fixed landmarks: earth fixed positions The current priority for each object starts at the base priority upon track initiation and is adjusted from there using priority boost factors as a function of position uncertainty. Default priorities and maximum priority boost limits are set to ensure that lower priority objects do not interfere with higher priority tracking. In addition, capability is provided to schedule objects for different revisit times.

If called to process possible new or lost targets for the Acquisition sensor 22, the only action required by the Track Sensor Scheduling algorithm 200 is to add these to the list of objects to be scheduled for track sensor revisits. The base priority is assigned upon target initiation and is either the default priority or as specified upon command from the Ground Station. The current priority assigned to an object is increased from the base priority as a function of the root sum of squares (RSS) track position uncertainty.

The result of processing data from a given Track Sensor stare interval is one of the following:

(1) Object was found. The object's current priority is then reset to the base priority.

(2) Additional objects were found, consisting of objects torn from the clump being observed (most likely case) or possibly new objects, such as RSOs in the field of view. These new objects are passed on to the Target Track Update algorithm 132 for track initiation, and added to the scheduling queue with the default priorities. They are associated with the booster of the original clump if velocities are less than a specified threshold.

(3) Object was not found. A check is then made to see of this is acceptable (over the horizon, near predicted impact point, or maximum number of lost target searches has been exceeded). If there is reason to search again, then more checks are made to determine if the system 20 has adequate resources to set up new search stares. If so, a lost target search is scheduled using a Schedule Lost Target Search Algorithm 204. If not, the lost target is dropped.

When the system 20 encounters a large number of targets, the priority of an object shall increase as a function of its position uncertainty, and it shall drop as the object is updated with the track sensor 28, thereby keeping the maximum number of targets in track.

For a ground command designating a new object, a second sensor providing a cue for a new object, a search for an RSO or an earth-fixed search area, a Define New Target algorithm 202 is performed. The inputs to the Define New Target algorithm. 202 for a ground designated object or a second sensor cued object are: object ECI position and velocity at given epoch time; allowable observation time window; position and velocity covariance matrix; and object priority. For RSO and earth-fixed area searching, the inputs are the locations of the corners of the search area and an allowable observation time window.

The outputs of the Define New Target algorithm 202 for defining a ground designated object or a second sensor cued object are:

(1) Identification as an object already in track, along with a new priority assignment, or (2) a new entry in the track file and track sensor priority list, along with an allowed observation time interval; a "possible lost target search flag" is set if the track sensor field of regard 30 is less than six times the effective standard deviation of the LOS position uncertainty of the target (equal to the square root of the trace of the LOS position covariance matrix). For defining an RSO area search or an earth-fixed search area, the outputs of the Define New Target Algorithm 202 are: a new entry in the track file and track sensor priority list, along with an allowed observation time interval; a "possible lost target search flag" is set if the track sensor field of regard 30 is less than six times the effective standard deviation of the LOS position uncertainty of the target (equal to the square root of the trace of the LOS position covariance matrix), with the center of the search area treated as an object; and a flag to call the MVPD algorithm 70, with rate restore tuned to the maximum LOS rate.

The processing used by the Define New Target algorithm 202 is identical to that of the Handover Target Designation algorithm 148.

The Schedule Lost Target Search algorithm 204 receives the following inputs: estimate of object ECI position and velocity at latest epoch time; and associated position and velocity covariance matrix.

Outputs of the Schedule Lost Target Search algorithm 204 are a sequence of pseudo-object LOS state vectors along a major axis of LOS position uncertainty.

The Schedule Lost Target Search algorithm 204 performs the following processing:

Propagate object LOS position and velocity along the major axis of LOS position uncertainty, with LOS position increments equal to 0.9 of the track sensor field of regard 30. Let N be the number of increments needed to encompass ±3 standard deviations. Decompose the covariance matrix into:

$$[\text{position and velocity covariance matrix}] = \begin{bmatrix} \langle \overline{pos}^2 \rangle & \langle \overline{pos}\,\overline{vel}^T \rangle \\ \langle \overline{vel}\,\overline{pos}^T \rangle & \langle \overline{vel}^2 \rangle \end{bmatrix}$$

where the superscript T denotes a vector transpose. Correct the propagated velocity by $$\Delta(\overline{vel}L) = (\overline{vel}\,\overline{pos}^T)\,(\overline{pos}^2)^{-1}\Delta(\overline{pos})$$

An Update Object Priority algorithm 206 updates the priority value for the object or search area based on the priority look-up table discussed above.

An Update Stare Time & Algorithm Parameters algorithm 208 determines whether the data collected is processed using MLSD or MVPD. When MVPD is used there is little information available to determine the ideal parameters. The Track Sensor 28 stares at the background, and a stare time is picked based on whether the background is an ATH or BTH scene. The rate restore factor is a function of the stare time. The threshold is selected assuming minimum detectable targets.

For MLSD processing the stare is optimized for either IR or visible as the primary band. Since the IR and visible FPAs need different stare characteristics to produce optimum results, the parameters for the secondary band are chosen to do as well as possible given a non-ideal stare. The three stare types are: follow the target for visible, stare at an earth-fixed point for MWIR BTH, and slew the sensor to control target velocity for MLWIR ATH.

Visible stares are normally done when little or no pattern noise is present. Pattern noise is the background level times the uncorrected component of the responsivity error. The 5×5 background should be used except during stares with severe pattern noise where a 3×3 background would be used. The stare time should be selected from a table based on the SNR of the expected target. Targets should be assumed to be minimum detectable targets if they have not been seen before by the track sensor. Tap weights are selected based on the predicted target velocity, which in the case of a stare optimized for the visible spectrum will always be zero. The threshold is selected from a table using the background estimate, stare time, and SNR. The IR stare which occurs simultaneously with the visible uses a 3×3 or 5×5 background depending on pattern noise severity.

For MWIR stares, a background estimate is selected based on pattern noise severity and streak length. Since this is an update function, the prior stare time and the velocity to determine the streak length are used. For the first stare at an object, a 1 second stare is assumed. A 3×3 background estimate is used when the streak length is less than 3 pixels. A 5×5 background estimate is used when pattern noise is small compared to target intensity. For long streaks in the presence of severe pattern noise, a 1×1 background estimate is used. Once the background has been selected, stare time, tap weights, and thresholds are selected by table lookup. The associated visible stare uses a 3×3 background with severe pattern noise and a 5×5 background with mild pattern noise, with tap weights and threshold selected by table lookup.

Most MLWIR stares use a 1×1 background estimate. If the target is very bright compared to the IR pattern noise a 5×5 background estimate can be used. The sensor is slewed such that the target moves at 13 pixels/sec: across the FPA. The stare time, tap weights, thresholds, and visible stare parameters are selected the same way for MLWIR as they are for MWIR.

For IR the rate restore factor and number of frames are be selected to give the longest stare that does not exceed the specified stare time with second priority given to maximizing the number of rate restored frames.

For visible the integration time is about 91 milliseconds in severe spike environments and about 183 milliseconds the rest of the time.

Figure 19:
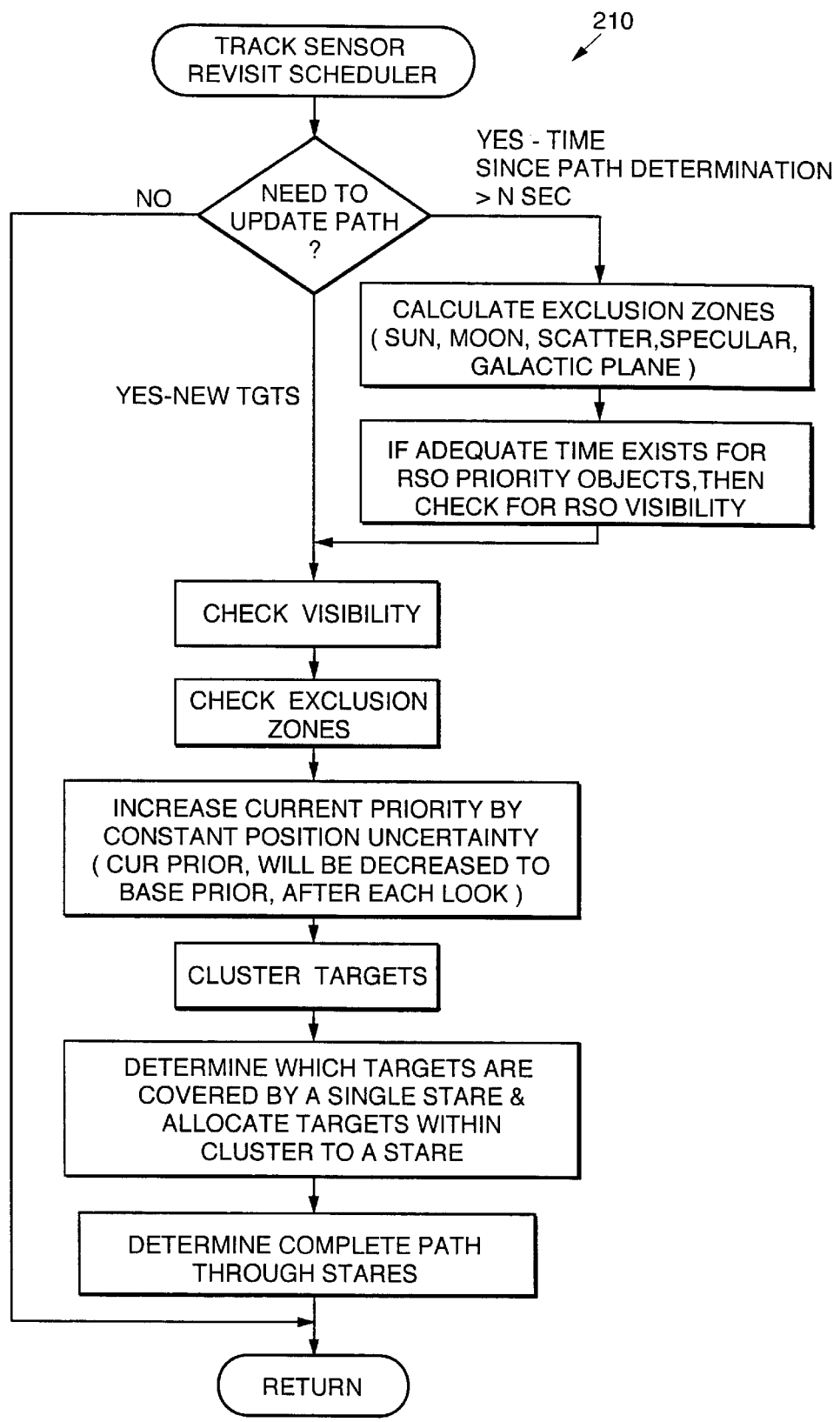
FIG. 19 is a flow diagram depicting the processing steps performed by a track sensor revisit update algorithm in accordance with the present invention.

A Track Sensor Revisit Update algorithm 210 is used to update the path of the Track Sensor 28 if needed due to new targets or due to an elapsed time since the last path update exceeding a predetermined value. The logic implemented by the Track Sensor Revisit Update algorithm 210 is shown in FIG. 19.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A scanning electromagnetic sensor apparatus, comprising:
   a focal plane assembly comprising a plurality of detectors arranged substantially radially and each producing an electrical signal in response to electromagnetic radiation;
   means for rotating an electromagnetic radiation emitting image with respect to the focal plane assembly;
   means for subtracting a background signal from each electrical signal,
   wherein the subtracting means includes a clutter-adaptive algorithm that varies as a function of background characteristics;
   means for filtering the electrical signal to produce a filtered signal from each detector after the background signal has been subtracted using an in-scan and cross-scan filtering algorithm to maximize signal-to-noise ratio;
   means for generating an adaptive threshold value as a function of residual noise standard deviation;
   means for determining whether each filtered signal exceeds the adaptive threshold value;
   means for determining whether each filtered signal that exceeds the adaptive threshold value is a peak.

2. A system for detecting and tracking objects when given data from a focal plane assembly of an electro-optical sensor, comprising:
   an algorithm for rejecting spurious data spikes;
   an algorithm for correcting for detector responsivity error;
   an algorithm for correcting for detector offset error;
   an algorithm for performing time delay integration;
   an algorithm for correcting for focal plane geometry;
   an algorithm for correcting for non-uniform data sampling effects;
   an algorithm for performing clutter-adaptive estimation and subtraction of a scene background;
   an algorithm for performing matched filtering;
   an algorithm for performing target detection with a constant false alarm rate by setting a clutter-adaptive detection threshold;
   an algorithm for forming two-dimensional data packets of threshold-exceeding data for transmission to a programmable processor;
   an algorithm for specifying window parameters for scene windows;
   an algorithm for sending data from scene windows to an object dependent processor;
   an algorithm for rejecting clutter points using a pulse shape test;
   one or more algorithms for calibrating sensors;
   an algorithm for correcting digital logic approximations;
   an algorithm for correcting sensor jitter using observed ground sources;
   an algorithm for converting line-of-sight measurements in sensor coordinates to line-of-sight measurements in inertial reference frame coordinates using sensor attitude measurements;
   an algorithm for classifying observed objects to distinguish earth-fixed clutter points from missiles;
   an algorithm for identifying missiles and rejecting false missile tracks by calculating energy per unit mass of observed objects;
   an algorithm for adaptively varying a threshold multiplier used in the target detection algorithm to maintain a constant false alarm rate in severe clutter;
   an algorithm for defining the scene windows, centered on selected objects being tracked for identifying extended objects;
   an algorithm for line-of-sight tracking of missiles, wherein the observations of a given missile are smoothed to produce, at a specified epoch time, a unit line-of-sight position, velocity and acceleration vectors;
   an algorithm for using a priori knowledge of missile boosting profiles of observed objects to calculate missile position and velocity at burnout;
   an initial orbit determination algorithm for calculating missile position and velocity during a post-boost phase of flight; and
   an algorithm for using the line-of-sight position, velocity and acceleration vectors to calculate commands for pointing a remote electro-optical sensor toward selected objects.

3. The system of claim 2, wherein the electro-optical sensor and the remote electro-optical sensor are on a single platform.

4. The system of claim 2, wherein the electro-optical sensor and the remote electro-optical sensor are on separate platforms.

5. The system of claim 2, wherein the spike rejection algorithm identifies a spike in a given data sequence by using both a shape test and an amplitude test.

6. The system of claim 2, wherein a steepest descent method is used to calculate one or more parameters of the background estimation algorithm.

7. The system of claim 2, wherein clutter standard deviation is calculated as a constant times the absolute value of the variance of the difference between estimated and measured background signals.

8. The system of claim 2, wherein the two-dimensional data packets comprise a plurality of 3 by 3 arrays and each 3 by 3 array is output as a peak packet.

9. The system of claim 8, wherein each peak packet is curve-fit with a two-dimensional surface to obtain an improved estimate of object position and amplitude and to estimate curvature of the object signal versus time curve for the purpose of performing a shape test.

10. The system of claim 8, wherein strips of threshold-exceeding data are sent in lieu of peak packets when a window is commanded by the object dependent processor.

11. The system of claim 2, wherein effects of approximations introduced to simplify processing logic are curve fit from pre-flight simulation and stored as polynomial functions of focal plane assembly position.

12. The system of claim 2, wherein time-varying predicted and measured values of persistent clutter points and other earth-fixed sources are used in a recursive filter to estimate sensor motion relative to the scene background.

13. The system of claim 2, wherein the line-of-sight measurements in sensor coordinates are described in a sensor-fixed reference frame and the sensor attitude measurements as determined by external means are direction cosines describing the inertial orientation of the sensor-fixed reference frame which are used to transform sensor line-of-sight measurements into inertial line-of-sight measurements.

14. The system of claim 2, wherein a criterion for declaring point to be earth-fixed is that the apparent line-of-sight velocity of the point is nearly equal to the line-of-sight velocity of the earth-point where the line-of-sight intersects a surface at a fixed altitude above the earth.

15. The system of claim 2, wherein postulated missile altitude and altitude rate data is stored in a look-up table for each missile type and possible time-from-launch and is used to calculate from a curve fit of measured line-of-sight position data a parameter which describes how well a given postulated missile matches the measured data.

16. The system of claim 15, wherein the estimated time from launch is used to extrapolate altitude and altitude rate polynomials to burnout.

17. The system of claim 2, wherein the threshold multiplier is set by a recursive estimation algorithm operating on specific focal plane assembly regions that divides the focal plane into spatial bins and uses amplitude histograms to distinguish between earth-fixed false alarms and noise-like false alarms and either sets earth-fixed false alarm multipliers or noise-like false alarm multipliers accordingly.

18. The system of claim 2, wherein the object dependent processor tests for extended objects at regular intervals and adaptively adjusts the scene window size by using last look data to ensure that the extended object is encompassed within the scene window.

19. The system of claim 2, wherein a line-of-sight state vector comprises unit line-of-sight, line-of-sight velocity and line-of-sight acceleration vectors, with the line-of-sight velocity and line-of-sight acceleration vectors being normalized to satisfy the constraints implicit in the definition of a unit vector.

20. The system of claim 19, wherein the velocity and acceleration components of the line-of-sight state vector are used to propagate the line-of-sight state vector to a nominal viewing time and to calculate line-of-sight slew commands as a function of the difference between the nominal viewing time and an actual viewing time.

21. The system of claim 20, wherein the position and velocity calculated by the initial orbit determination algorithm is used to calculate the line-of-sight slew commands for a second sensor platform.

22. The system of claim 2, wherein the initial orbit determination algorithm is initialized with the calculated missile position and velocity at burnout and Newtonian iteration is performed to improve the estimate of position and velocity by a variation of Laplace's initial orbit determination method.

23. The system of claim 2, wherein the algorithms are implemented on a satellite platform.

24. The system of claim 2, wherein the algorithms are implemented on an aircraft.

25. The system of claim 2, wherein the objects to be detected and tracked include aircraft.

26. The system of claim 2, wherein the objects to be detected and tracked include resident space objects.

27. A method of detecting and tracking objects using data received from passive optical sensors, including a scanning acquisition sensor capable of sensing signals emitted in an acquisition sensor field-of-regard, and a tracking sensor capable of sensing signals emitted in a tracking sensor field-of-regard, the method comprising the steps of:

separating likely target data received from the acquisition sensor from spurious data by utilizing one or more background-adaptive detection algorithms;

reducing false detections resulting from the step of separating likely target data samples by using multiple scans of the acquisition sensor field-of-regard to identify earth-fixed objects and rejecting data samples which are not consistent with known object motion and intensity characteristics;

initiating tracks of objects of interest by storing line-of-sight vector data associated with the objects of interest;

reducing false detections by testing a hypothesis that the tracks of objects of interest are consistent with predetermined characteristics of selected object types;

scheduling an observation time for the tracking sensor to observe specified objects being tracked;

calculating a sequence of line-of-sight pointing commands to cause the tracking sensor to be slewed to a sequence of positions for observing each specified object during the scheduled observation time intervals;

using a background-adaptive streak detection algorithm to detect the specified objects in the tracking sensor field-of-regard;

combining the data received from the acquisition sensor data with the data received from the tracking sensor data to form tracks; and controlling background-adaptive detection algorithm parameters so as to adapt to operating conditions.

28. The method of claim 27, wherein the spurious data include background clutter.

29. The method of claim 27, wherein the spurious data include noise.

30. The method of claim 27, wherein the step of using a background-adaptive streak detection algorithm to detect the specified objects in the tracking sensor further includes a step of using the background-adaptive streak detection algorithm to detect other objects in the tracking sensor field-of-regard.

31. The method of claim 27, wherein the step of controlling background-adaptive detection algorithm parameters includes a capability to control background-adaptive detection algorithm parameters so as to adapt to background conditions.

32. The method of claim 27, wherein the step of controlling background-adaptive detection algorithm parameters includes a capability to control background-adaptive detection algorithm parameters so as to adapt to environment conditions.

33. The method of claim 27, wherein the step of controlling background-adaptive detection algorithm parameters includes a capability to control background-adaptive detection algorithm parameters so as to adapt to handover quality conditions.

34. The method of claim 27, wherein all steps are carried out on a space-based platform.

35. The method of claim 27, wherein all steps are carried out on an airborne platform.

36. The method of claim 27, wherein the objects of interest include missiles launched from the earth.

37. The method of claim 36, wherein the missiles include tactical missiles.

38. The method of claim 36, wherein the missiles include strategic missiles.

39. The method of claim 27, wherein the objects of interest include satellites.

40. A method of detecting and tracking objects using data received from a passive optical sensors, the sensor capable of sensing signals emitted in a sensor field-of-regard, the method comprising the steps of:

separating likely target data received from the acquisition sensor from spurious data by utilizing one or more background-adaptive detection algorithms;

reducing false detections resulting from the step of separating likely target data by using multiple scans of the sensor field-of-regard to identify earth-fixed objects and rejecting data which are not consistent with known object motion and intensity characteristics;

initiating tracks of objects of interest by storing line-of-sight vector data associated with the objects of interest;

reducing false detections by testing a hypothesis that the tracks of objects of interest are consistent with predetermined characteristics of selected object types;

scheduling an observation time for the sensor to observe specified objects being tracked;

calculating a sequence of line-of-sight pointing commands to cause the sensor to be slewed to a sequence of positions for observing each specified object during the scheduled observation time intervals;

using a background-adaptive streak detection algorithm to detect the specified objects in the sensor field-of-regard;

controlling background-adaptive detection algorithm parameters so as to adapt to operating conditions.

41. A method for subtracting a background signal sensed by an electromagnetic sensor that includes a plurality of detectors, using a background subtraction algorithm, the method comprising the steps of:

estimating the background that each detector is observing by recursively filtering data output by each detector in order to subtract that estimate from each detector output, wherein an effective length of an averaging function implicit or explicit in the recursive background estimation filter is adapted to a local background by means of a steepest descent method which minimizes the variance of a data residuals output by the background subtraction algorithm.

42. The method of claim 41, wherein the averaging function is a function of time.

43. The method of claim 41, wherein the averaging function is a function of position.

44. The method of claim 41, wherein the steepest descent method estimates statistics of the observed sensor background, and wherein an array of background-subtracted residuals is used in the steepest descent algorithm.

* * * * *